(12) United States Patent
Kato et al.

(10) Patent No.: US 9,197,855 B2
(45) Date of Patent: *Nov. 24, 2015

(54) APPARATUS, SYSTEM, AND METHOD OF MANAGING DATA TRANSMISSION, AND TRANSMISSION MANAGEMENT PROGRAM

(71) Applicant: RICOH COMPANY, LTD., Tokyo (JP)

(72) Inventors: Yoshinaga Kato, Kanagawa (JP); Takeshi Koyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,286

(22) Filed: Jan. 3, 2014

(65) Prior Publication Data

US 2014/0118470 A1 May 1, 2014

Related U.S. Application Data

(63) Continuation of application No. 13/312,154, filed on Dec. 6, 2011, now Pat. No. 8,665,312.

(30) Foreign Application Priority Data

| Dec. 6, 2010 | (JP) | ................................. 2010-271383 |
| Feb. 17, 2011 | (JP) | ................................. 2011-031866 |
| Aug. 31, 2011 | (JP) | ................................. 2011-189000 |
| Aug. 31, 2011 | (JP) | ................................. 2011-189043 |

(51) Int. Cl.
*H04N 7/15* (2006.01)
(52) U.S. Cl.
CPC ...................................... *H04N 7/15* (2013.01)

(58) Field of Classification Search
CPC ........... H04N 7/15; H04N 7/14; H04N 7/147; H04N 7/152; H04N 7/142
USPC ........................... 348/14.01–14.16; 709/204; 370/260–261; 715/753
See application file for complete search history.

(56) References Cited

U.S. PATENT DOCUMENTS

| 8,305,909 | B2 | 11/2012 | Ishii et al. |
| 2003/0105979 | A1 | 6/2003 | Itoh et al. |
| 2007/0263075 | A1 | 11/2007 | Nimri et al. |
| 2008/0183862 | A1* | 7/2008 | Kobayashi .................... 709/224 |
| 2010/0063951 | A1* | 3/2010 | Nagoya et al. .................. 706/47 |
| 2011/0205331 | A1 | 8/2011 | Kato |

FOREIGN PATENT DOCUMENTS

| JP | 2005-278084 | 10/2005 |
| JP | 2007-274369 | 10/2007 |

OTHER PUBLICATIONS

Office Action issued Apr. 22, 2015, in Japanese Patent Application No. 2011-189000.

* cited by examiner

*Primary Examiner* — Melur Ramakrishnaiah
(74) *Attorney, Agent, or Firm* — Oblon, McClelland, Maier & Neustadt, L.L.P.

(57) ABSTRACT

When a refrained state is detected at a first transmission terminal, a transmission management system sends operation state information of the first transmission terminal, which is determined based on the refrained state of the first transmission terminal, to a second transmission terminal that may initiate communication with the first transmission terminal before the second transmission terminal starts communication with the first transmission terminal.

19 Claims, 31 Drawing Sheets

FIG. 11

REFRAINED STATE ICON MANAGEMENT TABLE

| REFRAINED STATE | REFRAINED STATE ICON |
|---|---|
| MICROPHONE TROUBLE |  |
| CAMERA TROUBLE |  |
| SPEAKER TROUBLE |  |
| DISPLAY TROUBLE |  |
| MICROPHONE MUTE |  |
| CAMERA OFF |  |
| SPEAKER MUTE |  |
| DISPLAY OFF |  |

FIG. 12A

OPERATION STATE ICON MANAGEMENT TABLE

| OPERATION STATE | OPERATION STATE ICON |
|---|---|
| ONLINE (COMMUNICATION OK) |  |
| ONLINE (COMMUNICATING, ERROR) |  |
| ONLINE (COMMUNICATING, NORMAL) |  |
| OFFLINE |  |

FIG. 12B

OPERATION STATE ICON MANAGEMENT TABLE

| OPERATION STATE | OPERATION STATE ICON |
|---|---|
| ONLINE (COMMUNICATION OK) |  |
| ONLINE (COMMUNICATING, TROUBLE) |  |
| ONLINE (COMMUNICATING, NORMAL) |  |
| OFFLINE |  |

FIG. 15

DATA QUALITY MANAGEMENT TABLE

| TERMINAL IP ADDRESS | IMAGE DATA QUALITY |
|---|---|
| 1.3.2.4 | HIGH |
| 1.3.1.3 | LOW |
| 1.3.2.3 | MEDIUM |
| ... | ... |

FIG. 16

RELAY TERMINAL MANAGEMENT TABLE

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG. 17

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 18

TERMINAL MANAGEMENT TABLE

| TERMINAL ID | TERMINAL NAME | SPECIFIC OPERATION STATE | DATE AND TIME RECEIVED | TERMINAL IP ADDRESS |
|---|---|---|---|---|
| 01aa | JAPAN TOKYO OFFICE AA TERMINAL | ONLINE (COMMUNICATION OK) | 2009.11.10.13:40 | 1.2.1.3 |
| 01ab | JAPAN TOKYO OFFICE AB TERMINAL | OFFLINE | 2009.11.09.12:00 | 1.2.1.4 |
| ... | ... | ... | ... | ... |
| 01ba | JAPAN OSAKA OFFICE BA TERMINAL | ONLINE (COMMUNICATION OK) | 2009.11.10.13:45 | 1.2.2.3 |
| 01bb | JAPAN OSAKA OFFICE BB TERMINAL | ONLINE (COMMUNICATING, MICROPHONE MUTE) | 2009.11.10.13:50 | 1.2.2.4 |
| ... | ... | ... | ... | ... |
| 01ca | U.S. NY OFFICE CA TERMINAL | ONLINE (COMMUNICATING, CAMERA OFF) | 2009.11.10.12:45 | 1.3.1.3 |
| 01cb | U.S. NY OFFICE CB TERMINAL | ONLINE (COMMUNICATING, MICROPHONE TROUBLE) | 2009.11.10.13:55 | 1.3.1.4 |
| ... | ... | ... | ... | ... |
| 01da | U.S. WASH, D.C. OFFICE DA TERMINAL | ONLINE (COMMUNICATING, SPEAKER MUTE) | 2009.11.08.12:45 | 1.3.2.3 |
| 01db | U.S. WASH, D.C. OFFICE DB TERMINAL | ONLINE (COMMUNICATION OK) | 2009.11.10.12:45 | 1.3.2.4 |
| ... | ... | ... | ... | ... |

FIG. 19

CANDIDATE LIST MANAGEMENT TABLE

| REQUEST TERMINAL ID | COUNTERPART TERMINAL ID |
|---|---|
| 01aa | 01ab,···,01ba,01bb,···,01ca,01cb,01da,01db,··· |
| 01ab | 01aa,01ca,01cb |
| 01ba | 01aa,01ab,01ca,01cb,01da,01db |
| ... | ... |
| 01db | 01aa,01ab,01ba,···,01da,01ca,01cb,···,01da |

FIG. 20

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | | | | | ... |

FIG. 21

ADDRESS PRIORITY MANAGEMENT TABLE

| DOT ADDRESS SIMILARITY | ADDRESS PRIORITY POINT |
|---|---|
| S. S. S. D | 5 |
| S. S. D. - | 3 |
| S. D. -. - | 1 |
| D. -. -. - | 0 |

FIG. 22

TRANSMISSION SPEED PRIORITY MANAGEMENT TABLE

| MAXIMUM DATA TRANSMISSION SPEED (Mbps) | TRANSMISSION SPEED PRIORITY POINT |
|---|---|
| 1000 ~ | 5 |
| 100 ~ 1000 | 3 |
| 10 ~ 100 | 1 |
| ~ 10 | 0 |

FIG. 23

QUALITY MANAGEMENT TABLE

| DELAY TIME (ms) | IMAGE DATA QUALITY |
|---|---|
| 0 ~ 100 | HIGH |
| 100 ~ 300 | MEDIUM |
| 300 ~ 500 | LOW |
| 500 ~ | (INTERRUPT) |

FIG. 24A

REFRAINED STATE INFORMATION MANAGEMENT TABLE

| REFRAINED STATE | MESSAGE | OPERATION STATE | |
|---|---|---|---|
| MICROPHONE TROUBLE | MICROPHONE TROUBLE IS DETECTED | ONLINE (COMMUNICATING, ERROR) | ⎫ FIRST STATE |
| SPEAKER TROUBLE | SPEAKER TROUBLE IS DETECTED | | |
| CAMERA TROUBLE | CAMERA TROUBLE IS DETECTED | | |
| DISPLAY TROUBLE | DISPLAY TROUBLE IS DETECTED | | |
| MICROPHONE MUTE | MICROPHONE IS IN MUTE | ONLINE (COMMUNICATING, NORMAL) | ⎫ SECOND STATE |
| CAMERA OFF | CAMERA IS OFF | | |
| SPEAKER MUTE | SPEAKER IS IN MUTE | | |
| DISPLAY OFF | DISPLAY IS OFF | | |

FIG. 24B

REFRAINED STATE INFORMATION MANAGEMENT TABLE

| REFRAINED STATE | MESSAGE | OPERATION STATE | |
|---|---|---|---|
| MICROPHONE TROUBLE | MICROPHONE TROUBLE IS DETECTED | ONLINE (COMMUNICATING, TROUBLE) | ⎫ FIRST STATE |
| CAMERA TROUBLE | CAMERA TROUBLE IS DETECTED | | |
| SPEAKER TROUBLE | SPEAKER TROUBLE IS DETECTED | | |
| DISPLAY TROUBLE | DISPLAY TROUBLE IS DETECTED | | |
| MICROPHONE MUTE | MICROPHONE IS IN MUTE | ONLINE (COMMUNICATING, NORMAL) | ⎫ SECOND STATE |
| CAMERA OFF | CAMERA IS OFF | | |
| SPEAKER MUTE | SPEAKER IS IN MUTE | | |
| DISPLAY OFF | DISPLAY IS OFF | | |

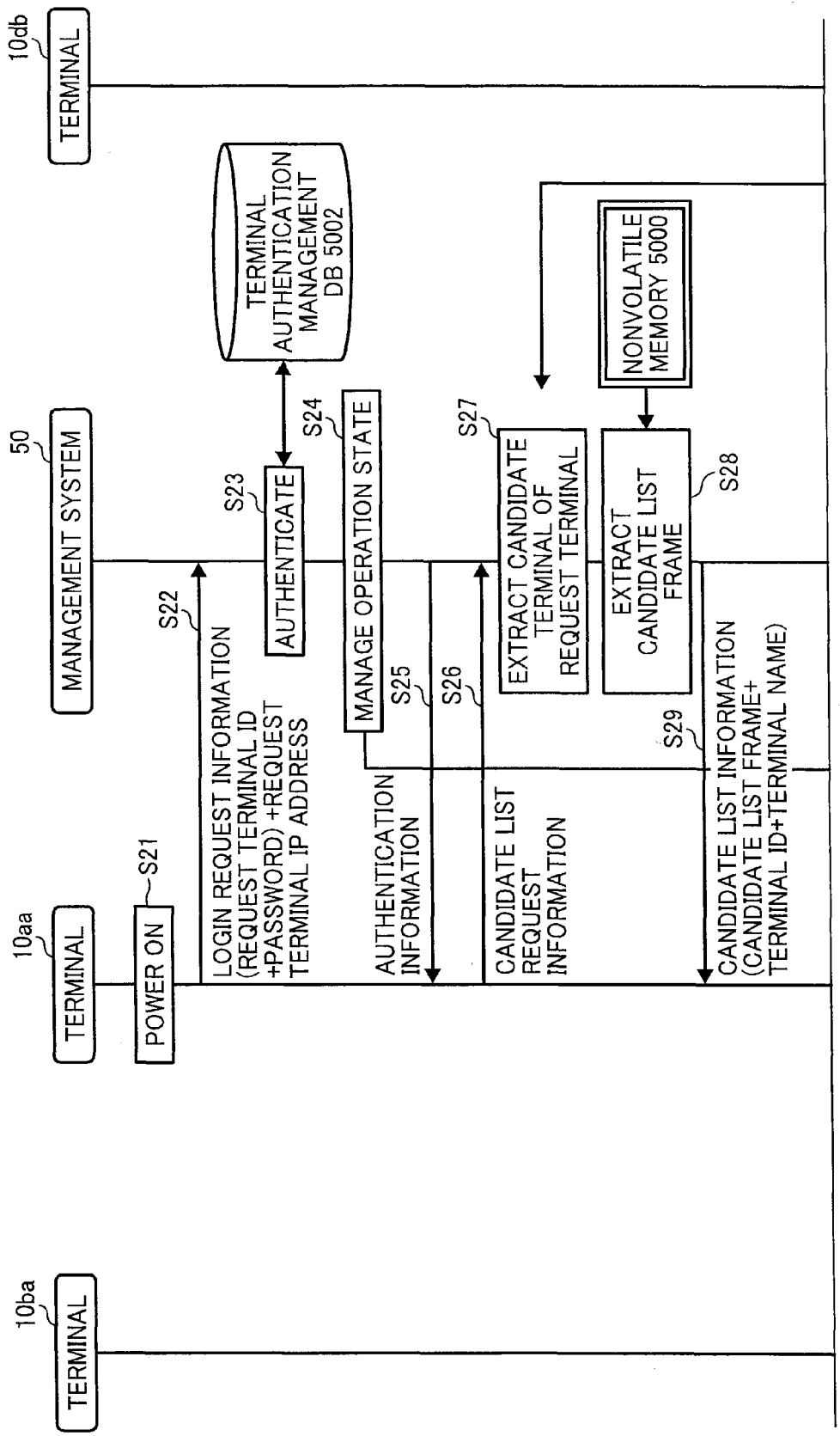

FIG. 30

| RELAY TERMINAL ID | ADDRESS PRIORITY POINT | | TRANSMISSION SPEED PRIORITY POINT | TOTAL PRIORITY POINT |
|---|---|---|---|---|
| | FIRST ADDRESS PRIORITY POINT FOR REQUEST | SECOND ADDRESS PRIORITY POINT FOR COUNTERPART TERMINAL | | |
| 111a | 5 | 1 | 3 | 8 |
| 111b | 3 | 1 | 5 | 8 |
| 111c | — | — | — | — |
| 111d | 1 | 5 | 1 | 6 |

# APPARATUS, SYSTEM, AND METHOD OF MANAGING DATA TRANSMISSION, AND TRANSMISSION MANAGEMENT PROGRAM

CROSS-REFERENCE TO RELATED APPLICATIONS

This patent application is a continuation of application Ser. No. 13/312,154 filed Dec. 6, 2011, which is based on and claims priority pursuant to 35 U.S.C. §119 to Japanese Patent Application Nos. 2010-271383, filed on Dec. 6, 2010, 2011-031866, filed on Feb. 17, 2011, 2011-189000, filed on Aug. 31, 2011, and 2011-189043, filed on Aug. 31, 2011, in the Japan Patent Office, the entire disclosure of which is hereby incorporated herein by reference.

FIELD OF THE INVENTION

The present invention relates to managing a transmission terminal that transmits contents data through a communication network.

BACKGROUND

With the need for reducing costs or times associated with business trips, more companies are moving towards transmission systems to have teleconference or videoconference among remotely located offices via a communication network such as the Internet. The transmission systems allow transmission of contents data such as image data and/or sound data among a plurality of transmission terminals that are remotely located from one another through the communication network to facilitate communication among the plurality of transmission terminals.

The recent transmission systems have a function of notifying a user at a request transmission terminal of information indicating the current state of a counterpart transmission terminal before the user at the request transmission terminal starts communicating with a user at the counterpart transmission terminal. For example, the transmission system described in U.S. Patent Application Publication No. 2007/0263075 manages user names and associated identities of potential users at transmission terminals such that the stored information regarding the potential users are constantly refreshed as users at transmission terminals log in or out. Before the user at the request transmission terminal initiates videoconference, the user at the request transmission terminal accesses a screen that lists user names and associated identities of potential users that are constantly refreshed.

While the user at the request transmission terminal is refrained from initiating videoconference with a user who is not currently logged in, the above-described technique does not provide much information other than whether the user is logged in or not. For example, even when the user at the counterpart transmission terminal is logged in, the user at the request transmission terminal may not be able to communicate with the user at the other end due to a trouble in the counterpart transmission terminal such as a trouble in microphone or speaker of the counterpart transmission terminal. In such case, the user at the counterpart transmission terminal still tries to initiate communication with the user at the other end, without knowing that the user at the other end is not available for communication.

SUMMARY

In view of the above, one aspect of the present invention is to provide a technique of sending notification to the user at a second terminal that may initiate communication with a first terminal in refrained state, when the refrained state of the first terminal is detected. With this notification, the user at the second terminal is able to determine whether to initiate or not initiate communication with the first terminal in refrained state.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 is an example data structure of a refrained state icon management table, managed by the terminal of FIG. 10;

FIG. 12A is an example data structure of an operation state icon management table, managed by the terminal of FIG. 10, according to an example embodiment of the present invention;

FIG. 12B is an example data structure of an operation state icon management table, managed by the terminal of FIG. 10, according to an example embodiment of the present invention;

FIG. 15 is an example data structure of a data quality management table, managed by the relay terminal of FIG. 10;

FIG. 16 is an example data structure of a relay terminal management table, managed by the management system of FIG. 10;

FIG. 17 is an example data structure of a terminal authentication management table, managed by the management system of FIG. 10;

FIG. 18 is an example data structure of a terminal management table, managed by the management system of FIG. 10;

FIG. 19 is an example data structure of a candidate list management table, managed by the management system of FIG. 10;

FIG. 20 is an example data structure of a session management table, managed by the management system of FIG. 10;

FIG. 21 is an example data structure of an address priority management table, managed by the management system of FIG. 10;

FIG. 22 is an example data structure of a transmission speed priority management table, managed by the management system of FIG. 10;

FIG. 23 is an example data structure of a quality management table, managed by the management system of FIG. 10;

FIG. 24A is an example data structure of a refrained state information management table, managed by the management system of FIG. 10;

FIG. 24B is an example data structure of a refrained state information management table, managed by the management system of FIG. 10;

FIGS. 26A and 26B are a data sequence diagram illustrating operation of establishing communication among two or more terminals of the transmission system of FIG. 1, according to an example embodiment of the present invention;

FIG. 30 is a table storing priority points of the relay terminals that are respectively calculated by the transmission management system of FIG. 10 during the operation of limiting a number of candidate relay terminals;

Figure 1:
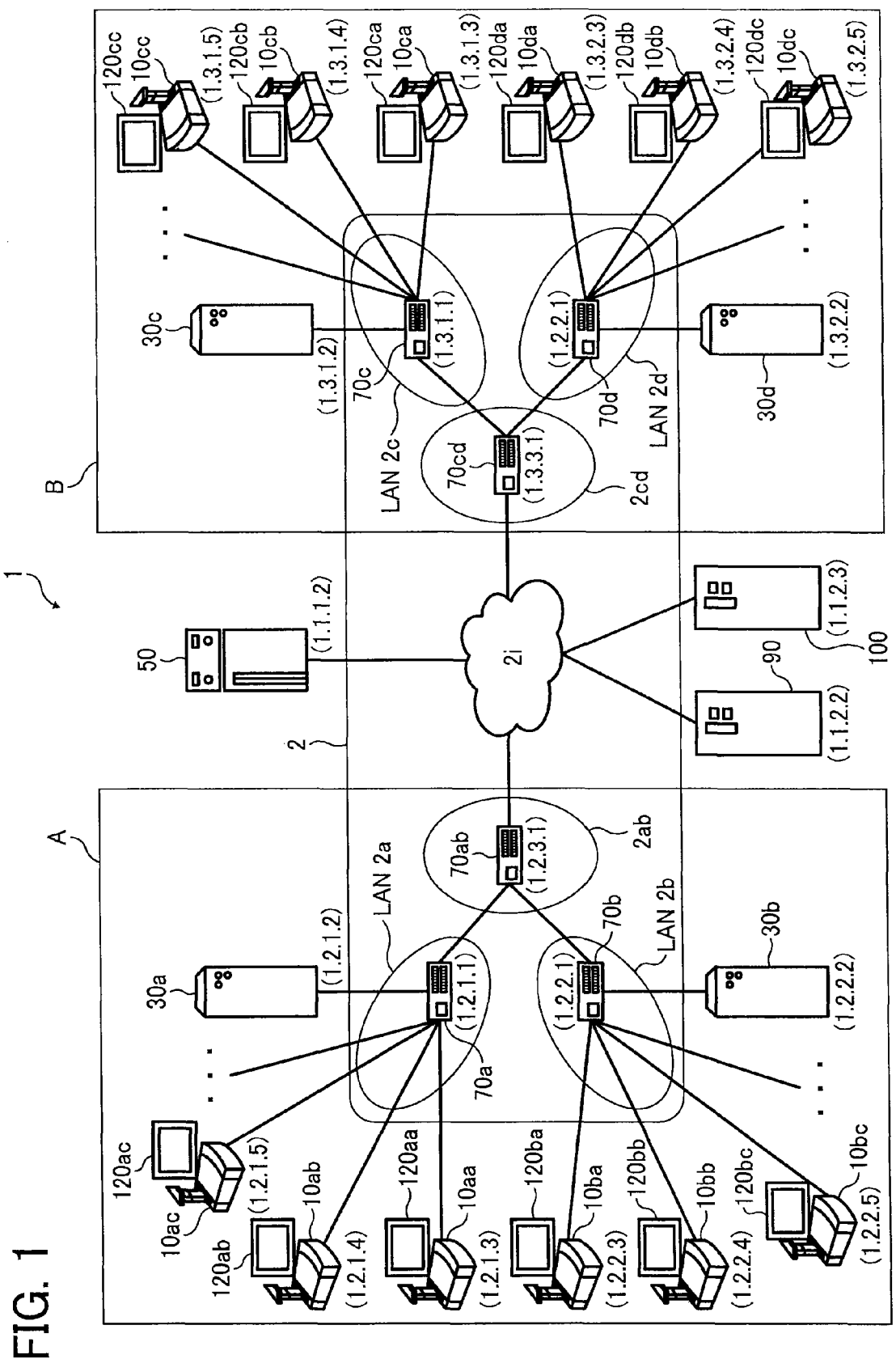
FIG. 1 is a schematic block diagram illustrating a configuration of a transmission system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 36, example embodiments of the present invention are explained.

<Structure of Transmission System>

Figure 2:
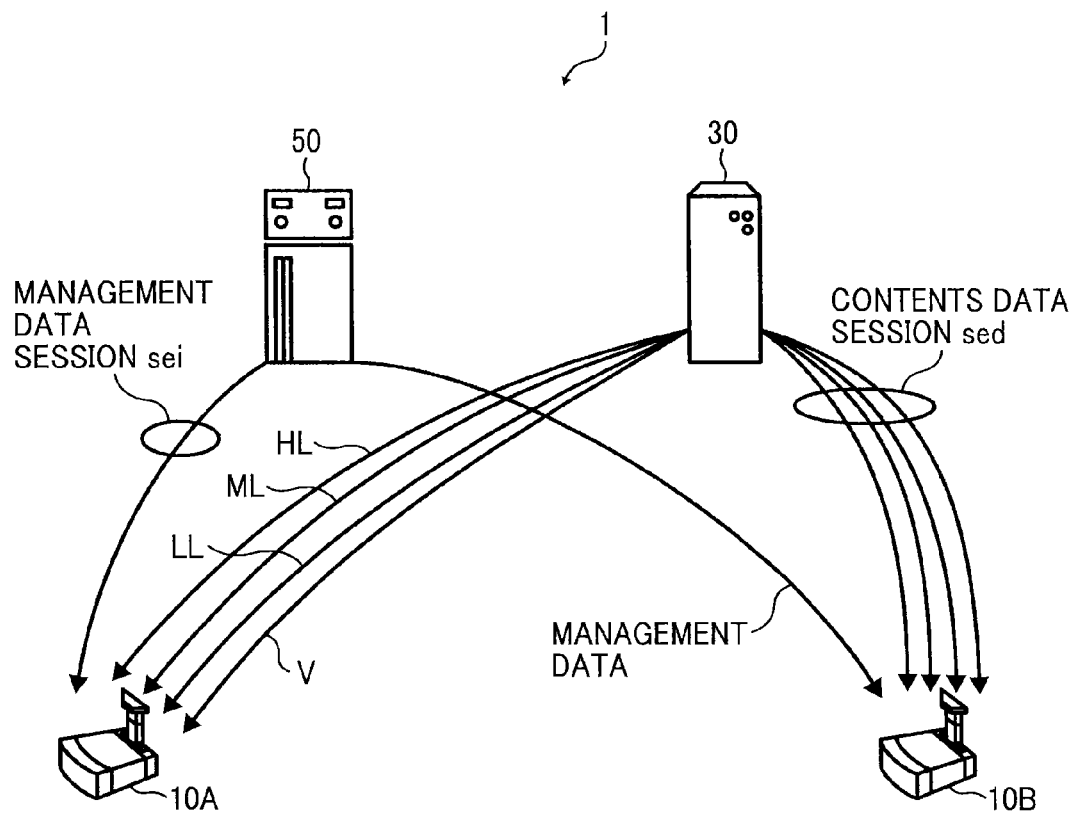
FIG. 2 is an illustration for explaining transmission or reception of data such as image data, sound data, or management data, performed by the transmission system of FIG. 1.
Figure 3A:
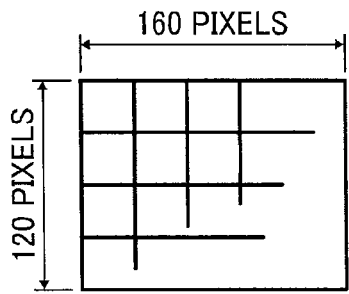
FIGS. 3A to 3C are illustrations for explaining image quality of image data transmitted or received by the transmission system of FIG. 1.
Figure 3B:
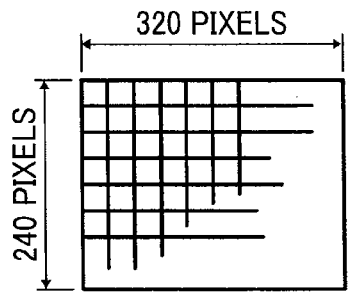
Figure 3C:
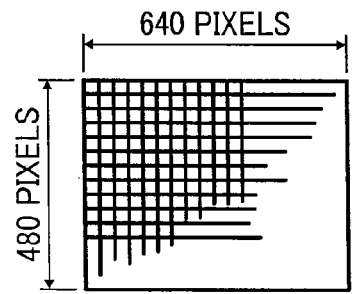

FIG. 1 is a schematic block diagram illustrating a transmission system, according to an example embodiment of the present invention. FIG. 2 is an illustration for explaining transmission or reception of data such as image data, sound data, or management data, performed by the transmission system of FIG. 1. FIGS. 3A to 3C are illustrations for explaining image quality of image data transmitted or received by the transmission system of FIG. 1.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or sound data that is used to convey human's feelings between or among two or more of a plurality of transmission terminals 10 each of which functioning as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminal 10aa, 10ab, 10ac, 10ba, 10bb, 10bc, 10*ca*, 10*cb*, 10*cd*, 10*da*, 10*db*, and 10*dc*, and a plurality of displays 120*aa*, 120*ab*, 120*ac*, 120*ba*, 120*bb*, 120*bc*, 120*ca*, 120*cb*, 120*cc*, 120*da*, 120*db*, and 120*dc*, a plurality of relay terminals 30*a*, 30*b*, 30*c*, and 30*d*, a transmission management system 50, a program providing system 90, and a maintenance system 100.

The transmission terminal 10 transmits or receives contents data such as image data and/or sound data to or from another transmission terminal 10.

For the descriptive purposes, in this example, any number of the plurality of terminals 10*aa* to 10*db* may be collectively or each referred to as the terminal 10. Any number of the plurality of displays 120*aa* to 120*db* may be collectively or each referred to as the display 120. Any number of the plurality of relay terminals 30*a*, 30*b*, 30*c*, and 30*d* may be collectively or each referred to as the relay terminal 30. The transmission management system 50 may be referred to as the "management system" 50.

The terminal 10 that transmits data to another terminal 10 to carry out videoconference is referred to as the request terminal 10A. The terminal 10 that receives data from another terminal 10 to carry out videoconference is referred to as the counterpart terminal 10B. For example, the request terminal 10A includes any terminal 10 that requests another terminal 10 to start videoconference, and the counterpart terminal 10B includes any terminal 10 that is requested by the request terminal 10A to start videoconference.

As illustrated in FIG. 2, in the transmission system 1, the request terminal 10A and the counterpart terminal 10B first establish a management data session sei to start transmission and reception of various types of management data through the management system 50. Further, in this example, the request terminal 10A and the counterpart terminal 10B establish four contents data sessions sed to transmit or receive contents data through the relay terminal 30. The four contents data sessions include a session "HL" to transmit high-level resolution image data HL, a session "ML" to transmit medium-level resolution image data ML, a session "LL" to transmit low-level resolution image data LL, and a session "V" to transmit sound data V such as voice data V. In this example, these four contents data sessions may be referred to as image and/or sound data sessions.

Referring now to FIGS. 3A to 3C, various image data having different resolution levels, which are respectively transmitted by the terminal 10 of the transmission system 1, are explained. Referring to FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

Referring back to FIG. 1, the relay terminal 30 relays contents data such as image data or sound data between or among the terminals 10. The management system 50 centrally manages various information such as login information of the terminal 10, the operation state of the terminal 10, candidate list information, and the operation state of the relay terminal 30. In this example, it is assumed that a moving image is transmitted as the image data. Alternatively, a still image, or both of the still image and the moving image, may be transmitted as the image data.

The plurality of routers 70*a* to 70*d*, 70*ab*, and 70*cd*, which may be collectively or each referred to as the router 70, selects a route that is most suitable for transmitting contents data such as image data and sound data.

The program providing system 90 includes a hard disk device (HD) 204 (FIG. 9), which stores a terminal control program that causes the terminal 10 to perform various functions or operations. For example, the program providing system 90 sends the terminal control program to the terminal 10 through the Internet 2*i* to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2*i* to cause the relay terminal 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program.

The maintenance system 100 is implemented as a computer capable of maintaining, managing, fixing, or upgrading at least one of the terminal 10, relay terminal 30, management system 50, and program providing system 90. Assuming that the maintenance system 100 is provided within a country, and the terminal 10, relay terminal 30, management system 50, and program providing system 90 are each installed outside the country, the maintenance system 100 maintains, manages, fixes, or upgrades at least one of the terminal 10, relay terminal 30, management system 30, and program providing system 90, remotely through the communication network 2. The maintenance system 100 may manage maintenance of at least one of the terminal 10, relay terminal 30, management system 50, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10*aa*, 10*ab*, and Mac, the relay terminal 30*a*, and the router 70*a* are connected to a local area network (LAN) 2*a*. The terminals 10*ba*, 10*bb*, and 10*bc*, the relay terminal 30*b*, and the router 70*b* are connected to a LAN 2*b*. The LAN 2*a* and the LAN 2*b* are connected to a leased line 2*ab* in which the router 70*ab* is provided. It is assumed that these devices including the terminals 10*aa* to 10*bc* are located in an area A. For example, assuming that the area is any area in Japan, the LAN 2*a* could be located within an office in a city such as Tokyo, and the LAN 2*b* could be located within an office in another city such as Osaka.

The terminals 10*ca*, 10*cb*, and 10 cc, the relay terminal 30*c*, and the router 70*c* are connected to a LAN 2*c*. The terminals 10*da*, 10*db*, and 10*dc*, the relay terminal 30*d*, and the router 70*d* are connected to a LAN 2*d*. The LAN 2*c* and the LAN 2*d* are connected to a leased line 2cd in which the router 70cd is provided. It is assumed that these devices including the terminals 10ca to 10dc are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The management system 50 and the program providing system 90 are connected through the Internet 2i to the terminal 10 and the relay terminal 30. Any one of the management system 50 and the program providing system 90 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the management system 50, the router 70, and the program providing system 90 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Operation of Transmission System>

Figure 4:
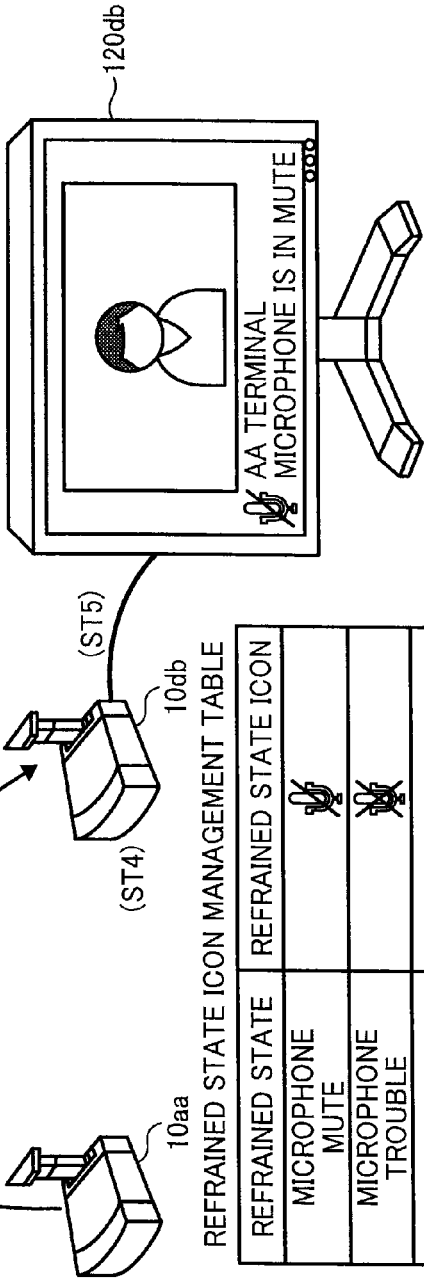
FIG. 4 is an illustration for explaining operation of transmitting a specific operation state of one terminal to another terminal during when a plurality of terminals are communicating, performed by the transmission system of FIG. 1.

Referring now to FIGS. 4 to 6, operation of transmitting information regarding the state of one terminal to another terminal, performed by the management system 50 when videoconference is being carried among a plurality of terminals, is explained according to an example embodiment of the present invention.

As illustrated in FIG. 4, the management system 50 stores a terminal management table and a refrained state information management table in its memory. The terminal management table stores the names of the terminals 10 in association with the terminal IDs for identifying the terminals 10. The refrained state information management table stores refrained state information indicating the refrained state of the terminal 10 in association with text data of a message indicating the refrained state of the terminal 10.

The refrained state of the terminal 10 is any state that refrains a user at the terminal 10 from communicating with another terminal 10 through the terminal 10. In one example, the refrained state of the terminal 10 includes a state in which the communication function provided by the terminal 10 is not provided due to a trouble in hardware or software of the terminal 10. Examples of the refrained state caused due to the trouble in communication function include, but not limited to, a microphone trouble such as the case where the function of collecting sounds through the microphone 114 is not provided by the microphone 114 or the sound I/O I/F 116, a camera trouble such as the case where the function of capturing an image using the camera 112 is not provided by the camera 112 or the imaging element 113, a speaker trouble such as the case where the function of outputting sounds through the speaker 115 is not provided by the speaker 115 or the sound I/O I/F 116, and a display trouble such as the case where the function of displaying image data on the display 120 is not provided by the display 120 or display I/F 117. The trouble of a specific device may be detected, for example, when the device is disconnected from terminal 10 in case the device is an external device. Further, examples of the refrained state caused due to the trouble in communication function include a network connection trouble such as the case where the function of transmitting or receiving data to or from the counterpart terminal is not provided by the network I/F 111.

In another example, the refrained state of the terminal 10 includes a state in which the function of the terminal 10 related to communication is restricted or turned off at least partially, for example, according to a user instruction. Examples of the refrained state caused due to activation of restriction processing to the communication function of the terminal 10 include, but not limited to, restricting a microphone input function such as the case where the function of collecting sounds by the microphone 114 is temporarily restricted ("microphone mute"), restricting a camera function such as the case where the function of capturing an image provided by the camera 112 is temporarily restricted ("camera off"), restricting a speaker output function such as the case where the function of outputting sounds provided by the speaker 115 is temporarily restricted ("speaker mute"), and restricting a display function such as the case where the function of displaying image data provided by the display 120 is temporarily restricted ("display off"). Any of these refrained states attributable to activation of restriction processing is caused when the terminal 10 normally operates, for example, according to a user instruction. When the restriction processing of the terminal 10 is activated, transmission of sound data or image data is restricted such that communication of the user through the terminal 10 is refrained. For the descriptive purposes, the restricted state of the terminal 10 may be referred to as the mute on state, or the mute state, in which the mute function is activated. Further, examples of restriction processing that causes the terminal 10 to be in the mute state includes the cases described in U.S. patent application Ser. No. 13/194,057 and 13/34259, the entire contents of which are hereby incorporated herein by reference.

Still referring to FIG. 4, the terminal 10 stores a refrained state icon management table in its memory. The refrained state icon management table stores, for each of the refrained states of the terminal 10, image data of a refrained state icon representing a specific refrained state. The refrained state icon is to be displayed onto the display 120 of the terminal 10, for example, as the operation state information of the counterpart terminal 10.

Assuming that the terminal 10aa and the terminal 10db are having videoconference, example operation of transmitting information regarding the specific operation state of the terminal 10aa to the terminal 10db is explained.

At ST1, when the user at the terminal 10aa activates the microphone mute function, the terminal 10aa transmits the terminal ID "01aa" of the terminal 10aa, and specific operation state information to the management system 50. The specific operation state information includes information indicating whether the terminal 10aa is online and whether the terminal 10aa is communicating, and the refrained state information indicating a refrained state of the terminal 10aa if it is in refrained state. More specifically, in this example, the specific operation state information includes information indicating that the terminal 10aa is online and communicating, and the refrained state information indicating activation of the microphone mute function ("microphone mute").

At ST2, the management system 50 searches the refrained state information management table using the refrained state information indicating activation of the microphone mute function that is received from the terminal 10aa to extract a message "microphone is in mute". At ST2, the management system 50 searches the terminal management table using the terminal ID "01aa" as a search key to extract the terminal name "AA terminal" of the terminal 10aa having the terminal ID "01aa".

At ST3, the management system 50 transmits the terminal 10db that is communicating with the terminal 10aa with the refrained state information "microphone mute" that is received from the terminal 10aa, the extracted message "microphone is in mute", and the extracted terminal name "AA terminal". The terminal 10db receives the refrained state information, the message, and the terminal name.

At ST4, the terminal 10db searches the refrained state icon management table using the refrained state information "microphone mute" as a search key to extract the image data of the refrained state icon representing the refrained state information "microphone mute".

At ST5, the terminal 10db causes the display 120db to display the refrained state icon, the terminal name "AA terminal", and the message "microphone is in mute".

With this display, the user at the terminal 10db is informed that the user at the terminal 10aa activates the microphone mute function. With this information, the user at the terminal 10db knows that sound data, such as voice data, is not output through the speaker 115 of the terminal 10db, not because of the error or trouble in the speaker, but due to activation of the mute function of the microphone at the terminal 10aa.

Referring now to FIGS. 5 and 6, operation of obtaining the operation state of the terminal 10aa and displaying the operation state icon onto the display 120ba of the terminal 10ba, performed by the transmission system 1 before the terminal 10ba starts videoconference with any other terminal 10, is explained according to an example embodiment of the present invention.

Figure 5A:
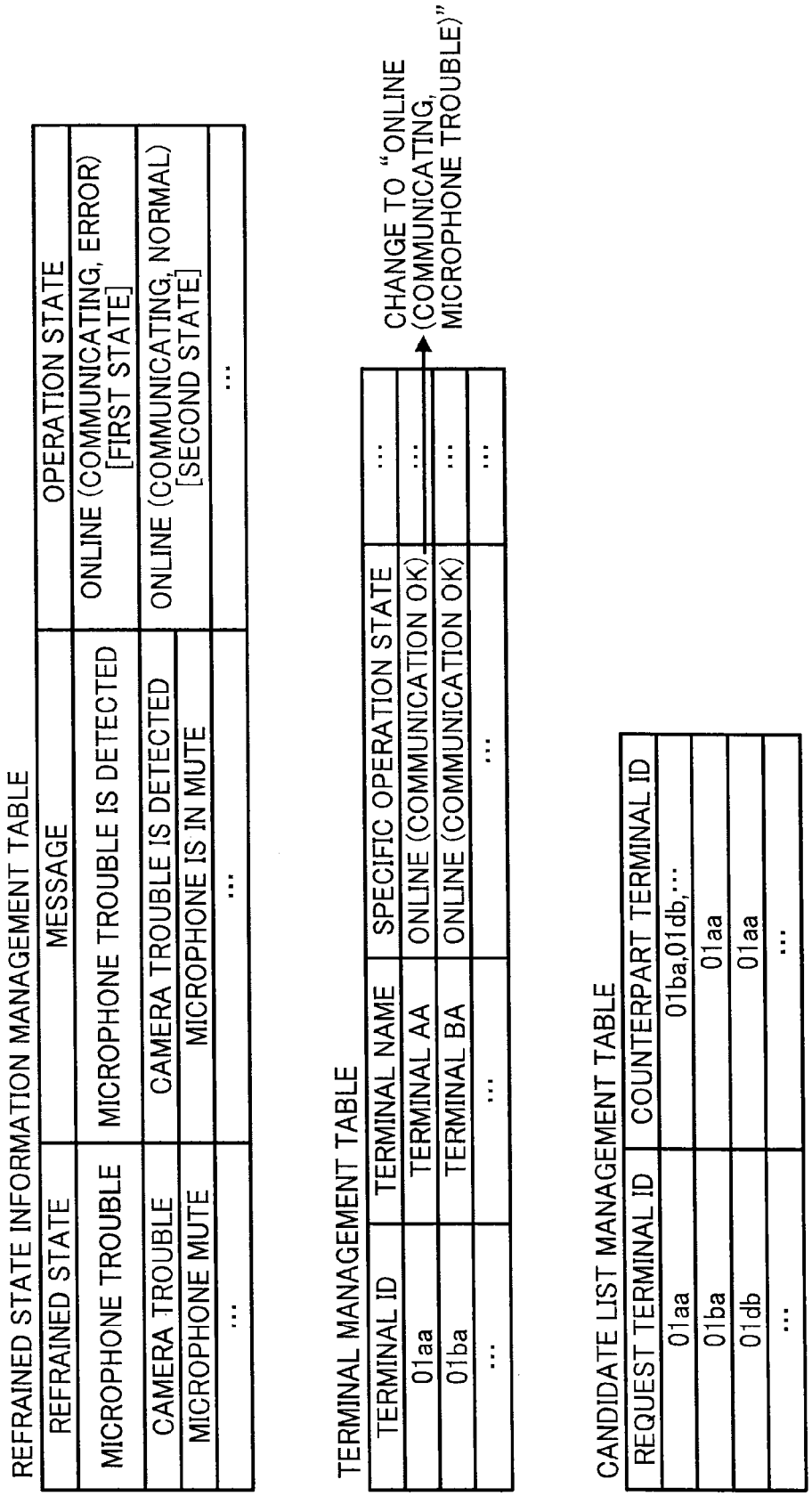
FIGS. 5A and 5B are an illustration for explaining operation of obtaining an operation state of one terminal for display through another terminal before the terminals starts communication.
Figure 6A:
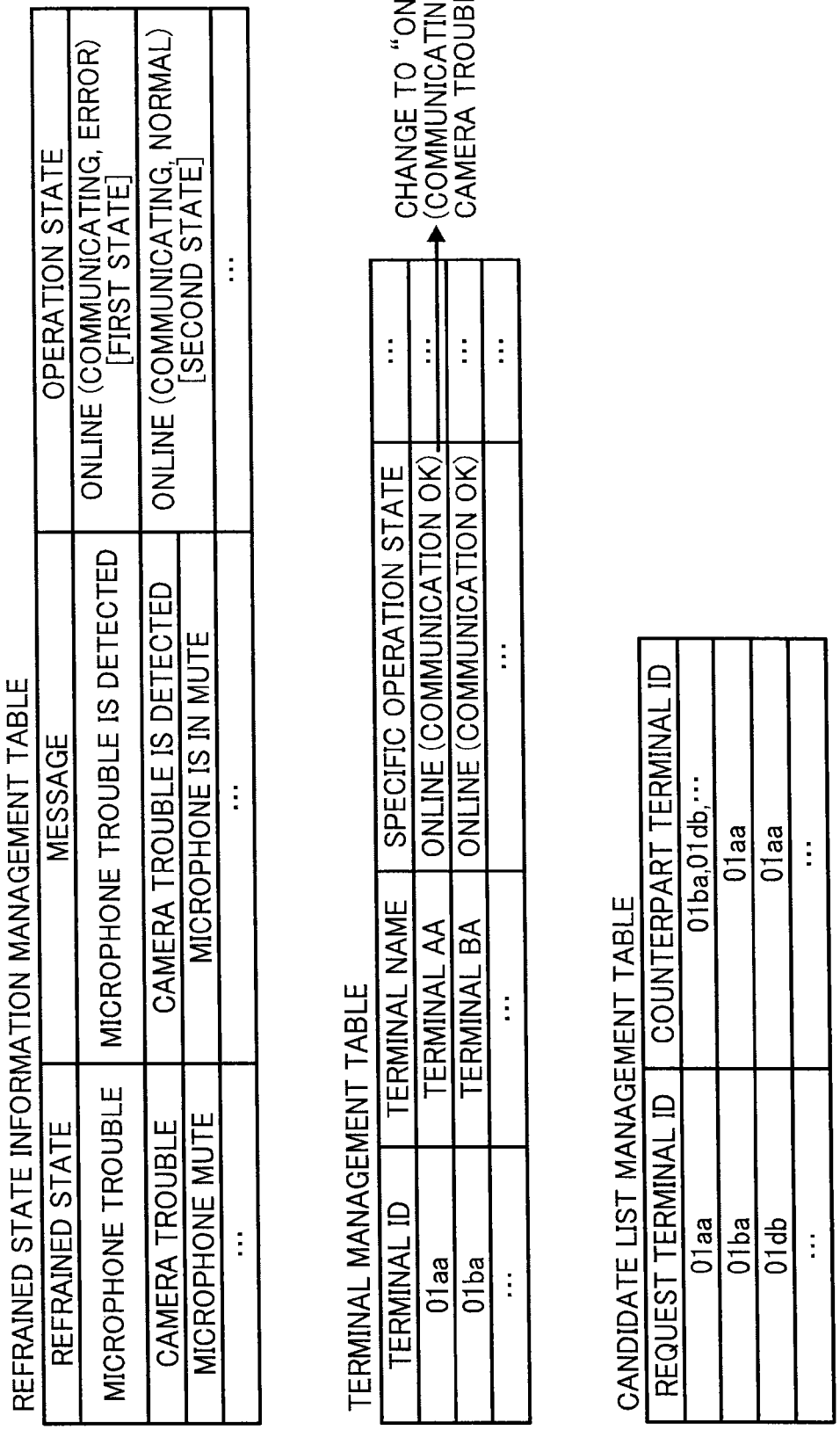
FIGS. 6A and 6B are an illustration for explaining operation of obtaining an operation state of one terminal for display through another terminal before the terminals starts communication.

As illustrated in FIGS. 5A and 6A, the management system 5 stores the candidate list management table in addition to the terminal management table and the refrained state information management table. The candidate list management table stores the terminal ID of the request terminal and the terminal ID of the candidate counterpart terminal in association with each other.

The terminal management table of FIGS. 5A and 6A further stores, for each one of the terminal IDs, the specific operation state information indicating the current specific operation state of the terminal having the corresponding terminal ID. The specific operation state information indicates a refrained state of the terminal 10, in addition to indication of its online state and communication state. For example, assuming that the current specific operation state of the terminal 10aa having the terminal ID "01aa" is online and available for communication, the specific operation state information is "online, communication OK". Assuming that the current specific operation state of the terminal 10aa having the terminal ID "01aa" is online and communicating but the microphone is in trouble, the operation state information is "online, communicating, microphone trouble".

The refrained state information management table of FIGS. 5A and 6A each further stores, for each one of the refrained states being stored, the operation state information specifying the operation state of the terminal 10 when the terminal 10 has a specific refrained state. The operation state information is mainly classified into a first state and a second state, depending on the contents of the refrained state information. In one example, the first state is referred to as an error state, and the second state is referred to as a normal state, as described below referring to FIG. 24A. In another example, the first state is referred to as a trouble state, and the second state is referred to as a normal state, as described below referring to FIG. 24B.

The operation state information indicating that the terminal 10 is in error state ("first state") is assigned, when the refrained state of the terminal 10 is caused due to a trouble in function of transmission or reception of voice data, or inputting or outputting of voice data, such that the users at different sites are not longer able to carry out communication verbally. Referring to FIG. 24A, one example of the error state, or the first state, is the case where the function of the terminal 10 relating to transmission or input of voice data is not provided, for example, due to the microphone trouble, thus causing the refrained state of the terminal 10. For instance, if the microphone does not work, sounds such as voices of the user at the terminal 10 is not input to the terminal 10 such that the sound data including voice data is not transmitted to the other side. The other example of the error state is the case where the function of the terminal 10 relating to reception or output of voice data is not provided, for example, due to the speaker trouble, thus causing the refrained state of the terminal 10. For instance, if the speaker does not work, sound data such as voice data received from the other side is not output through the speaker at the terminal 10. In any of these cases, the terminal 10 has the operation state "online, communicating, error". The first state, which may be referred to as the error state, may be alternatively referred to as the "trouble state", "failure state", "malfunction state", "inactivation state", "freeze state", "fault state", "problem state", "abnormal state", "defect state", "temporarily stopped state", or "inappropriate state".

Further, the error state in which the function of the terminal 10 relating to transmission or reception, or input or output, of voice data is not provided includes the case where the function of the terminal 10 relating to transmission or receiption, or input or output, of sound data is not provided. If sound data is not exchanged, for example, due to the failure in hardware or software of devices of the terminal 10, voice data is not most likely to be exchanged between the different sites. However, there may be a case where sound data is transmitted from one site to the other site, but the user at the other site is not able to recognize the voices of the user, for example, due to noises in the sound data. If such state can be detected as the refrained state, such state may be defined to be the error state as the function of the terminal 10 relating to transmission or input of voice data is not provided to carry out communication at least verbally. For the descriptive purposes, however, the voice data and the sound data may be used interchangeably in this specification.

The operation state information indicating that the terminal 10 is in normal state ("second state") is assigned, when the refrained state of the terminal 10 is caused due to a trouble in function of transmission (input) or reception (output) of image data, or to the refrained state of the terminal 10 that is attributable to activation of the mute function with respect to the function of transmission or reception of sound data such as voice data or image data.

Referring to FIG. 24A, one example of the normal state, or the second state, is the case where the function of the terminal 10 relating to transmission or input of image data is not provided, for example, due to the camera trouble, thus the image data of the user at one side is not transmitted to the other side. The other example of the normal state is the case where the function of the terminal 10 relating to reception or output of image data is not provided, for example, due to the display trouble, thus the image data of the user at the other side is not displayed at this side. In any of these cases, the terminal 10 has the operation state "online, communicating, normal". Although videoconference is not carried out due to failure in input or output of image data, the users can still communicate with each other based on transmission or reception of voice data to carry out teleconference. Since communication can be carried out, the operation state information for this state is "online, communicating, normal".

Other examples of the normal state, or the second state, include the case where the function of the terminal 10 that is related to commutation is not provided, for example, due to activation of the microphone mute function, thus causing the refrained state of the terminal 10. In such case, the terminal 10 has the operation state "online, communicating, normal". The second state, which may be referred to as the normal state, may be alternatively referred to as the "fine state", "ordinary state", "appropriate state", "usual state", or "non-error state".

In the above-describe examples, the operation state information stored in the refrained state information management table is mainly classified into the error state and the normal state. Alternatively, the operation state information stored in the refrained state information management table can be mainly classified into a trouble state ("first state") and a normal state ("second state"), for example, as illustrated in FIG. 24B.

The operation state information indicating that the terminal 10 is in trouble state ("first state") is assigned, when the refrained state of the terminal 10 is caused due to a trouble of the terminal 10 that is related to a communication function. Examples of the trouble state, or the first state, include the case where the function of the terminal 10 that is related to communication is not provided, for example, due to the microphone trouble, thus causing the refrained state of the terminal 10. In such case, the terminal 10 has the operation state "online, communicating, trouble".

The operation state information indicating that the terminal 10 is in normal state ("second state") is assigned, when the refrained state of the terminal 10 is caused due to activation of the mute function with respect to the function of communication. Examples of the normal state, or the second state, include the case where the function of the terminal 10 that is related to communication is not provided, for example, due to activation of the microphone mute function. In such case, the terminal 10 has the operation state "online, communicating, normal".

Referring back to FIGS. 5B and 6B, the terminal 10 stores the operation state icon management table in its memory, in addition to or in alternative to the refrained state icon management table illustrated in FIG. 4. The operation state icon management table stores, for each of the operation states of the terminal 10, image data of an operation state icon representing the operation state of the terminal 10. The operation state icon is to be displayed onto the display 120, for example, as the operation state information regarding the candidate terminal 10. Examples of the operation state icon management table are described below referring to FIGS. 12A and 12B.

Figure 5B:
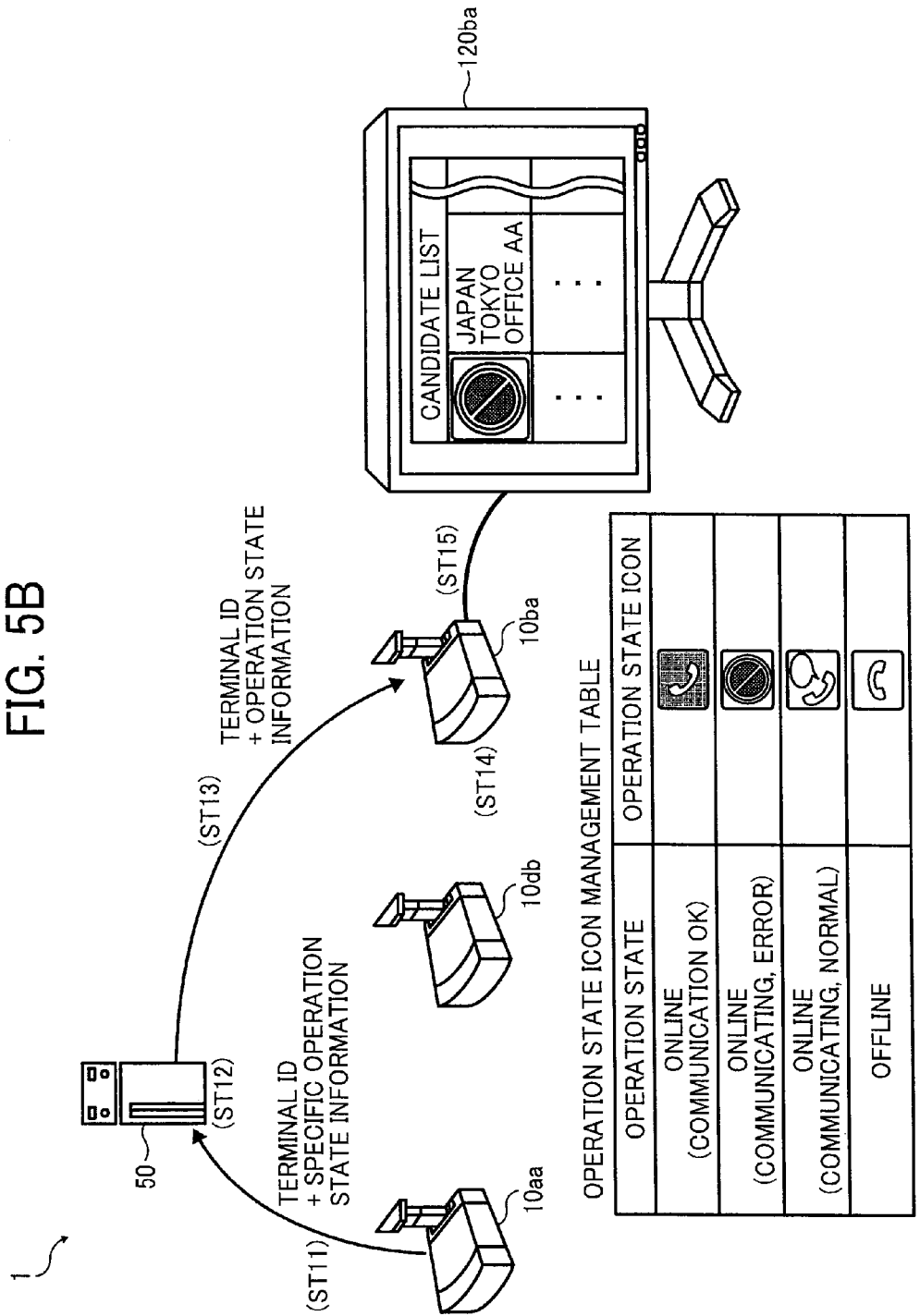

Now, referring to FIGS. 5A and 5B, operation of transmitting the operation state of the terminal 10aa to the terminal 10ba, when the microphone trouble is caused at the terminal 10aa while the terminal 10aa and the terminal 10db are having videoconference, is explained according to an example embodiment of the present invention. In this example, the terminal 10ba is not having videoconference with any one of the terminals 10aa and 10db, but the terminal 10ba lists the terminal 10aa as a candidate terminal such that the terminal 10ba may start communication with the terminal 10aa. Further, in this example, it is assumed that the management system 50 stores the refrained state information management table of FIG. 24A, and the terminal 10 stores the operation state icon management table of FIG. 12A.

At ST11, when the microphone trouble is detected at the terminal 10aa, the terminal 10aa transmits the terminal ID "01aa" of the terminal 10aa, and the specific operation state information to the management system 50. The specific operation state information includes information indicating that the terminal 10aa is online and communicating, and the refrained state information "microphone trouble" indicating that the microphone is in trouble.

At ST 12, the management system 50 searches the refrained state management table using the refrained state information "microphone trouble" of the specific operation state information received from the terminal 10aa to extract the operation state information "online, communicating, error".

Further, at ST12, the management system 50 searches the candidate list management table using the terminal ID "01aa" of the request terminal 10aa as a search key to extract the terminal ID "01ba" of the terminal 10ba that lists the request terminal 10aa as a candidate terminal. In this example, since the terminal 10db having the terminal ID "01db" is already communicating with the terminal 10aa, it is not determined as a candidate terminal for the request terminal 10aa. The management system 50 searches the terminal management table using the extracted terminal ID "01ba" of the candidate terminal 10ba as a search key to extract the specific operation state information "online, communication OK".

At ST13, the management system 50 transmits the terminal ID "01aa" of the terminal 10aa, and the operation state information "online, communicating, error" of the terminal 10aa, to the candidate terminal 10ba.

At ST14, the terminal 10ba searches the operation state icon management table using the operation state information "online, communicating, error" as a search key to obtain the image data of the operation state icon representing "online, communicating, error".

At ST15, the terminal 10ba cause the display 120ba to display a candidate list including the operation state icon being obtained for the terminal 10aa to indicate that the terminal 10aa is in "online, communicating, error" state.

With the display of operation state information indicating whether the terminal 10aa is in normal state or error state, the user at the terminal 10ba is able to know whether the user can start communication with the terminal 10aa beforehand. More specifically, when the refrained state information is received from the terminal 10aa, the management system 50 determines whether the refrained state of the terminal 10aa indicates an error state ("first state") where communication is not available or a normal state ("second state") where communication is available, and notifies the user at the terminal 10ba of whether communication with the terminal 10aa is available before the terminal 10ba starts communication with the terminal 10aa. Since the user at the terminal 10ba is able to know that the terminal 10aa is in error state in case the terminal 10aa is not capable of communicating, the user at the terminal 10ba is refrained from starting communication with the terminal 10aa even when the terminal 10aa is not available.

In case the display 120ba of the terminal 10ba has already displayed the operation state icon of the terminal 10aa indicating that the terminal 10aa is online, communicating, normal, before the terminal 10ba receives the operation state information indicating the current state of the terminal 10aa from the management system 50, the operation state icon of the terminal 10aa is changed to the operation state icon indicating that the terminal 10aa is online, communicating, error, when the operation state information indicating the current state of the terminal 10aa is received.

Figure 6B:
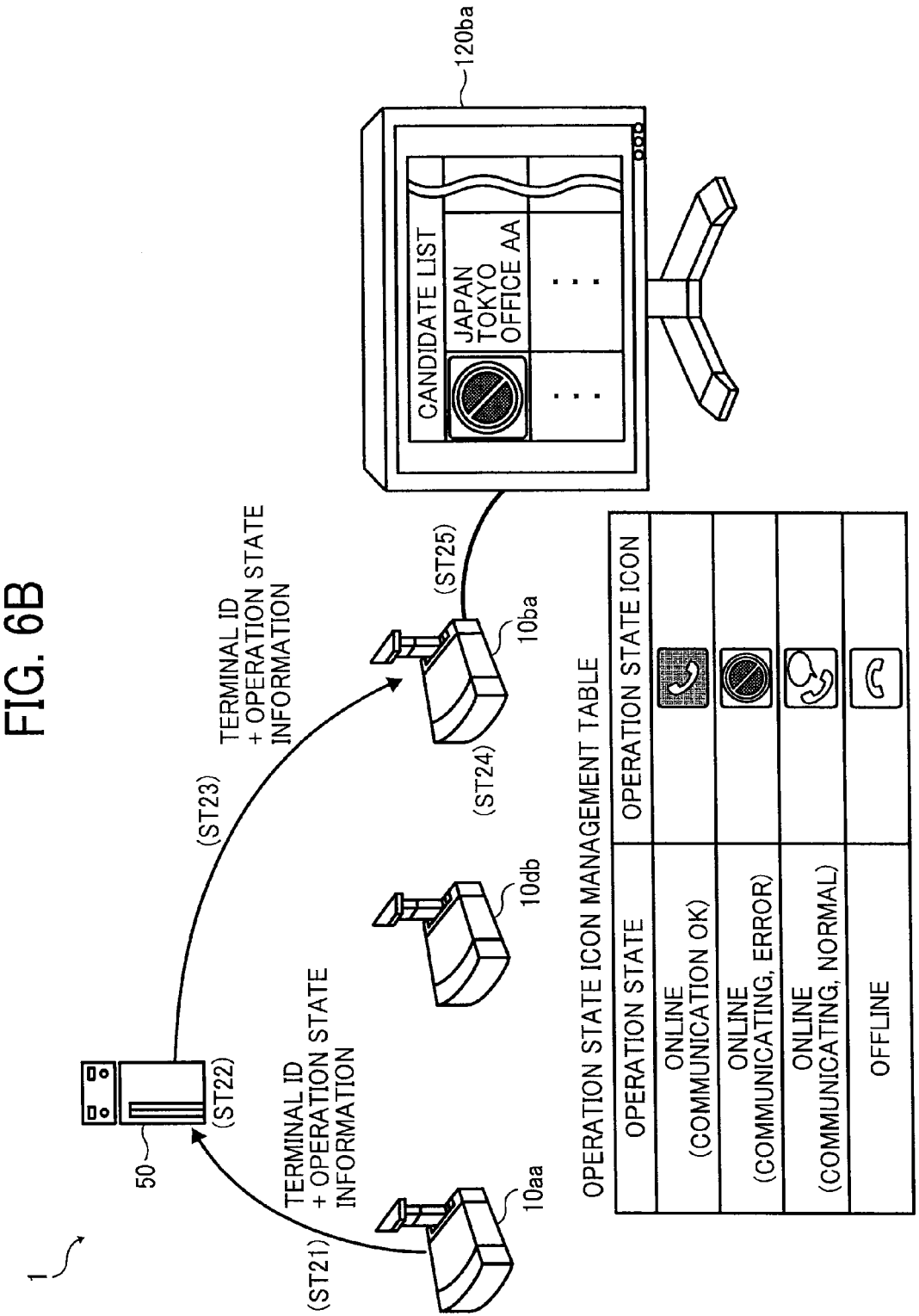

Referring now to FIGS. 6A and 6B, operation of transmitting the operation state of the terminal 10aa to the terminal 10ba, when the camera trouble is caused at the terminal 10aa while the terminal 10aa and the terminal 10db are having videoconference, is explained according to an example embodiment of the present invention. In this example, the terminal 10ba is not having videoconference with any one of the terminals 10aa and 10db, but lists the request terminal 10aa as a candidate terminal for the terminal 10ba. Further, in this example, it is assumed that the management system 50 stores the refrained state information management table of FIG. 24A, and the terminal 10 stores the operation state icon management table of FIG. 12A.

At ST21, when the camera trouble is detected at the terminal 10aa, the terminal 10aa transmits the terminal ID "01aa" of the terminal 10aa, and the specific operation state information to the management system 50. The specific operation state information includes information indicating that the terminal 10aa is online and communicating, and the refrained state information "camera trouble" indicating that the camera is in trouble.

At ST22, the management system 50 searches the refrained state management table using the refrained state information "camera trouble" of the specific operation state information received from the terminal 10aa to extract the operation state information "online, communicating, normal", and transmits the extracted operation state information of the terminal 10aa to the terminal 10ba. The management system 50 obtains information regarding the candidate terminal 10ba as described above referring to FIG. 5.

At ST24, the terminal 10ba searches the operation state icon management table using the operation state information "online, communicating, normal" as a search key to obtain the image data of the operation state icon representing "online, communicating, normal".

At ST25, the terminal 10ba causes the display 120ba to display a candidate list including the operation state icon being obtained for the terminal 10aa to indicate that the terminal 10aa is in online, communicating, normal state.

In case the display 120ba of the terminal 10ba has already displayed the operation state icon of the terminal 10aa indicating that the terminal 10aa is online, communicating, normal, before the terminal 10ba receives the operation state information indicating the current state of the terminal 10aa from the management system 50, the operation state icon of the terminal 10aa is changed to the operation state icon indicating that the terminal 10aa is online, communicating, normal, when the operation state information indicating the current state of the terminal 10aa is received. However, since the image data of the icon is not changed, it may not be noticeable to the user.

As described above, when the camera trouble is detected at the terminal 10aa, the counterpart terminal 10db that is currently communicating with the terminal 10aa is notified that the camera trouble occurs as described above referring to FIG. 4. However, the user at the candidate terminal 10ba, who has not started communication with the terminal 10aa, does not have to have such detailed information as long as information indicating whether communication can be started is obtainable. Since teleconference can be carried out by the terminal 10aa even when the camera is in trouble, the management system 50 sends the operation state information to cause the display 120ba of the terminal 10ba to display the operation state icon indicating "online, communicating, normal".

In this example, the refrained state icon indicating the refrained operation state of the terminal 10aa can be displayed through the display 120ba of the terminal 10ba, as long as the refrained state icon management table is provided in the terminal 10ba. However, based on such settings, the display 120ba would display a refrained state icon for each one of the candidate counterpart terminals 10 for the terminal 10ba in addition to other information regarding the candidate counterpart terminals 10. Since a number of candidate terminals 10 that are registered for one terminal 10 tends to be quite large, with the display of a large number of refrained state icons, the user at the terminal 10ba, who is just about to select one or a few of the candidate terminals 10 to initiate communication, may feel inconvenient. When displaying the candidate list to the user at the terminal 10ba for the purpose of selecting a counterpart terminal, the management system 50 sends the operation state information indicating "online, communicating, normal" in case the refrained state of the terminal 10aa is in normal state ("second state") or sends the operation state information indicating "online, communicating, error" in case the refrained state of the terminal 10aa is in error state ("first state"). Since the terminal 10ba displays the operation state icon indicating "online, communicating, normal" or "online, communicating, error" on the display 120ba, the user is able to easily select one or a few of the candidate terminals 10 to initiate communication.

In the above-described examples illustrated in FIGS. 5 and 6, it is assumed that the first state of the operation state is the error state where communication is not available, and the second state of the operation state is the normal state where communication is available.

Alternatively, the first state of the operation state may be defined to be the trouble state where the trouble in hardware or software resources at the terminal 10 is detected, and the second state of the operation state may be defined to be the normal state where the terminal 10 normally operates. More specifically, referring to FIGS. 5A and 6A, the operation state for the refrained state "microphone trouble" is the "online, communicating, trouble", which is the first state. The operation state for the refrained state "camera trouble" is the "online, communicating, trouble", which is the first state. The operation state for the refrained state "microphone mute" is the "online, communicating, normal", which is the second state.

Referring now to FIGS. 5A and 5B, operation of transmitting the operation state of the terminal 10aa to the terminal 10ba, when the microphone trouble is caused at the terminal 10aa while the terminal 10aa and the terminal 10db are having videoconference, is explained according to an example embodiment of the present invention. In this example, it is assumed that the management system 50 stores the refrained state information management table of FIG. 24B, in alternative to the refrained state information management table of FIG. 24A. Further, it is assumed that the terminal 10 stores the operation state icon management table of FIG. 12B, in alternative to the refrained state information management table of FIG. 12A.

At ST11, when the microphone trouble is detected at the terminal 10aa, the terminal 10aa transmits the terminal ID "01aa" of the terminal 10aa, and the specific operation state information to the management system 50. The specific operation state information includes information indicating that the terminal 10aa is online and communicating, and the refrained state information "microphone trouble" indicating that the microphone is in trouble.

At ST12, the management system 50 searches the refrained state management table using the refrained state information "microphone trouble" of the specific operation state information received from the terminal 10aa to extract the operation state information "online, communicating, trouble".

Further, at ST12, the management system 50 searches the candidate list management table using the terminal ID "01aa" of the request terminal 10aa as a search key to extract the terminal ID "01ba" of the candidate terminal 10ba that lists the request terminal 10aa as a candidate terminal. The management system 50 searches the terminal management table using the extracted terminal ID "01ba" of the terminal 10ba as a search key to extract the specific operation state information "online, communication OK".

At ST13, the management system 50 transmits the terminal ID "01aa" of the terminal 10aa, and the operation state information "online, communicating, trouble" of the terminal 10aa, to the candidate terminal 10ba.

At ST14, the terminal 10ba searches the operation state icon management table using the operation state information "online, communicating, trouble" as a search key to obtain the image data of the operation state icon representing "online, communicating, trouble".

At ST15, the terminal 10ba causes the display 120ba to display a candidate list including the operation state icon being obtained for the terminal 10aa to indicate that the terminal 10aa is in online, communicating, trouble state.

With the display of operation state information indicating whether the terminal 10aa is in normal state or trouble state, the user at the terminal 10ba is able to know whether the user can start communication with the terminal 10aa beforehand without any restriction. More specifically, when the refrained state information is received from the terminal 10aa, the management system 50 determines whether the refrained state of the terminal 10aa indicates a trouble state ("first state") where trouble is detected or a normal state ("second state") where no trouble is detected, and notifies the user at the terminal 10ba of whether communication with the terminal 10aa can be performed without any restriction before the terminal 10ba starts communication with the terminal 10aa. Since the user at the terminal 10ba is able to know that the terminal 10aa is in trouble state in case the terminal 10aa is having trouble, the user at the terminal 10ba is refrained from starting communication with the terminal 10aa when the terminal 10aa is not available to have videoconference.

In case the display 120ba of the terminal 10ba has already displayed the operation state icon of the terminal 10aa indicating that the terminal 10aa is online, communicating, normal, before the terminal 10ba receives the operation state information indicating the current state of the terminal 10aa from the management system 50, the operation state icon of the terminal 10aa is changed to the operation state icon indicating that the terminal 10aa is online, communicating, trouble, when the operation state information indicating the current state of the terminal 10aa is received.

Referring now to FIGS. 6A and 6B, operation of transmitting the operation state of the terminal 10aa to the terminal 10ba, when activation of microphone mute function ("microphone mute") is caused at the terminal 10aa while the terminal 10aa and the terminal 10db are having videoconference, is explained according to an example embodiment of the present invention. In this example, the terminal 10ba is not having videoconference with any one of the terminals 10aa and 10db, but lists the request terminal 10aa as a candidate terminal for the terminal 10ba. Further, in this example, it is assumed that the management system 50 stores the refrained state information management table of FIG. 24B, and the terminal 10 stores the operation state icon management table of FIG. 12B.

At ST21, when the microphone mute is detected at the terminal 10aa, the terminal 10aa transmits the terminal ID "01aa" of the terminal 10aa, and the specific operation state information to the management system 50. The specific operation state information includes information indicating that the terminal 10aa is online and communicating, and the refrained state information "microphone mute" indicating that the microphone is in mute.

At ST22, the management system 50 searches the refrained state management table using the refrained state information "microphone mute" of the specific operation state information received from the terminal 10aa to extract the operation state information "online, communicating, normal", and transmits the extracted operation state information of the terminal 10aa to the candidate terminal 10ba. The management system 50 obtains information regarding the candidate terminal 10ba as described above referring to FIG. 5.

At ST24, the terminal 10ba searches the operation state icon management table using the operation state information "online, communicating, normal" as a search key to obtain the image data of the operation state icon representing "online, communicating, normal".

At ST25, the terminal 10ba causes the display 120ba to display a candidate list including the operation state icon being obtained for the terminal 10aa to indicate that the terminal 10aa is in online, communicating, normal state.

In case the display 120ba of the terminal 10ba has already displayed the operation state icon of the terminal 10aa indicating that the terminal 10aa is online, communicating, and normal, before the terminal 10ba receives the operation state information indicating the current state of the terminal 10aa from the management system 50, the operation state icon of the terminal 10aa is changed to the operation state icon indicating that the terminal 10aa is online, communicating, and normal, when the operation state information indicating the current state of the terminal 10aa is received. However, since the image data of the icon is not changed, it may not be noticeable to the user.

As described above, when the microphone mute is detected at the terminal 10aa, the counterpart terminal 10db that is currently communicating with the terminal 10aa is notified that the microphone mute is selected as described above referring to FIG. 4. However, the user at the candidate terminal 10ba, who has not started communication with the terminal 10aa, does not have to have such detailed information as long as information indicating whether communication can be started is obtainable. Since videoconference can be carried out by the terminal 10aa even when the microphone mute is selected, the management system 50 sends the operation state information to cause the display 120*ba* of the terminal 10*ba* to display the operation state icon indicating "online, communicating, normal".

Referring now to FIGS. 7 to 36, example operation performed by the transmission system 1 is explained.

<Hardware Structure of Transmission System>

Figure 7:
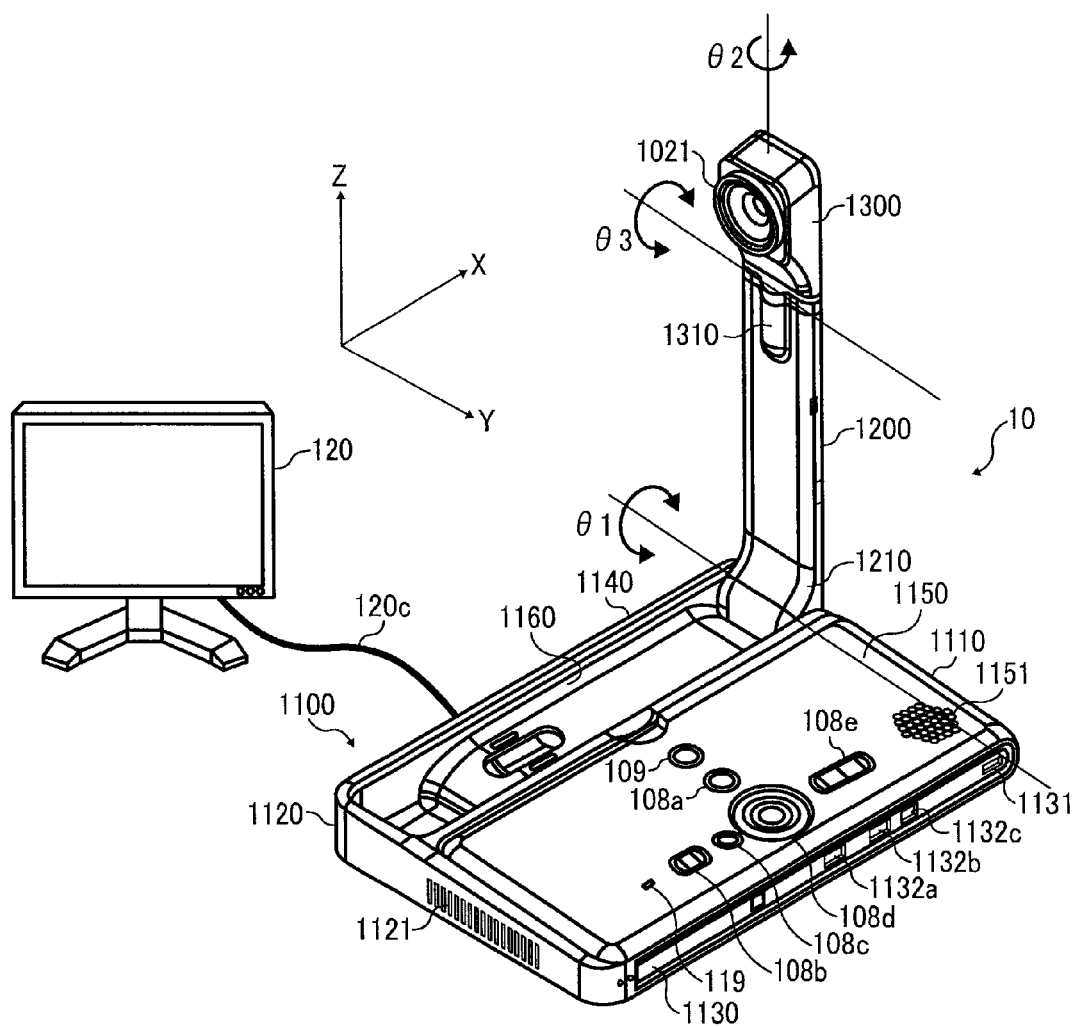
FIG. 7 is a perspective view illustrating the outer appearance of a transmission terminal of the transmission system of FIG. 1.

FIG. 7 is a perspective view illustrating the outer appearance of the transmission terminal 10 of the transmission system of FIG. 1. In FIG. 7, the longitudinal direction of the terminal 10 is referred to as x direction. The direction orthogonal to the x direction, which is the horizontal direction of the terminal 10, is referred to as the y direction. The direction orthogonal to the x direction and the y direction is referred to as the z direction.

As illustrated in FIG. 7, the terminal 10 includes a body 1100, an arm 1200, and a camera housing 1300. The body 1100 includes a back side wall 1110 having a plurality of air intake holes that are formed over the nearly entire surface of the intake surface of the back side wall 1110. The body 1100 further includes a front side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 8) of the terminal 10 is able to catch sounds such as human voice or any sound including noise.

Figure 8:
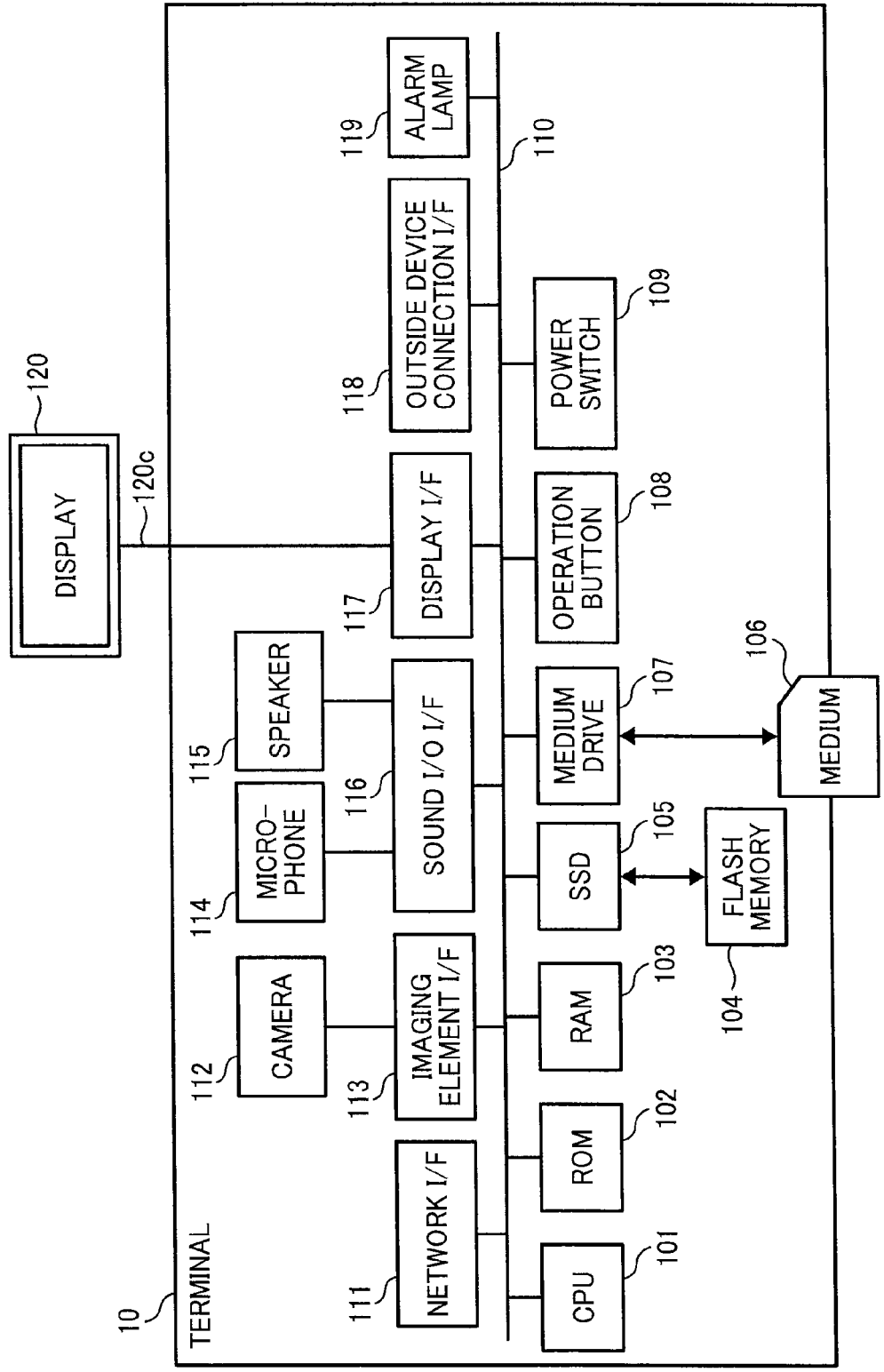
FIG. 8 is a schematic block diagram illustrating a hardware structure of the transmission terminal of FIG. 1.

The body 1100 has an operation panel 1150, which is provided at a front surface toward the right side wall 1130. The operation panel 1150 includes a plurality of operation buttons 108*a* to 108*e* ("the operation button 108"), a power switch 109, an alarm lamp 119, and a plurality of sound output holes 1151. Through the sound output holes 1151, a speaker 115 (FIG. 8) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132*a* to 1132*c* ("connection ports 1132"). The connection ports 1132 allow electrical connection to an external device through an outside device connection I/F 118 (FIG. 8). The body 1100 further includes a left side wall 1140, which is provided with a connection port to connect the external display 120 to the display I/F 117 through a cable 120*c*.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 7 illustrates the case where the tilt angle θ1 is 90 degrees.

The camera housing 1300 incorporates therein the camera 112 (FIG. 8) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 7, the pan angle θ2 and the tilt angle θ3 are each 0 degree.

The relay terminal 30, the management system 50, the program providing system 90, and the maintenance system 100 are each implemented by a general-purpose computer such as a personal computer or a server computer. For simplicity, explanation of the outer appearance of the computer is omitted.

FIG. 8 is a schematic block diagram illustrating a hardware structure of the transmission terminal 10. As illustrated in FIG. 8, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10B. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 7 and 8, the display 120 is connected to the display I/F 117 through the cable 120*c*. The cable 120*c* may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 7). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 9:
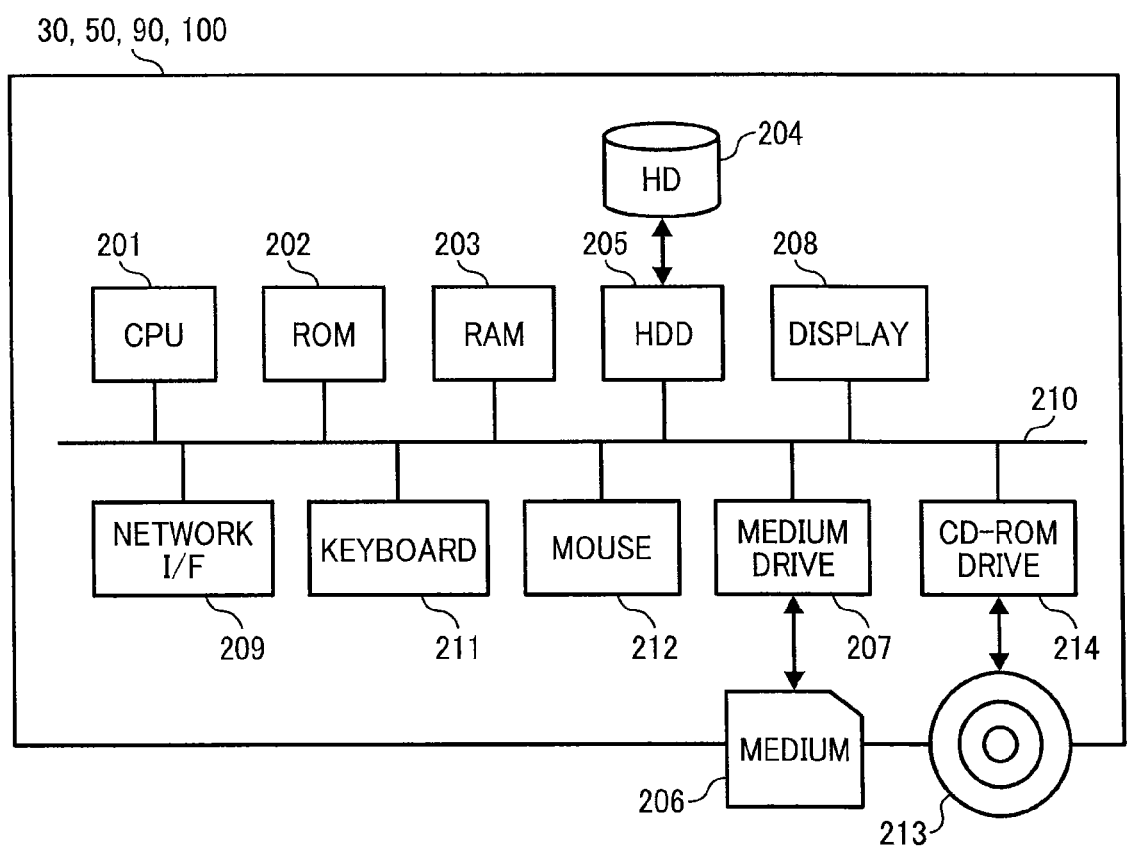
FIG. 9 is a schematic block diagram illustrating a hardware structure of any one of the transmission management system, relay terminal, program providing system, and maintenance system of the transmission system of FIG. 1.

FIG. 9 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The transmission management program may be written onto a recording medium that is readable by a general-purpose computer such as the recording medium 206 or the CD-ROM 213 in any format that is installable or executable by a general-purpose computer. Once the transmission management program is written onto the recording medium, the recording medium may be distributed. Further, the transmission management program may be stored in any desired memory other than the HD 204, such as the ROM 202.

The relay terminal 30 is substantially similar in hardware structure to the management system 50 of FIG. 9, except for replacement of the management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management system 50 of FIG. 9, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

Figure 10:
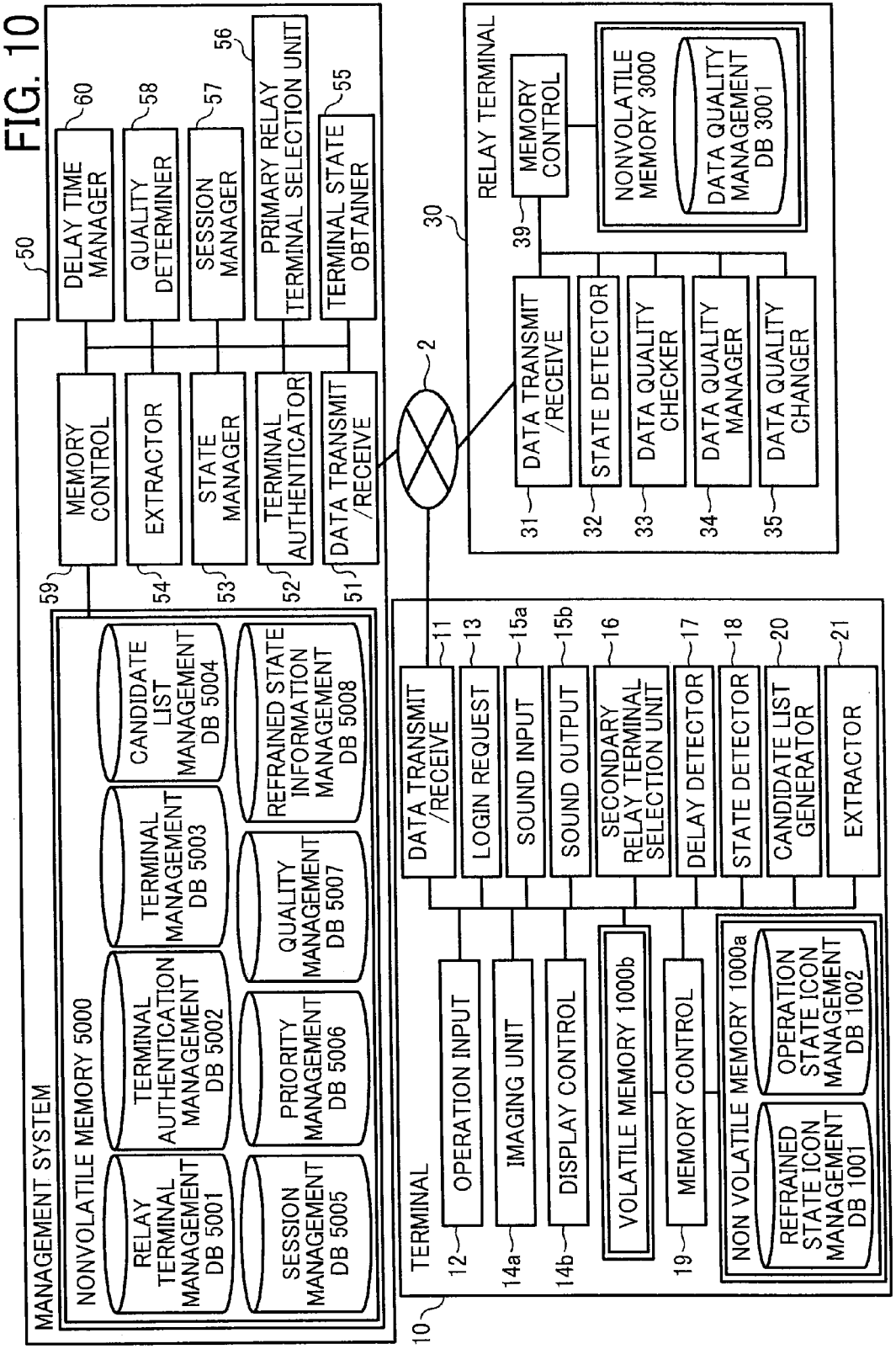
FIG. 10 is a schematic block diagram illustrating a functional structure of the transmission system of FIG. 1.

Next, a functional structure of the transmission system of FIG. 1 is explained according to an example embodiment of the present invention. FIG. 10 is a schematic block diagram illustrating functional structures of the transmission system 1. As illustrated in FIG. 10, the terminal 10, the relay terminal 30, and the management system 50 exchange data with one another through the communication network 2. In FIG. 1, the program providing system 90 and the maintenance system 100 of FIG. 1 are omitted.

<Functional Structure of Terminal>

The terminal 10 includes a data transmit/receive 11, an operation input 12, a login request 13, an imaging unit 14a, a display control 14b, a sound input 15a, a sound output 15b, a secondary relay terminal selection unit 16, a delay detector 17, a state detector 18, a memory control 19, a candidate list generator 20, and an extractor 21. These units shown in FIG. 10 correspond to a plurality of functions or functional modules, which are executed according to an instruction of the CPU 101 (FIG. 8) that is generated according to the terminal control program being loaded from the flash memory 104 onto the RAM 103.

The terminal 10 further includes a nonvolatile memory 1000a that may be implemented by the flash memory 104 of FIG. 8, and a volatile memory 1000b that may be implemented by the RAM 103 of FIG. 8.

(Refrained State Icon Management Table)

The nonvolatile memory 1000a includes a refrained state icon management database (DB) 1001 that stores therein a refrained state icon management table of FIG. 11. The refrained state icon management table of FIG. 11 stores image data of the refrained state icon in association with the refrained state information indicating the refrained state of the terminal 10. The image data of the refrained state icon is to be displayed onto the display 120.

In one example, the refrained state of the terminal 10 is any state that refrains the user at the terminal 10 from communicating with the user at the counterpart terminal 10, for example, due to a trouble related to a communication function of the terminal 10. As described above referring to FIG. 4, examples of the refrained state of the terminal 10 include the microphone trouble where the function of collecting sounds is not provided by the microphone 114, the camera trouble where the function of capturing the image is not provided by the camera 112, the speaker trouble where the function of outputting sounds is not provided by the speaker 115, and the display trouble where the function of causing displaying image data is not provided by the display I/F 117 or the display 120. The refrained state icon that is stored in association with the refrained state shows a graphical image representing a specific device, such as microphone, camera, speaker, or display, with the "X" being overlapped over the graphical image.

In another example, the refrained state of the terminal 10 may be any state in which the function of the terminal 10 related to a communication function is restricted or turned off, in response to activation of a mute function. Examples of the refrained state caused due to activation of this mute function include, but not limited to, the microphone mute where the function of collecting sounds by the microphone 114 is temporarily inactivated, the camera off where the function of capturing an image provided by the camera 112 is temporarily inactivated, the speaker mute where the function of outputting sounds provided by the speaker 115 is temporarily inactivated, and the display off where the function of displaying image data provided by the display 120 through the display I/F 117 is temporarily inactivated. The refrained state icon that is stored in association with the refrained state shows a graphical image representing a specific device, such as microphone, camera, speaker, or display, with the "/" being overlapped over the graphical image.

(Operation State Icon Management Table)

The nonvolatile memory 1000a further includes an operation state icon management database (DB) 1002 that stores therein an operation state icon management table of FIG. 12A or 12B. The operation state icon management table stores, for each type of the operation states of the terminal 10, image data of an operation state icon representing each type of the operation state. The image data of the operation state icon is to be displayed onto the display 120, as information indicating the operation state of a candidate counterpart terminal 10 of the terminal 10.

Referring to FIG. 12A, the operation state icon management table stores: the operation state "online, communication OK" indicating that the terminal 10 is online and not communicating, and is available for communication; the operation state "online, communicating, error" indicating that the terminal 10 is online and communicating, and is in error state ("first state"); the operation state "online, communicating, normal" indicating that the terminal 10 is online and communicating, and is in normal state ("second state"); and the operation state "offline" indicating that the terminal 10 is offline.

More specifically, the operation state "online, communicating, error" is where the candidate counterpart terminal 10 is communicating with another terminal 10, but is in the refrained state caused by, for example, the trouble in microphone 114 or speaker 115 such that the function of transmitting (inputting) or receiving (outputting) voice data is not provided. In such case, the user at the terminal 10 is not able to communicate with a user at the counterpart terminal 10 even using the teleconference function, and this refrained state of the terminal 10 is defined to be the error state.

The operation state "online, communicating, normal" is any case in which the candidate counterpart terminal 10 is communicating with another terminal 10, but is in the refrained state caused by, for example, the trouble in camera 112 or display I/F 117 such that the function of transmitting (inputting) or receiving (outputting) image data is not provided. In such case, the user at the terminal 10 is able to communicate with the user at the counterpart terminal 10 using the teleconference function, based on transmission and reception of voice data. This refrained state of the terminal 10 is defined to be the normal state.

In another example, the operation state "online, communicating, normal" is any case in which the counterpart terminal 10 is communicating with another terminal 10, but is in the refrained state caused by activation of the mute function of the counterpart terminal 10 such that the function of transmitting or receiving image data or voice data is at least partially restricted. For example, examples of such mute state include the microphone mute state, speaker mute state, camera off state, and display off state. In such case, since the refrained state of the counterpart terminal 10 is not caused by a trouble or an error, this refrained state of the counterpart terminal 10 that is caused by activation of the mute function is defined to be the normal state.

Further, the "online, communicating, normal" state includes the case where no refrained state is detected such that the terminal 10 is communicating with another terminal 10 without any trouble.

Referring to FIG. 12B, the operation state icon management table stores: the operation state "online, communication OK" indicating that the terminal 10 is online and not communicating, and is available for communication; the operation state "online, communicating, trouble" indicating that the terminal 10 is online and communicating, and is in trouble state; the operation state "online, communicating, normal" indicating that the terminal 10 is online and communicating, and is in normal state; and the operation state "offline" indicating that the terminal 10 is offline.

The operation state "online, communicating, trouble" is any case in which the candidate counterpart terminal 10 is communicating with another terminal 10, but in the refrained state caused by, for example, the trouble in microphone 114, speaker 115, camera 112, or display I/F 117, such that the function related to communication is not provided. In such case, the user at the terminal 10 is not able to communicate with a user at the counterpart terminal 10 to carry out videoconference, and this refrained state of the terminal 10 is defined to be the trouble state.

The operation state "online, communicating, normal" is any case in which the candidate counterpart terminal 10 is communicating with another terminal 10, but is in the refrained state caused by activation of the mute function of the counterpart terminal 10 such that the function related to communication is at least partially restricted. For example, examples of such mute state include the microphone mute state, speaker mute state, camera off state, and display off state. In such case, since the refrained state of the counterpart terminal 10 is not caused by a trouble or an error, this refrained state of the counterpart terminal 10 that is caused by activation of the mute function is defined to be the normal state.

Further, the "online, communicating, normal" state includes the case where no refrained state is detected such that the terminal 10 is communicating with another terminal 10 without any trouble.

Referring now to FIGS. 8 and 10, a functional structure of the terminal 10 is explained according to an example embodiment of the present invention. More specifically, in this example, the operations or functions that are performed by the terminal 10, which include the operations or functions performed by the units shown in FIG. 10, are performed in relation to one or more hardware devices of the terminal 10 that are shown in FIG. 8.

The data transmit/receive 11, which may be implemented by the network I/F 111 (FIG. 8) under control of the CPU 101, transmits or receives various data or information to or from another terminal, device, or system, through the communication network 2. In this example, the data transmit/receive 11 starts receiving the operation state information that indicates the operation state of each candidate counterpart terminal 10 from the management system 50, before starting communication with any counterpart terminal 10B. The operation state of the candidate terminal 10 indicates whether the candidate terminal 10 is on-line and is available ("online, communication OK"), on-line and having a session but in trouble or error ("online, communicating, trouble" or "online, communicating, error"), on-line and having a session without any trouble or error ("online, communicating, normal"), or off-line ("offline").

The operation input 12 receives a user instruction input by the user through the operation button 108 or the power switch 109 (FIG. 8), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101 (FIG. 8). When the power of the terminal 10 is turned on, the login request 13 automatically causes the data transmit/receive 11 to send login request information that requests the login process, and a current IP address of the terminal 10, to the management system 50 through the communication network 2. When the power of the terminal 10 is turned off according to a user instruction received from the user through the power switch 109, the login request 13 causes the data transmit/receive 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is off-line in realtime.

The operations or functions of the imaging unit 14*a* of the terminal 10 are performed by the camera 112 and the imaging element I/F 113 according to an instruction received from the CPU 101 (FIG. 8). The imaging unit 14*a* takes an image of an object to output image data of the object.

The operations or functions of the sound input 15*a* of the terminal 10 are performed by the sound I/O I/F 116 according to an instruction received from the CPU 101, in cooperation with the microphone 114. After the microphone 114 converts voice of the user at the terminal 10 to a voice signal, the sound input 15*a* inputs the voice signal in the form of voice data for further processing. The operations or functions of the sound output 15*b* of the terminal 10 are performed by the sound I/O I/F 116 according to an instruction received from the CPU 101, in cooperation with the speaker 115. The sound output 15*b* outputs a voice signal of voice data that is received from the counterpart terminal 10 through the speaker 115.

The operations or functions of the display control 14*b* of the terminal 10 of FIG. 10 are performed by the display I/F 117 according to an instruction received from the CPU 101.

Figure 27:
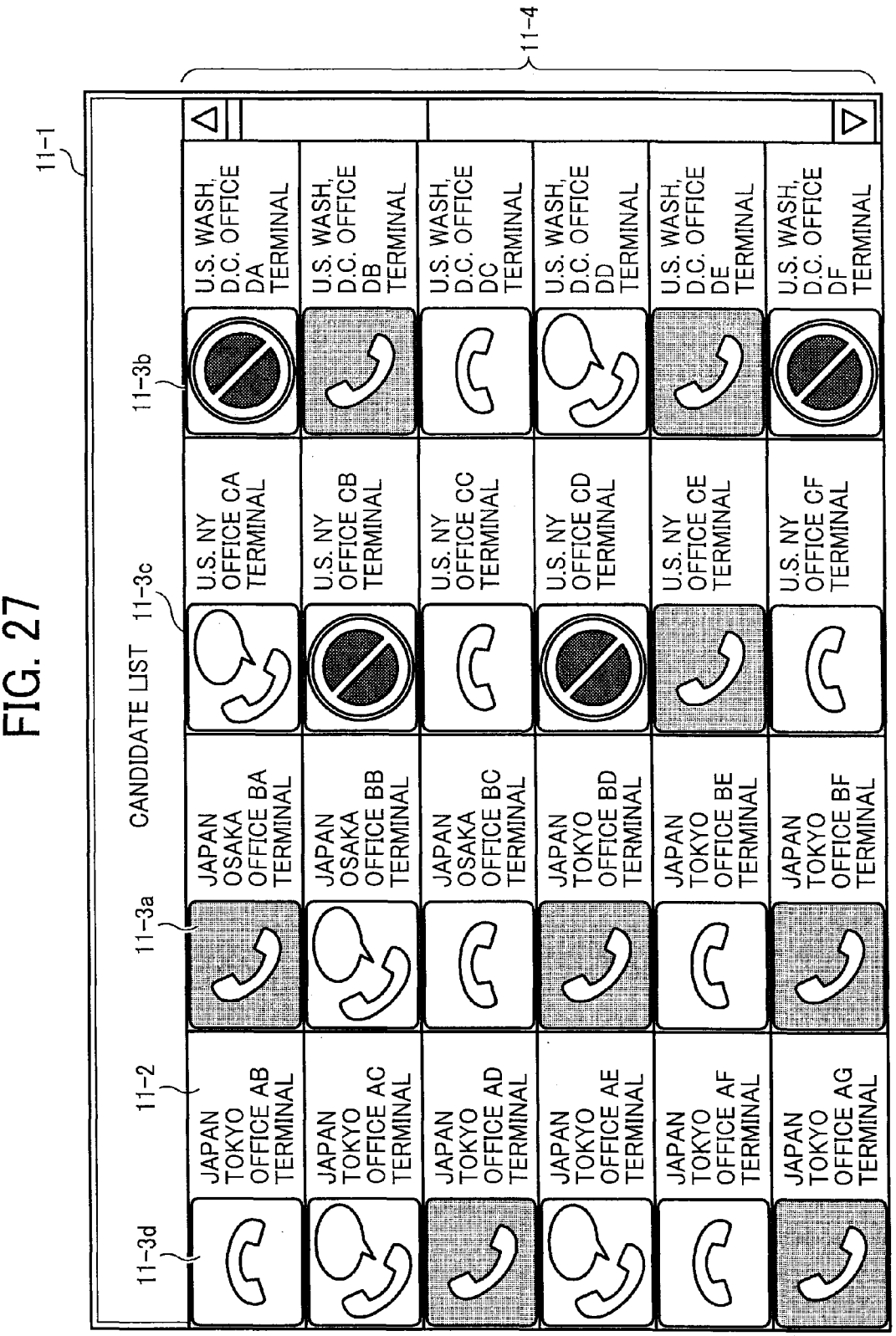
FIG. 27 is an illustration for explaining a screen including a candidate terminal list.

The display control 14*b* controls transmit of image data to the display 120. More specifically, the display control 14*b* causes the display 120 that is provided for the request terminal 10A to display a candidate list before the request terminal 10A starts videoconference with a desired counterpart terminal 10B. The candidate list is generated based on the operation state information of the candidate terminal 10 that is received by the data transmit/receive 11 after the request terminal 10A establishes communication with the management system 50. For example, the display control 14*b* may display a candidate list frame 11-1 as illustrated in FIG. 27. Within the candidate list frame 11-1, the display 120 further displays a terminal name 11-2 of each candidate terminal 10, which may be any type of identification information for identifying each candidate terminal 10. For example, the terminal name 11-2 for the terminal 10*ab* of FIG. 1 may be expressed as "JAPAN TOKYO OFFICE AB TERMINAL".

For each candidate terminal 10, an icon that reflects the operation state of each candidate terminal 10 is displayed side by side with the terminal name 11-2. In this example, four types of icons 11-3*a*, 11-3*b*, 11-3*c*, and 11-3*d* are displayed depending on the operation state of the candidate terminal 10. These icons 11-3*a*, 11-3*b*, 11-3*c*, and 11-3*d* are displayed based on information stored in the operation state icon management table of FIG. 12A or 12B. For the descriptive purposes, any one of the icons 11-3*a* to 11-3*d* is referred to as the icon 11-3.

Within the candidate list frame 11-1, the display 120 further displays a scroll bar 11-4 at the right side. According to selection of one of the arrows made by the user at the terminal 10, the display 120 scrolls up or down to show a complete list of terminal names 11-2 of candidate terminals 10 and icons 11-3 each of which reflects the operation state of each candidate terminal 10.

Further, as described above referring to FIG. 4, the display control 14*b* of the terminal 10*db* causes the display 120*db* to display the refrained state icon and a corresponding message "AA terminal microphone is in mute", below an image of the user at the request terminal 10*aa*, when information indicating that the request terminal 10*aa* is in the refrained state "microphone mute" is received.

Figure 13:
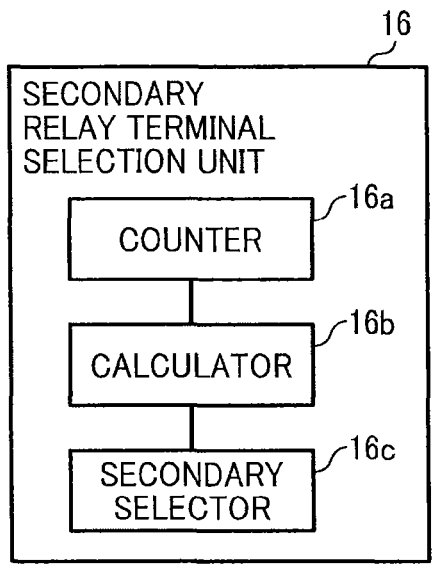
FIG. 13 is a schematic block diagram illustrating a functional structure of a secondary selection unit of the terminal of FIG. 10.

The secondary relay terminal selection unit 16 selects one of the relay terminals 30 that is suitable for communication to start videoconference. More specifically, according to an instruction received from the CPU 101 (FIG. 8), the secondary relay terminal selection unit 16 performs selection of the relay terminal 30 using a counter 16*a*, a calculator 16*b*, and a secondary selector 16*c*, as illustrated in FIG. 13.

The counter 16*a* obtains date and time information indicating the date and time at which the data transmit/receive 11 of the terminal 10 receives preparatory transmit information when the preparatory transmit information is transmitted from another terminal 10. The calculator 16*b* calculates a time period T between the time when the preparatory information is transmitted by another terminal 10 and the time when the preparatory information is received at the terminal 10, based on the difference between the time and date information obtained by the counter 16*a* and time and date information included in the preparatory transmit information. The secondary selector 16*b* selects one of the relay terminals 10 having the minimum value of the time period t calculated by the calculator 16*b*.

The delay detector 17 detects a delay time ms indicating a time period in which contents data such as image data or voice data sent through the relay terminal 30 from another terminal 10 is delayed, according to an instruction received from the CPU 101 (FIG. 8).

The state detector 18 detects the operation state of the terminal 10 at its own site, for example, whether the terminal 10 is online or offline, or whether the terminal 10 is refrained from having communication. For example, the state detector 18 detects whether any trouble is detected in a device providing the communication function of the terminal 10, such as the microphone 114, camera 112, speaker 115, or display I/F 117. Further, the state detector 18 detects whether any mute function, or restriction processing, relating to the communication function of the terminal 10 is activated, such as activation of the microphone mute, speaker mute, display off, or camera off. When the trouble or mute activation is detected, the state detector 18 determines that the terminal 10 is in the refrained state.

The memory control 19 is implemented by the SSD 105 of FIG. 8 according to an instruction received from the CPU 101. The memory control 19 stores various data in the nonvolatile memory 1000a, or reads out various data from the nonvolatile memory 1000a. The nonvolatile memory 1000a stores therein various data such as terminal identification (ID) information for identifying the terminal 10, and a password for authenticating a user at the terminal 10. The memory control 19 further stores various data in the volatile memory 1000b, or reads out various data from the volatile memory 1000b. The volatile memory 1000b stores therein image data and/or voice data received as the terminal 10 communicates with a counterpart terminal 10 such that the image data and/or voice data are overwritten. Before the image data is overwritten, an image generated based on the image data is displayed onto the display 120. Before the voice data is output, sounds generated based on the voice data is output through the speaker 150.

The candidate list generator 20 generates or updates a candidate list, based on the candidate list information and operation state information of the candidate terminal 10 that are respectively received from the management system 50. For example, as illustrated in FIG. 27, the candidate list includes the icon 11-3 that reflects the current state of each candidate terminal 10.

In this example, any one of the terminal ID of the terminal 10 and the relay terminal ID of the relay terminal 30 includes any type of identification information that can be expressed by any language, character, symbol, mark, or any combination of language, character, symbol, and mark.

In one example, the extractor 21 searches the refrained state icon management DB 1001 (FIG. 11) stored in the nonvolatile memory 1000a, using the refrained state information of the counterpart terminal 10, such as information indicating detection of a microphone trouble, as a search key to extract image data of the refrained state icon that is stored with respect to the refrained state information. In another example, the extractor 21 searches the operation state icon management DB 1002 (FIG. 12A or 12B) using the operation state information of the counterpart terminal 10, such as information indicating that the terminal 10 is online and available for communication "online, communication OK", to extract image data of the operation state icon that is stored with respect to the operation state information. The display control 14b causes the display 120 to display an image based on the extracted image data of the refrained state icon or the operation state icon.

In this example, the terminal 10 allows the user to activate the mute state of the communication function of the terminal 10. For example, the operation button 108 includes at least one of: a microphone mute switch that causes the microphone 114 to be in the mute on state or mute off state; a speaker volume adjuster button that causes the speaker 115 to be in the mute off state through adjusting the speaker volume level; a camera on/off switch that causes the camera 112 to stop capturing images or the imaging element I/F to stop sending images; and a display on/off switch that causes the display 120 to stop displaying images or the display I/F 117 to stop sending images to be displayed.

Further, any one of the camera 112, the microphone 114, and the speaker 115 may be implemented by an external device that may be connected to the terminal 10. In such case, the mute function of the external microphone or the external speaker may be detected in a substantially similar manner as described in U.S. patent application Ser. No. 13/194,057.

<Functional Structure of Relay Terminal>

Now, a functional structure of the relay terminal 30 is explained. The relay terminal 30 includes a data transmit/receive 31, a state detector 32, a data quality checker 33, a data quality manager 34, a data quality changer 35, and a memory control 39. These units shown in FIG. 10 correspond to a plurality of functions or functional modules, which are executed according to an instruction of the CPU 201 (FIG. 9) that is generated according to the relay terminal control program being loaded from the HD 204 onto the RAM 203.

The relay terminal 30 further includes a nonvolatile memory 3000 that may be implemented by the HD 204 (FIG. 9). Any data stored in the nonvolatile memory 3000 is prevented from being deleted even after the power of the relay terminal 30 is turned off.

(Data Quality Management Table)

The memory 3000 includes a data quality management database (DB) 3001, which stores a data quality management table illustrated in FIG. 15. The data quality management table of FIG. 15 stores an Internet protocol (IP) address of the counterpart terminal 10B to which image data is transmitted through the relay terminal 30, in association with quality of image data to be transmitted through the relay terminal 30 to the counterpart terminal 10B.

<Functional Structure of Relay Terminal>

Next, a functional structure of the relay terminal 30 is explained according to an example embodiment of the present invention. More specifically, in this example, the operations or functions that are performed by the relay terminal 30, which include the operations or functions performed by the units shown in FIG. 10, are performed in relation to one or more hardware devices of the relay terminal 30 that are shown in FIG. 9.

The data transmit/receive 31, which may be implemented by the network I/F 209 (FIG. 9), transmits or receives various data or information to or from another terminal, device, or system, through the communication network 2, under control of instructions received from the CPU 201.

The state detector 32, which is implemented by the CPU 201 of FIG. 9, detects an operation state of the relay terminal 30. For example, the operation state includes the on-line state ("ON LINE") and the off-line state ("OFF LINE"). The on-line state is a state in which the relay terminal 30 is turned on and available for data transmission/reception. The off-line state is a state in which the relay terminal 30 is not available for data transmission/reception, for example, as the power is not turned on.

The data quality checker 33, which is implemented by the CPU 201 of FIG. 9, searches the data quality management DB 3001 (FIG. 15) using the IP address of the counterpart terminal 10B as a search key to extract information regarding the quality of image data suitable to communication with the counterpart terminal 108.

The data quality manager 34, which may be implemented by the CPU 201 of FIG. 9, changes the contents of the data quality management DB 3001 based on the quality information that is received from the management system 50. For example, assuming that the request terminal 10aa having the terminal ID "01aa" communicates with the counterpart terminal 10db having the terminal ID "01db" to transmit or receive high quality image data during videoconference, transmission of image data may delay for various reasons. For example, if a request terminal 10bb and a counterpart terminal 10ca start videoconference over the communication network 2, transmission of image data from the request terminal 10aa to the counterpart terminal 10db tends to slow down due to the increase in traffic. In such case, the relay terminal 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 9, changes the quality of image data received from the request terminal 10 to the quality of image data according to the contents of the data quality management DB 3001. The memory control 39 is implemented by the HDD 205 of FIG. 9 according to an instruction received from the CPU 201. The memory control 39 stores various data in the nonvolatile memory 3000, or reads out various data from the nonvolatile memory 3000.

<Functional Structure of Management System>

The management system 50 includes a data transmit/receive 51, a terminal authenticator 52, a state manager 53, an extractor 54, a terminal state obtainer 55, a primary relay terminal selection unit 56, a session manager 57, a quality determiner 58, a memory control 59, and a delay time manager 60. These units shown in FIG. 10 correspond to a plurality of functions or functional modules, which are executed according to an instruction of the CPU 201 (FIG. 9) that is generated according to the transmission management program being loaded from the HD 204 onto the RAM 203. The management system 50 further includes a nonvolatile memory 5000, which stores various data or information in a manner such that the stored data is prevented from being deleted even after the power of the management system 50 is turned off. The nonvolatile memory 5000 may be implemented by the HD 204 of FIG. 9. Further, in this example, the nonvolatile memory 5000 stores therein information regarding the candidate list frame 11-1 of FIG. 27.

(Relay Terminal Management Table)

The nonvolatile memory 5000 includes a relay terminal management database (DB) 5001, which stores therein a relay terminal management table of FIG. 16. The relay terminal management table of FIG. 16 stores, for each relay terminal ID of the terminal 10, the operation state of the relay terminal 30, the received date and time at which the management system 50 receives the operation state information indicating the operation state of the relay terminal 30 from the relay terminal 30, the IP address of the relay terminal 30, and the maximum data transmission speed of the relay terminal 30 in Mbps. For example, for the relay terminal 30a having the relay terminal ID "111a", the relay terminal management table indicates that the operation state is "ON LINE", the received date and time at which the management system 50 receives the operation state information is "13:00 PM of Nov. 10, 2009", the IP address of the relay terminal 30a is "1.2.1.2", and the maximum data transmission speed of the relay terminal 30a is 100 Mbps.

(Terminal Authentication Management Table)

The nonvolatile memory 5000 further includes a terminal authentication management database (DB) 5002, which stores a terminal authentication management table of FIG. 17.

The terminal authentication management table of FIG. 17 stores a plurality of terminal IDs respectively assigned to the terminals 10 that are managed by the management system 50, in association with a plurality of passwords that are previously determined for the respective terminals 10. For example, referring to the terminal authentication management table of FIG. 17, the terminal 10aa having the terminal ID "01aa" is assigned with the password "aaaa".

(Terminal Management Table)

The nonvolatile memory 5000 further includes a terminal management database (DB) 5003, which stores a terminal management table of FIG. 18. The terminal management table of FIG. 18 stores, for each one of the terminal IDs assigned to the terminals 10, the terminal name to be used for communication with the terminal 10, the specific operation state of the terminal 10, the received date and time at which the management system 50 receives the login request information from the terminal 10, and the IP address of the terminal 10.

For example, for the terminal 10aa having the terminal ID "01aa", the terminal management table of FIG. 18 indicates that the terminal name is "Japan Tokyo Office AA terminal", the operation state is online ("ONLINE") and is available for communication ("COMMUNICATION OK"), the received date and time is "13:40 PM, Nov. 10, 2009", and the IP address of the terminal 10aa is "1.2.1.3".

In this example, the specific operation state information provides more detailed information than the operation state information managed by the operation state icon management DB 1002 (FIG. 12) such that the specific operation state information additionally provides the refrained state information of the terminal 10. More specifically, in addition to information indicating whether the terminal 10 is online or offline, and whether communicating or not communicating, the specific operation state information includes the refrained state information indicating the refrained state of the terminal 10 when the terminal 10 is in the refrained state. The refrained state information indicates what caused the refrained state of the terminal 10 in which the user at the terminal 10 is refrained from communicating through the terminal 10 to another terminal 10. In one example, the refrained state information indicates the refrained state caused by activation of mute function relating to the communication function of the terminal 10 such as the microphone mute, camera off, speaker mute, or display off. In another example, the refrained state information indicates the refrained state caused by a trouble in a device providing the communication function of the terminal 10 such as the microphone trouble, camera trouble, speaker trouble, or display trouble. In this example, the display trouble includes the trouble in display I/F 117 of the terminal 10.

(Candidate List Management Table)

The nonvolatile memory 5000 further includes a candidate list management database (DB) 5004, which stores a candidate list management table of FIG. 19. The candidate list management table of FIG. 19 stores, for each one of a plurality of request terminals 10A capable of requesting for videoconference communication, the terminal ID of the request terminal 10A, and one or more terminal IDs that are respectively assigned to candidate terminals 10 that are previously registered for the request terminal 10A. In this example, for the request terminal 10A, one or more terminals 10 of the communication system 1 of FIG. 1 are previously registered as the candidate terminal 10. For example, the candidate list management table of FIG. 19 indicates that the request terminal 10aa having the terminal ID "01aa" is most likely to request for videoconference with respect to the terminal 10ab having the terminal ID "01*ab*", the terminal 10*ba* having the terminal ID "01*ba*", and the terminal 10*bb* having the terminal ID "01*bb*", etc. The management system 50 manages the candidate list management table of FIG. 19, for example, according to a user instruction received from any one of the terminals 10. For example, in response to a user instruction received from the terminal 10*aa*, the management system 50 may add or delete the contents of the candidate list management table of FIG. 19.

(Session Management Table)

The nonvolatile memory 5000 further includes a session management database (DB) 5005, which stores a session management table of FIG. 20. The session management table of FIG. 20 stores information regarding each of the sessions that are carried out by at least two terminals 10 of the transmission system 1 for the purpose of selecting the relay terminal 30 that is most suitable for communication between at least two terminals 10. More specifically, for each session ID that uniquely identifies each session, the session management table of FIG. 20 stores a relay terminal ID of the relay terminal 30 to be used for transmitting or receiving contents data such as image data and voice data, a terminal ID of the request terminal 10A, a terminal ID of the counterpart terminal 10B, a delay time ms indicating a time period required for receiving contents data at the counterpart terminal 10B, the date and time information indicating the time at which the management system 50 receives delay information from the counterpart terminal 10B.

For example, referring to the session management table of FIG. 20, for the session having the session ID "se1", the relay terminal 30*a* having the relay terminal ID "111*a*" is selected to relay contents data between the request terminal 10*aa* having the terminal ID "01*aa*" and the counterpart terminal 10*db* having the terminal ID "01*db*". Further, the management system 50 receives the delay information from the counterpart terminal 10*db* at 14:00 PM, Nov. 10, 2009. Based on this date and time information, the delay time ms of 200 milliseconds (ms) is obtained. In case of having videoconference between only two terminals 10, the delay time may be determined based on the time when the management system 50 receives the delay information transmitted from the request terminal 10A rather than based on the time when the management system 50 receives the delay information transmitted from the counterpart terminal 10B. In case of having videoconference with more than two terminals 20, the delay information transmitted from the counterpart terminal 10 that receives the contents data is used to manage the date and time at which the delay information is received.

(Address Priority Management Table)

The memory 5000 further includes a priority management database (DB) 5006, which stores an address priority management table of FIG. 21. The address priority management table of FIG. 21 defines a number of address priority points to be assigned to an arbitrary set of terminal 10 and relay terminal 30 based on the degree of similarity between the IP address of the terminal 10 and the IP address of the relay terminal 30. Assuming that the IP address of the terminal 10 and the IP address of the relay terminal 30 are each expressed in the form of four digital numbers as described above referring to FIG. 1, as the degree of similarity between the terminal IP address and the relay terminal IP address increases, a larger number of address priority points is assigned. In FIG. 21, the "S" indicates that one digit of the IP address, which may be referred to as the dot address, is the same for both of the terminal 10 and the relay terminal 30. The "D" indicates that one digit of the IP address, or the dot address, is different between the terminal 10 and the relay terminal 30.

More specifically, in this example, when the first to third digits or dot addresses are the same between the terminal 10 and the relay terminal 30, the address priority point is 5. When the first and second digits or dot addresses are the same between the terminal 10 and the relay terminal 30, the address priority point is 3. In such case, the fourth digit or dot address does not affect the address priority point. When the first digit or dot address is the same between the terminal 10 and the relay terminal 30, the address priority point is 1. In such case, the third and fourth digits or dot addresses do not affect the address priority point. When the first digit or dot address is different between the terminal 10 and the relay terminal 30, the address priority point is 0. In such case, the second to fourth digits or dot addresses do not affect the address priority point.

(Transmission Speed Priority Management Table)

The priority management DB 5006 of the memory 5000 further includes a transmission speed priority management table of FIG. 22. The transmission speed priority management table of FIG. 22 stores a range of the maximum data transmission speeds in association with a transmission speed priority point. More specifically, the transmission speed priority management table of FIG. 22 indicates that the transmission speed priority point increases with the increase in value of the maximum data transmission speeds at the relay terminal 30. For example, referring to FIG. 22, when the maximum data transmission speed at the relay terminal 30 is equal to or greater than 1000 Mbps, the transmission speed priority point of 5 is assigned. For example, when the maximum data transmission speed at the relay terminal 30 is equal to or greater than 100 Mbps but less than 1000 Mbps, the transmission speed priority point of 3 is assigned. When the maximum data transmission speed at the relay terminal 30 is equal to or greater than 10 Mbps but less than 100 Mbps, the transmission speed priority point of 1 is assigned. When the maximum data transmission speed at the relay terminal 30 is less than 10 Mbps, the transmission speed priority point of 0 is assigned.

(Quality Management Table)

The nonvolatile memory 5000 further includes a quality management database (DB) 5007, which stores a quality management table of FIG. 23. The quality management table of FIG. 23 stores the delay time ms of image data in association with the quality of image data. More specifically, the quality management table of FIG. 23 indicates that the quality of image data to be processed by the relay terminal 30 is lowered, as the delay time ms of the image data at the request terminal 10A or the counterpart terminal 10B increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

(Refrained State Information Management Table)

The nonvolatile memory 5000 further includes a refrained state information management database (DB) 5008, which stores a refrained state information management table of FIG. 24A or 24B. The refrained state information management tables of FIGS. 24A and 24B each stores, for each refrained state information indicating a specific refrained state of the request terminal 10A, a message to be transmitted to the counterpart terminal 10B, and operation state information of the request terminal 10A.

The operation state information that is stored in the refrained state information management table indicates whether the corresponding refrained state of the terminal 10 is defined to be the first state or the second state.

As illustrated in FIG. 24A, in one example, the first state is defined to be the refrained state caused by a trouble in the function of the terminal 10 that is related to transmission or reception, or input or output, of voice data, which may be referred to as the error state. Examples of the error state include the microphone trouble and speaker trouble. The second state is defined to be the refrained state caused by a trouble in the function of the terminal 10 that is related to transmission or reception, or input or output, of image data, or the refrained state caused by activation of the mute function of the terminal 10 with respect to the function of communicating, which may be referred to as the normal state. Examples of the normal state include the camera trouble, display trouble, microphone mute, camera off, speaker mute, and display off.

The operation state information stored in the refrained state information management table of FIG. 24A corresponds to the operation state information stored in the operation state icon management table of FIG. 12A. With this correspondence in contents of the operation state information between these two tables, the management system 50 and the terminal 10 are able to share information regarding the operation state information.

As illustrated in FIG. 24B, in another example, the first state is defined to be the refrained state caused by a trouble in the function of the terminal 10 with respect to the function of communicating, which may be referred to as the trouble state. Examples of the trouble state include the microphone trouble, camera trouble, speaker trouble, and display trouble. The second state is defined to be the refrained state caused by activation of the mute function of the terminal 10 with respect to the function of communicating, which may be referred to as the normal state. Examples of the normal state include the microphone mute, camera off, speaker mute, and display off.

The operation state information stored in the refrained state information management table of FIG. 24B corresponds to the operation state information stored in the operation state icon management table of FIG. 12B. With this correspondence in contents of the operation state information between these two tables, the management system 50 and the terminal 10 are able to share information regarding the operation state information.

Referring back to FIGS. 24A and 24B, the refrained state information management table stores text data of a message to be displayed onto the display 120 of the counterpart terminal 10B to indicate the specific refrained state of the request terminal 10A. For example, the message "microphone is in mute" is stored in association with the refrained state "microphone mute" such that when the terminal 10A is in the refrained state "microphone mute", the message "microphone is in mute" is displayed onto the display 120 of the counterpart terminal 10B.

(Functional Structure of Management System)

Next, a functional structure of the management system 50 is explained according to an example embodiment of the present invention. In this example, the operations or functions that are performed by the management system 50, which include the operations or functions performed by the units shown in FIG. 10, are performed in relation to one or more hardware devices of the management system 50 that are shown in FIG. 9.

The data transmit/receive 51, which may be implemented by the network I/F 209 (FIG. 9) according to an instruction received from the CPU 201, transmits or receives various data or information to or from another terminal, device, or system through the communication network 2.

Under control of the CPU 201 (FIG. 9), the terminal authenticator 52 obtains a terminal ID and a password from the login request information that is received from the data transmit/receive 51. Using the terminal ID and the password as a search key, the terminal authenticator 52 searches the terminal authentication management DB 5002 (FIG. 17) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 9), manages the specific operation state of the request terminal 10 that sends the login request information, or the specific operation state indicating the refrained state of the request terminal 10 such as the mute state or the trouble state of the terminal 10, using the terminal management DB 5003 (FIG. 18).

More specifically, when the login request information is received from the request terminal 10AA, the state manager 53 stores, in the terminal management DB 5003 (FIG. 18), the terminal ID of the request terminal 10A, the specific operation state of the request terminal 10A, the date and time at which the management system 50 receives the login request information from the request terminal 10A, and the IP address of the request terminal 10A.

In another example, when the power of the terminal 10 is switched from the ON state to the OFF state according to a user instruction received through the power switch 109, the state manager 53 receives the operation state information of the terminal 10 indicating that the terminal 10 is turned off, from the terminal 10. Based on the operation state information of the terminal 10, the state manager 53 changes the specific operation state information of the terminal 10 that is stored in the terminal management DB 5003 from the on-line state to the off-line state.

In another example, when the management system 50 receives the specific operation state information including the refrained state information from the request terminal 10A, the state manager 53 updates the contents of the terminal management DB 5003 (FIG. 18) to reflect the specific operation state information that is received from the request terminal 10A.

The extractor 54, which operates according to an instruction received from the CPU 201 (FIG. 9), searches the candidate list management DB 5004 (FIG. 19) using the terminal ID of the request terminal 10A that sends the login request information as a key to obtain a list of terminal IDs each being assigned to a plurality of candidate terminals 10 for the request terminal 10A. For example, in the example case illustrated in FIG. 19, assuming that the terminal 10 that sends the login request information has the terminal ID "01ab", the terminal IDs "01aa", "01ca" and "01cb" are extracted as the candidate counterpart terminal 10 for the terminal 10ab.

Additionally, the extractor 54 searches the candidate list management DB 5004 (FIG. 19) using the terminal ID of the request terminal 10A that sends the login request as a key to obtain a terminal ID of another request terminal 10A that registers the request terminal 10A as a candidate terminal for another request terminal 10A. For example, in the example case illustrated in FIG. 19, assuming that the terminal 10 that sends the login request information has the terminal ID "01ba", the terminal ID "01aa" and the terminal ID "01db" are extracted as the candidate request terminal 10 that has registered the terminal 10ba as a candidate counterpart terminal 10B.

Further, the extractor 54 searches the candidate list management DB 5004 (FIG. 19) using the terminal ID of the request terminal 10A that sends the specific operation state information indicating detection of a refrained state, as a key to obtain a terminal ID of the candidate request terminal 10A that registers the request terminal 10A that sends the refrained state information as a candidate counterpart terminal 10B. For example, in the example case illustrated in FIG. 19, assuming that the terminal 10 that sends the specific operation state information including the refrained state information has the terminal ID "01ba", the terminal ID "01aa" and the terminal ID "01db" are extracted as the candidate request terminal 10A that has registered the terminal 10ba as a candidate counterpart terminal 10B.

The terminal state obtainer 55, which operates under control of the CPU 201 (FIG. 9), searches the terminal management DB 5003 (FIG. 18) using the terminal ID of each candidate terminal 10 that is extracted by the extractor 54 as a key to obtain the specific operation state information of each candidate terminal 10. More specifically, the terminal state obtainer 55 obtains the specific operation state of each candidate counterpart terminal 10 that is previously registered as a candidate counterpart terminal for the request terminal 10A that sends the login request information. Further, the terminal state obtainer 55 searches the terminal management DB 5003 using the terminal ID of the request terminal 10A that is extracted by the extractor 54 as a key to obtain the specific operation state information of the request terminal 10A that sends the login request information. Further, the terminal state obtainer 55 searches the terminal management DB 5003 using the terminal ID of a candidate request terminal 10A that is extracted by the extractor 54 as a key to obtain the specific operation state information of the candidate request terminal 10A that lists the request terminal 10A that sends the login request information as a candidate counterpart terminal.

Further, in this example, after the terminal state obtainer 55 refers to the terminal management DB 5003 (FIG. 18) to obtain the specific operation state information of the terminal 10 having the terminal ID extracted by the extractor 54, the extractor 54 determines whether the candidate terminal 10 having the extracted terminal ID is online and available for communication. Based on this determination, the extractor 54 selects the terminal ID of the candidate terminal 10 that is online and available for communication as a candidate terminal for the request terminal 10.

Figure 14:
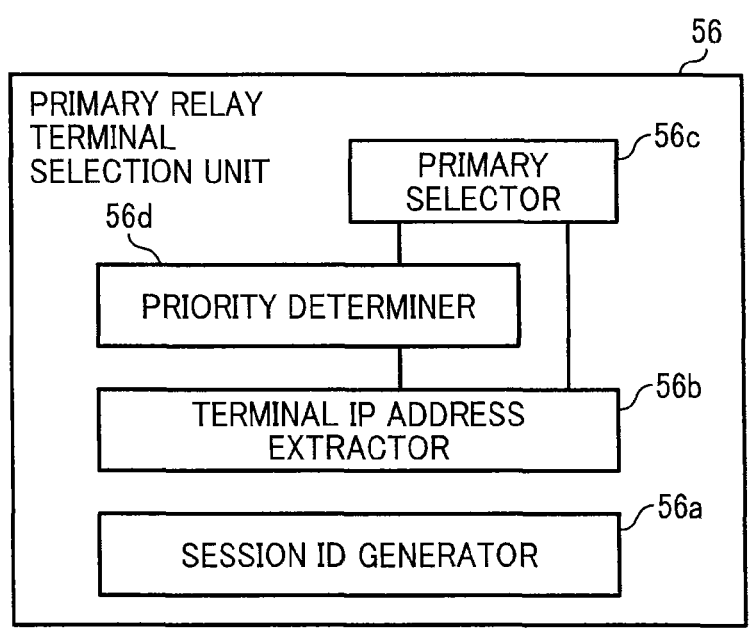
FIG. 14 is a schematic block diagram illustrating a functional structure of a primary selection unit of the management system of FIG. 10.

The primary relay terminal selection unit 56, which operates according to an instruction received from the CPU 201 (FIG. 9), limits a number of relay terminals 30 each of which is a candidate relay terminal 30 that may be used for relaying contents data between at least two terminals 10. Based on the result obtained by the primary relay terminal selection unit 56, the secondary relay terminal selection unit 16 of the terminal 10 selects one terminal 30 that is most suitable for communication between at least two terminals 10. As illustrated in FIG. 14, the primary relay terminal selection unit 56 includes a session ID generator 56a, a terminal IP address extractor 56b, a primary selector 56c, and a priority determiner 56d.

The session ID generator 56a of the primary relay terminal selection unit 56 generates a session ID for identifying a session that is used for selecting the relay terminal 30. The terminal IP address extractor 56b extracts the terminal ID of the request terminal 10A and the terminal ID of the counterpart terminal 10B respectively from the session request information received from the request terminal 10A, and searches the terminal management DB 5003 (FIG. 18) to obtain the IP address of the request terminal 10A and the IP address of the counterpart terminal 10B. The primary selector 56c selects one or more relay terminals 30 having the online state from the relay terminal management DB 5001 (FIG. 16) to obtain the relay terminal ID of the selected relay terminal 30. In this example, it is assumed that more than two relay terminals 30 are selected as having the on-line state.

Further, the primary selector 56c obtains the IP address of each of the selected relay terminals 30. Once the IP address of the relay terminal 30 is obtained for each relay terminal 30, the primary selector 56c compares the IP address of the relay terminal 30 with at least one of the IP address of the request terminal 10A and the IP address of the counterpart terminal 10B that are respectively obtained by the terminal IP address extractor 56b to analyze the degree of similarity between the IP address of the terminal 10 and the IP address of the relay terminal 30. More specifically, the primary selector 56c compares between the IP address of the terminal 10 and the IP address of the relay terminal 30, digit by digit, or dot address by dot address, to determine the degree of similarity. Using the address priority management table of FIG. 21, the primary selector 56c obtains the address priority point for each one of the relay terminals 30. Assuming that the primary selector 56c compares the IP address of the terminal 10 with the IP address of the relay terminal 30, respectively for the request terminal 10A and the counterpart terminal 10B, the primary selector 56c obtains two address priority points for each one of the relay terminals 30. In such case, the primary selector 56c selects the highest one of the address priority points as the address priority point for the relay terminal 30. For each of the relay terminals 30, the primary selector 56c obtains a total priority point by adding the address priority point and the transmission speed priority point together. In this example, the primary selector 56c selects two relay terminals 30 including the relay terminal 30 having the highest total priority point and the relay terminal 30 having the second highest total priority point.

In this example, a number of relay terminals 30 that is finally selected by the primary selector 56c is not limited to two such that more than two relay terminals 30 may be finally selected for further processing as long as a number of relay terminals 30 is sufficiently reduced.

The priority determiner 56d refers to the priority management DB 5006 (FIG. 21) to determine the address priority point for each one of the relay terminals 30 that is selected by the primary selector 56c. The priority determiner 56d obtains the maximum data transmission speed of the relay terminal 30 from the relay terminal management DB 5001 (FIG. 16), and refers to the priority management DB 5006 (FIG. 22) to obtain the transmission speed priority point of the relay terminal 30 that is selected by the primary selector 56c.

The session manager 57, which operates according to an instruction received from the CPU 201, stores the session ID generated by the session ID generator 56a, the terminal ID of the request terminal 10, and the terminal ID of the counterpart terminal 10, in a corresponding manner, in the session management DB 5005 (FIG. 20) of the memory 5000. The session manager 57 further stores the relay terminal ID of the relay terminal 30 that is finally selected by the secondary selector 16b of the terminal 10 for each session ID, in the session management DB 5006 (FIG. 20).

The quality determiner 58, which operates according to an instruction received from the CPU 201 (FIG. 9), searches the quality management DB 5007 (FIG. 23) using the delay time ms obtained for the selected relay terminal 30 to obtain the image data quality that is desirable for communication using the relay terminal 30.

The memory control 59 is implemented by the HDD 205 of FIG. 9 according to an instruction received from the CPU 201. The memory control 59 stores various data in the nonvolatile memory 5000, or reads out various data from the nonvolatile memory 5000.

The delay time manager 60 searches the terminal management DB 5003 (FIG. 18) using the IP address of the counterpart terminal 10B to obtain the terminal ID of the counterpart terminal 10B. The delay time manager 60 further manages the session management table of FIG. 20 stored in the session management DB 5005 so as to keep updated the value stored in the "delay time" field for the obtained terminal ID of the counterpart terminal 10B.

Figure 25:
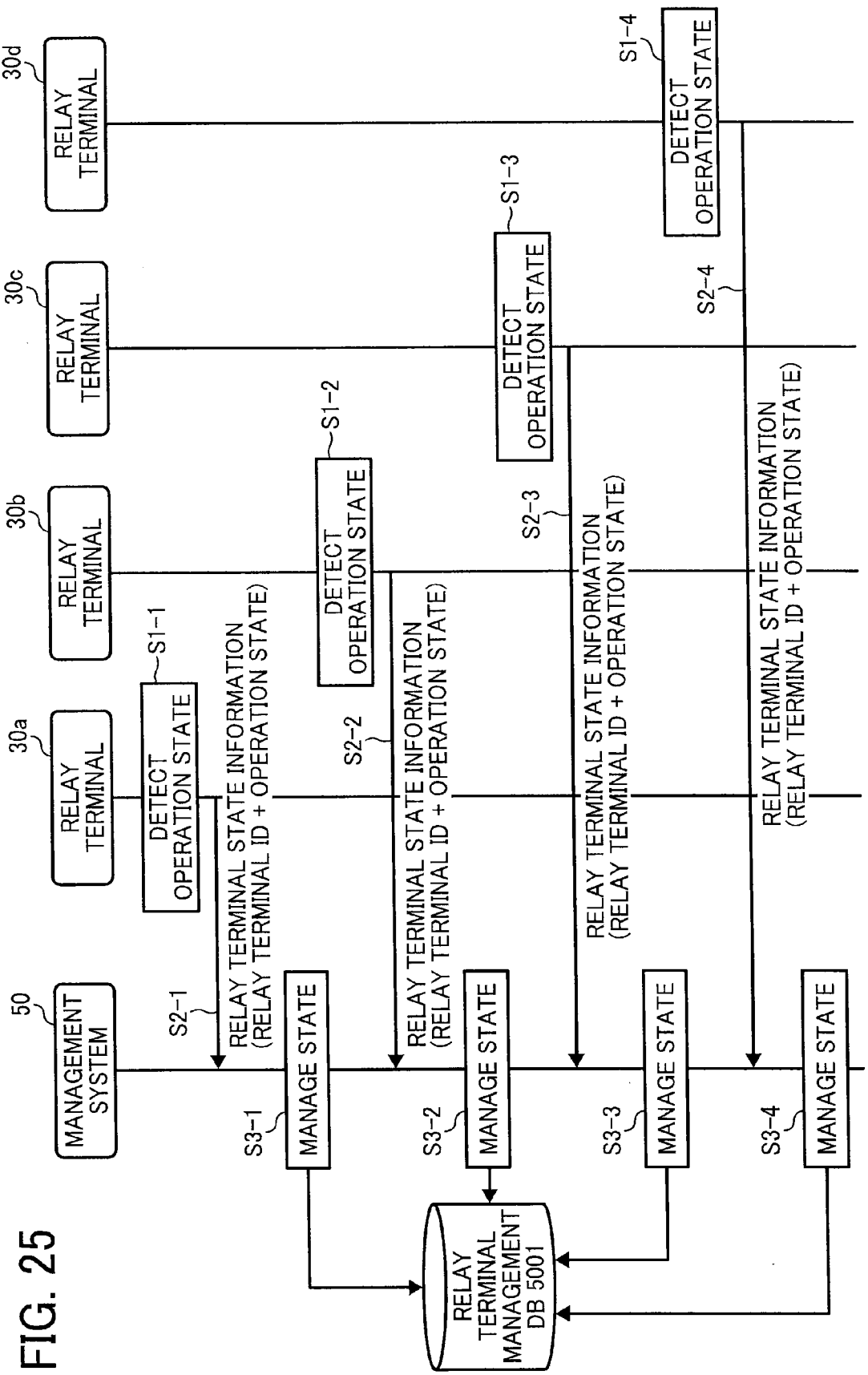
FIG. 25 is a data sequence diagram illustrating operation of managing state information indicating an operation state of the relay terminal of the transmission system of FIG. 1, according to an example embodiment of the present invention.
Figure 28:
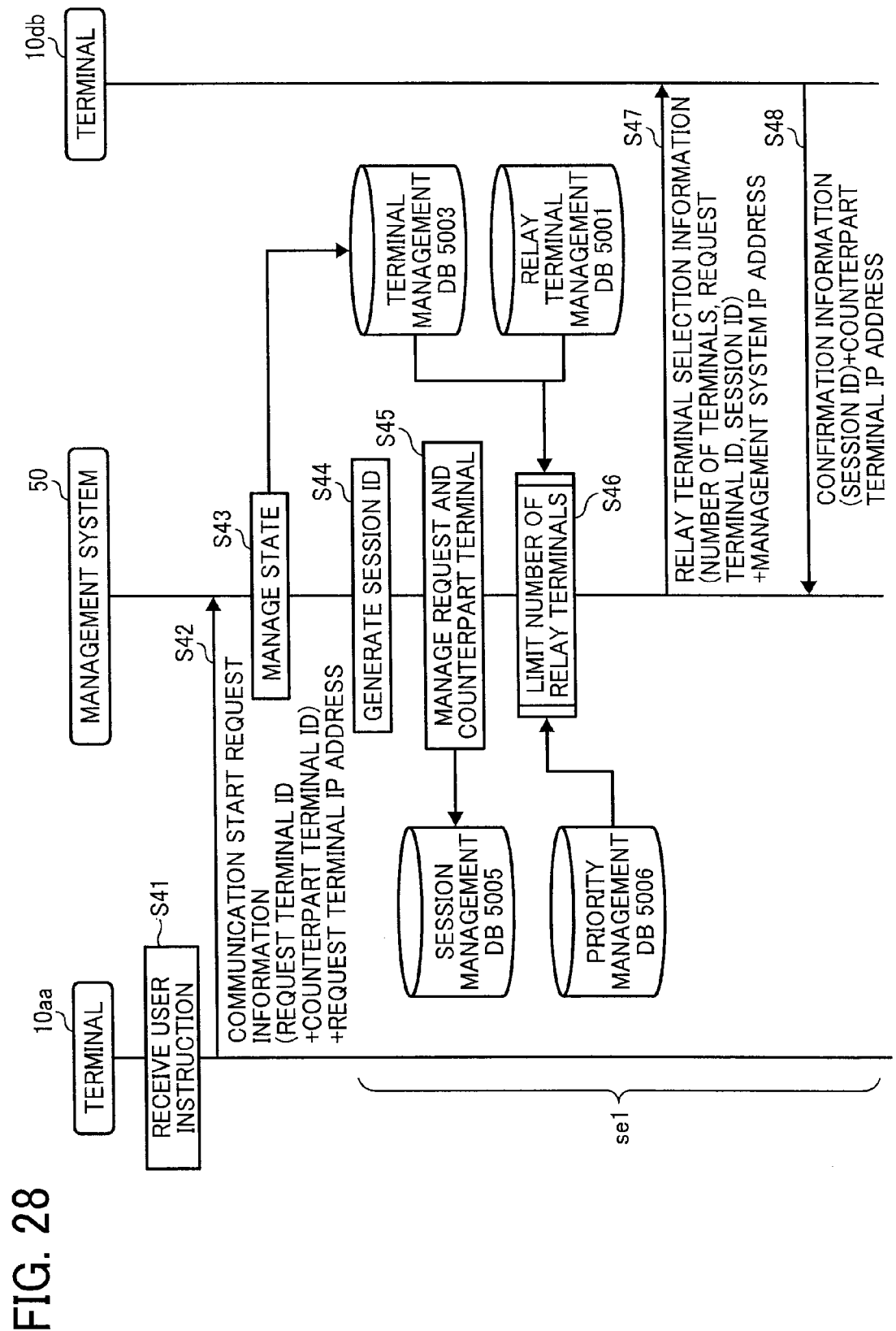
FIG. 28 is a data sequence diagram illustrating operation of limiting a number of candidate relay terminals, performed by the transmission system of FIG. 1.
Figure 29:
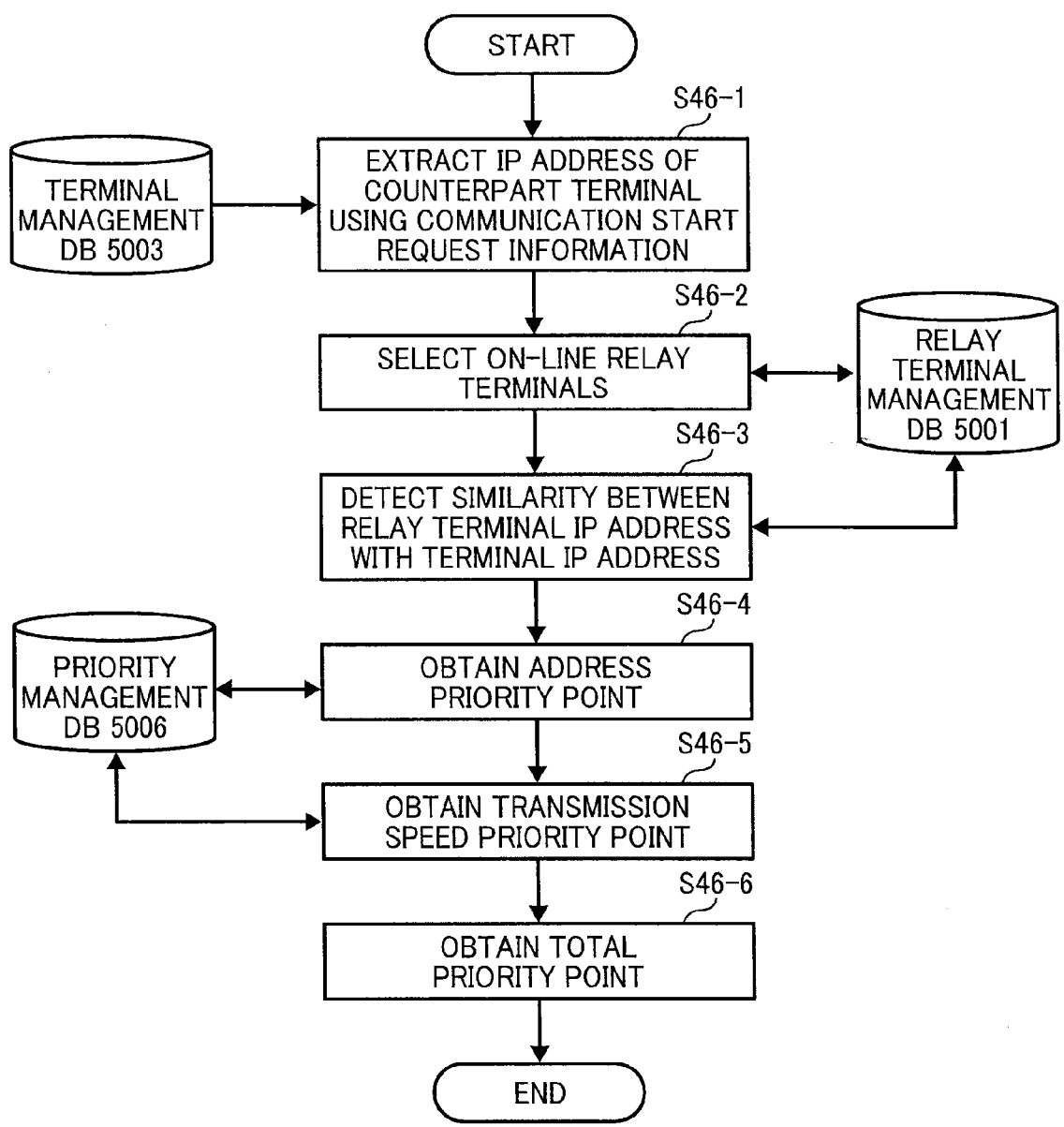
FIG. 29 is a flowchart illustrating operation of limiting a number of candidate relay terminals, performed by the management system of FIG. 10.
Figure 31A:
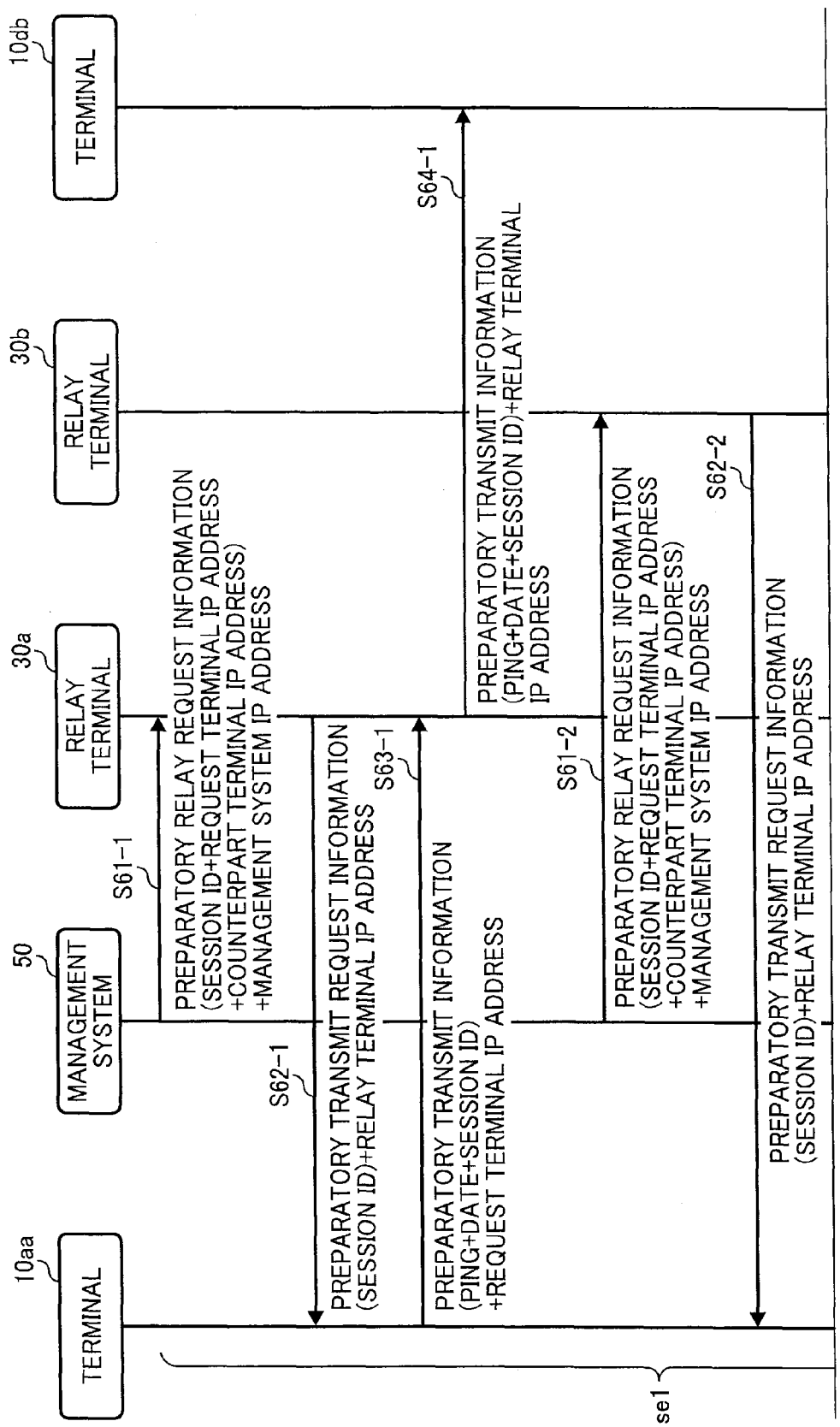
FIGS. 31A and 31B are a data sequence diagram illustrating operation of selecting a relay terminal, performed by the transmission system of FIG. 1.
Figure 31B:
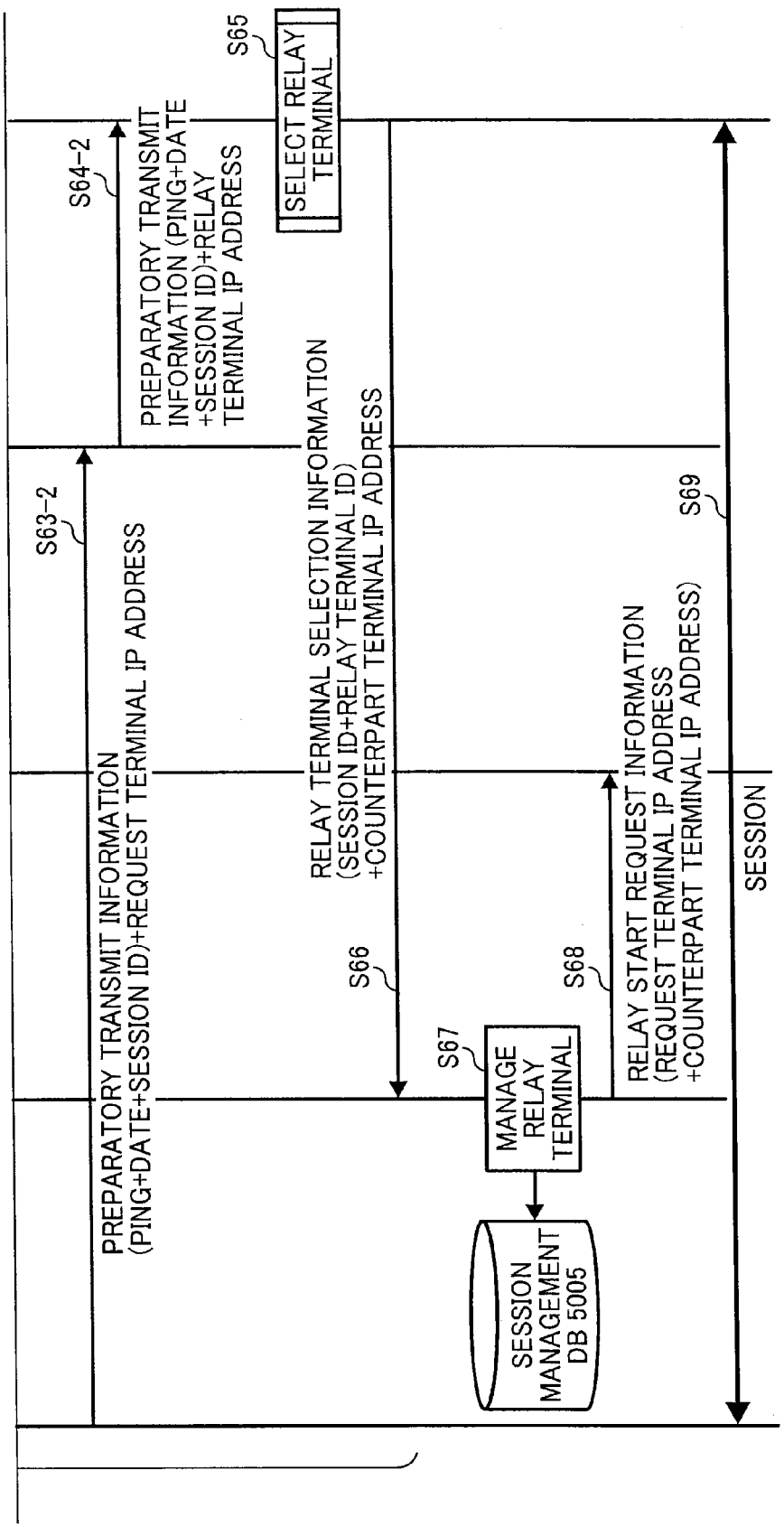
Figure 32:
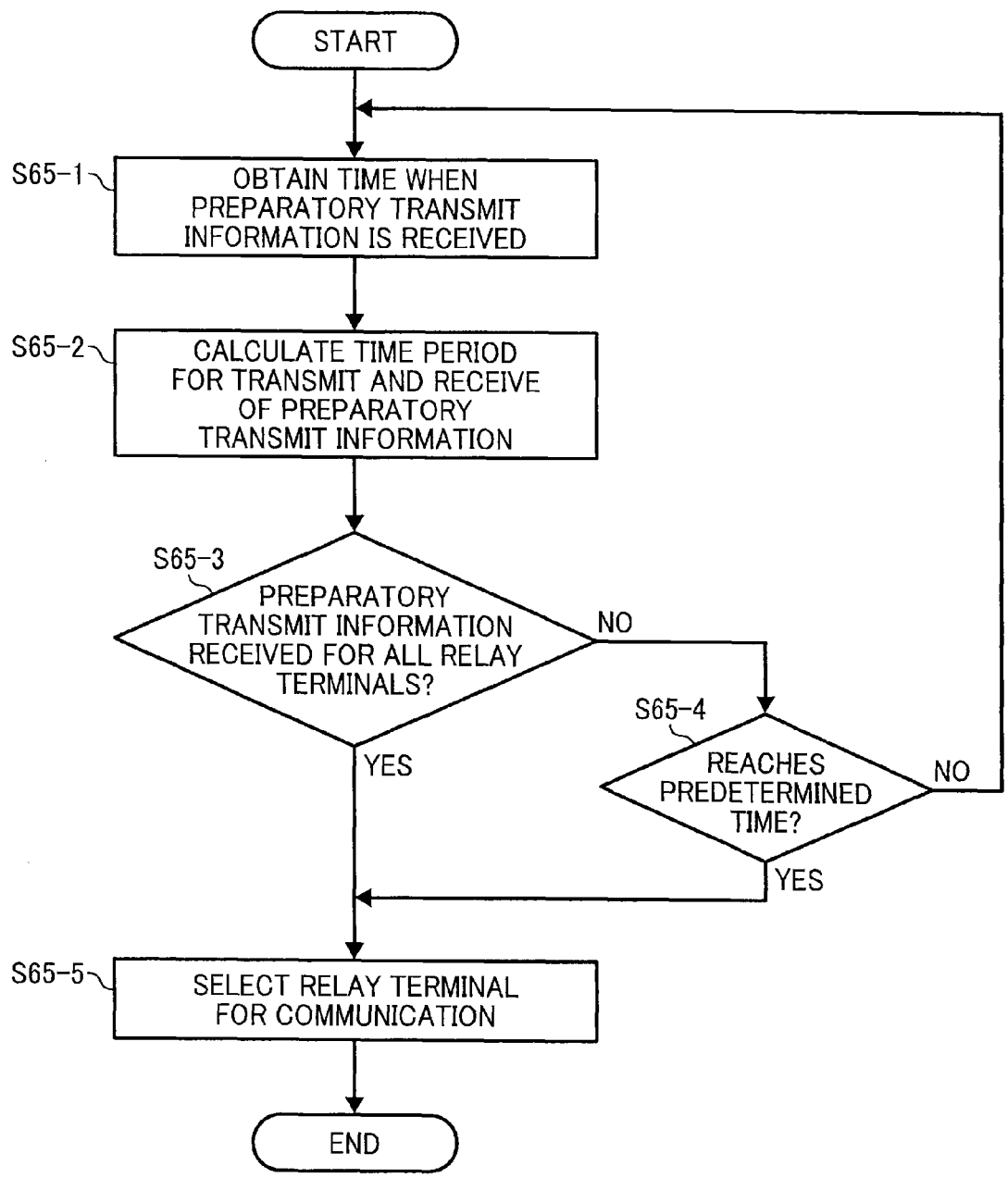
FIG. 32 is a flowchart illustrating operation of selecting a relay terminal, performed by the terminal of FIG. 10.
Figure 33:
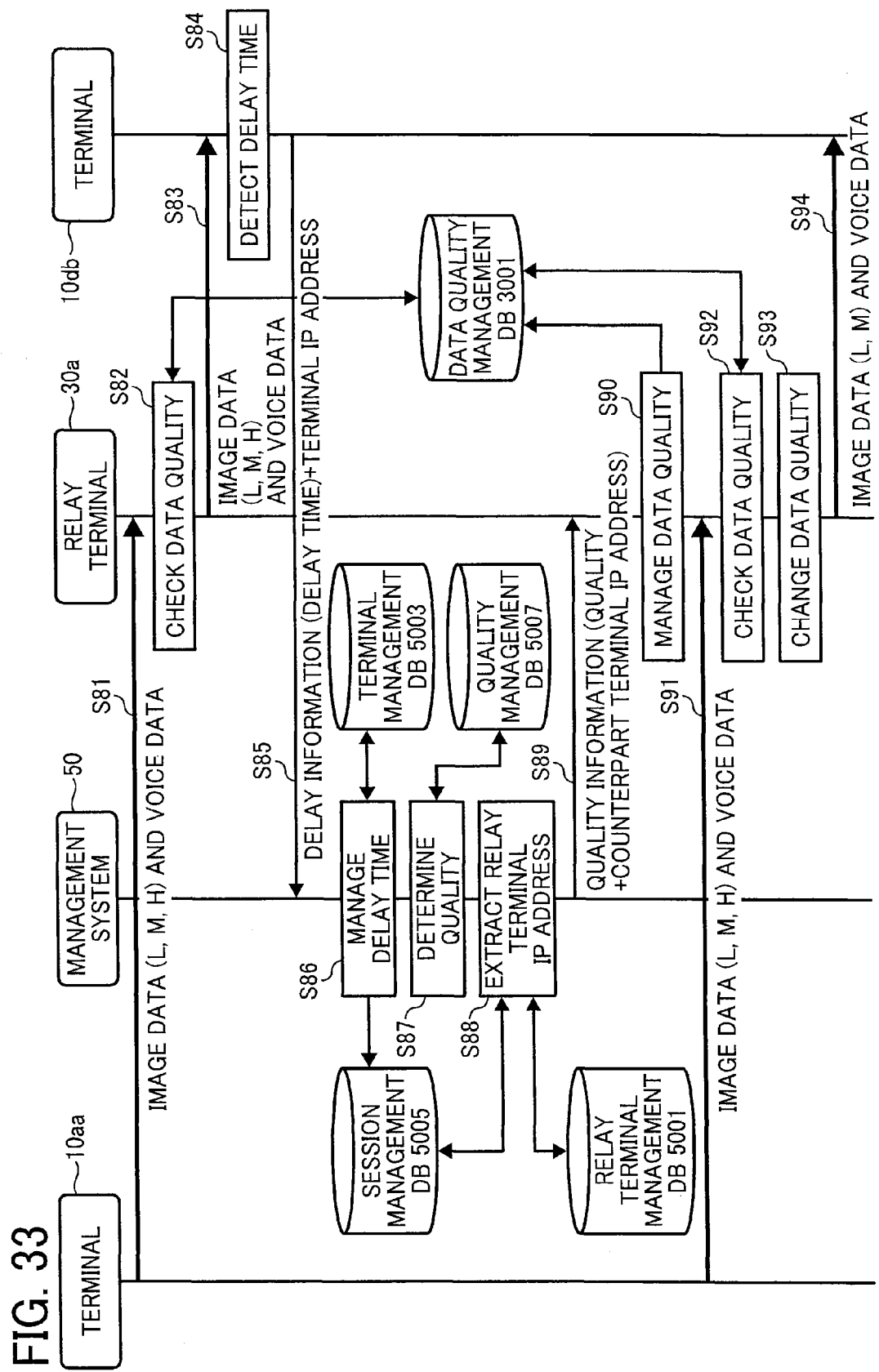
FIG. 33 is a data sequence diagram illustrating operation of transmitting or receiving data such as image data and sound data, performed by two or more terminals 10 of the transmission system of FIG. 1.

Referring now to FIGS. 25 to 36, example operation of the transmission system 1 of FIG. 1 is explained. FIG. 25 is a data sequence diagram illustrating operation of managing state information indicating an operation state of the relay terminal 30, which is transmitted from the relay terminal 30 to the management system 50. FIGS. 26A and 26B are a data sequence diagram illustrating operation of establishing communication among two or more terminals 10 of the transmission system of FIG. 1. FIG. 27 is an example screen displaying a candidate list. FIG. 28 is a data sequence diagram illustrating operation of limiting a number of candidate relay terminals. FIG. 29 is a flowchart illustrating operation of limiting a number of candidate relay terminals. FIG. 30 is a table storing a calculation result of a priority point, which is used for limiting a number of candidate relay terminals 30. FIGS. 31A and 31B are a data sequence diagram illustrating operation of selecting the relay terminal 30, performed by the transmission system 1. FIG. 32 is a flowchart illustrating operation of selecting the relay terminal 30 performed by the terminal 10. FIG. 33 is a data sequence diagram illustrating operation of transmitting or receiving data such as image data and voice data, performed by two or more terminals 10.

Referring now to FIG. 25, operation of managing state information of the relay terminal 30, which is sent from each relay terminal 30 to the management system 50, performed by the transmission system 1 is explained according to an example embodiment of the present invention. In this example, it is assumed that the relay terminals 30a, 30b, 30c, and 30d, which may be each or collectively referred to as the relay terminal 30, exist in the transmission system 1.

At S1-1, S1-2, S1-3, and S1-4, the relay terminals 30a, 30b, 30c, and 30d each periodically monitors the operation state of the relay terminal 30. This monitoring is performed by the state detector 32 (FIG. 10) of the relay terminal 30.

At S2-1, S2-2, S2-3, and S2-4, the data transmit/receive 31 of the relay terminal 30 periodically transmits state information of the relay terminal 30 to the management system 50 through the communication network 2. With the state information of the relay terminal 30 that is periodically received, the management system 50 is able to manage the operation state of the relay terminal 30 in realtime. The state information of the relay terminal 30 includes an operation state of the relay terminal 30 that is detected by the state detector 32 of the relay terminal 30, which is sent together with a relay terminal ID that uniquely identifies each relay terminal 30. For the descriptive purposes, in this example, it is assumed that the relay terminals 30a, 30b, and 30d each have the on-line state, and the relay terminal 30c has the off-line state due to the failure in relay control program of the relay terminal 30c.

At S3-1, S3-2, S3-3, and S3-4, the management system 50 receives the state information from the relay terminal 30 at the data transmit/receive 51, and stores the received state information of the relay terminal 30 in the memory 5000 through the memory control 59. More specifically, the memory control 59 stores the state information of each relay terminal 30 in association with the relay terminal ID of the corresponding relay terminal 30 in the relay terminal management DB 5001 (FIG. 16). For example, referring to FIG. 16, the management system 50 stores the state information of the relay terminal 30 indicating whether the relay terminal 30 is on-line, off-line, or in trouble, etc., in association with the relay terminal ID of the relay terminal 30. Additionally, the management system 50 stores the date and time information indicating the time when the management system 50 receives the state information of the relay terminal 30 in association with the relay terminal ID of the relay terminal 30. When the management system 50 does not receive any state information from the relay terminal 30, the relay terminal management table of FIG. 16 has an empty value for the "operation state" field and the "date and time" field for the subjected relay terminal 30. Alternatively, the value of the "operation state" field and the value of the "date and time" field may reflect the state information that is previously sent by the subjected relay terminal 30 to the management system 50 such that the relay terminal management table of FIG. 8 retains such value.

Figure 26B:
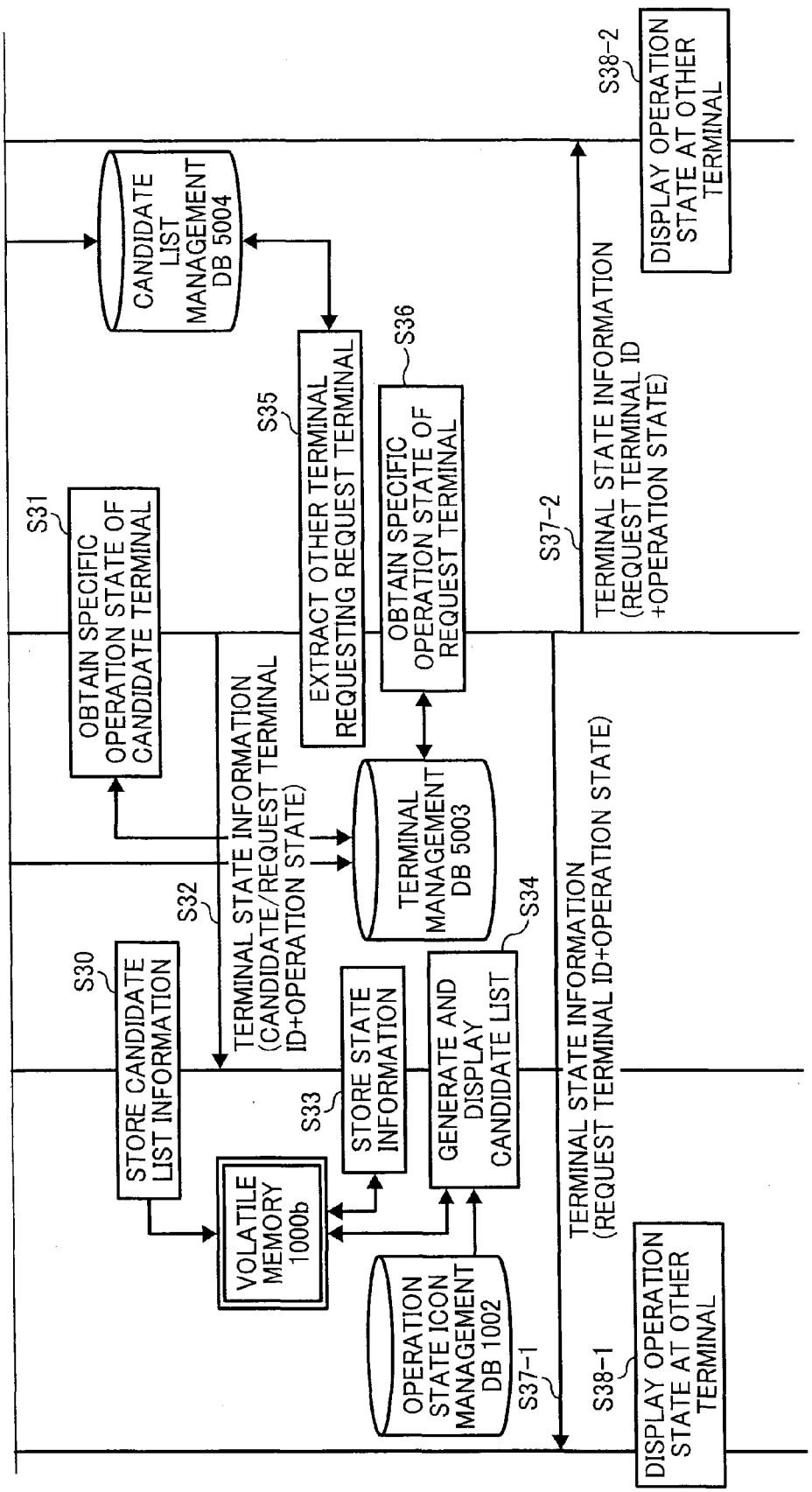

Referring now to FIGS. 26A and 26B, operation of transmitting and receiving various management data before starting videoconference by the request terminal 10aa is explained, according to an example embodiment of the present invention. In FIGS. 26A and 26B, management data is transmitted or received through the management data session sei.

For example, at S21, when the user selects "ON" using the power switch 109, the operation input 12 receives a user instruction for turning the power on, and causes the terminal 10 to turn on the power. At S22, as the power of the request terminal 10aa is turned on, the login request 13 of the request terminal 10aa automatically causes the data transmit/receive 11 to send the login request information that requests the login process to the management system 50 through the communication network 2. The login request information includes a terminal ID that identifies the request terminal 10aa, and a password assigned to the request terminal 10aa. The terminal ID and the password may be obtained by the memory control 19 from the nonvolatile memory 1000a, and sent to the data transmit/receive 11. At the time of sending the login request information from the request terminal 10aa to the management system 50, the request terminal 10aa sends an IP address of the request terminal 10aa such that the management system 50 knows the IP address of the request terminal 10aa.

At S23, the terminal authenticator 52 of the management system 50 searches the terminal authentication management DB 5002 (FIG. 17) stored in the nonvolatile memory 5000 using the terminal ID and the password of the login request information received through the data transmit/receive 51. When it is determined that the terminal ID and the password of the login request information is stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the specific operation state, the date and time at which the login request information is received, and the IP address of the terminal 10aa, with respect to the terminal ID in the terminal management DB 5003 (FIG. 18) to create a record of the terminal 10aa. Using the terminal management table of FIG. 18, which stores the specific operations state of "online, communication OK", the date and time of "13:40, Nov. 10, 2009", and the terminal IP address of "1.2.1.3" in association with the terminal ID "01aa", various information regarding the terminal 10aa can be managed.

At S25, the data transmit/receive 51 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

When the request terminal 10aa receives the authentication result indicating that the terminal 10aa is authenticated, at S26, the data transmit/receive 11 sends the candidate list request information that requests for a candidate list to the management system 50 through the communication network 2. The data transmit/receive 51 of the management system 50 receives the candidate list request information.

At S27, the extractor 54 of the management system 50 searches the candidate list management DB 5004 (FIG. 19) using the terminal ID "01aa" of the request terminal 10aa that has sent the login request information and the candidate list request information to extract a terminal ID and a terminal name for each of candidate terminals 10 that are previously registered for the request terminal 10aa. More specifically, referring to FIGS. 18 and 19, the extractor 54 extracts terminal IDs including "01ab", "01ba", "01db", etc. of terminals 10ab, 10ba, 10db, etc., and terminal names including "Japan Tokyo Office AB Terminal", "Japan Osaka Office BA Terminal", "U.S. Washington, D.C. Office, DB Terminal", etc. to obtain information regarding candidate terminals for the request terminal 10aa.

At S28, the data transmit/receive 51 of the management system 50 reads out the candidate list frame data such as the candidate list frame 11-1 of FIG. 27 from the nonvolatile memory 5000. At S29, the data transmit/receive 51 of the management system 50 sends the candidate list information including the candidate list frame data obtained at S28, and the terminal ID and the terminal name of the candidate terminal obtained at S27, to the request terminal 10aa. At S30, the request terminal 10aa receives the candidate list information at the data transmit/receive 11, and stores the candidate list information in the volatile memory 1000b through the memory control 19.

As described above, in this example, in alternative to managing the candidate list information by each terminal 10, the management system 50 centrally manages the candidate list information for all terminals 10. As the candidate list information is centrally managed at the management system 50, any change in the transmission system 1 can be easily reflected in a timely manner without requiring the user at the terminal 10 to change any settings. For example, the management system 50 is able to update the candidate list information to reflect when a new terminal 10 is added to the transmission system 1, when a new type of terminal 10 is introduced to the transmission system 1, or when the design for the candidate list frame is changed.

At S31, the terminal state obtainer 55 of the management system 50 searches the terminal management DB 5003 (FIG. 18) using the terminal ID ("01ab", "01ba", and "01db", etc.) of the candidate terminal extracted by the extractor 54 as a key to obtain the specific operation state for each one of the candidate terminals 10ab, 10ba, 10db, etc.

At S32, the data transmit/receive 51 of the management system 50 sends the operation state information for each one of the candidate terminals 10ab, 10ba, 10db, etc. to the request terminal 10aa through the communication network 2. More specifically, the data transmit/receive 51 of the management system 50 sends the operation state information of the candidate terminal 10ab together with the terminal ID "01ab" of the candidate terminal 10ab as the terminal state information. In this example, the terminal ID "01ab" of the candidate terminal 10ab has been extracted by the extractor 54. Using the terminal ID "01ab" as a search key, the specific operation state of the candidate terminal 10ab, which is the off-line state, is obtained. Similarly, the data transmit/receive 51 of the management system 50 sends the terminal state information of the candidate terminal 10ba, which includes the terminal ID "01ba" used as a search key at S27, and the operation state of the candidate terminal 10ba indicating the "online, communication OK" state. This process of sending the terminal state information is repeated until the terminal state information is sent for all of the candidate terminals 10.

In this example, when the specific operation state information does not include the refrained state information, such specific operation state is sent to the request terminal 10aa as the operation state information. For example, when the specific operation state is "online, communication OK", the operation state information "online, communication OK" is transmitted to the request terminal 10aa. When the specific operation state is "online, communicating", the operation state information "online, communicating, normal" is transmitted to the request terminal 10aa. When the specific operation state is "offline", the operation state information "offline" is transmitted to the request terminal 10aa.

When the specific operation state information includes the refrained state information, the terminal state obtainer 55 refers to the refrained state information management DB 5008 (FIG. 24A or 24B) to determine whether the refrained state indicated by the refrained state information is defined to be the first state or the second state. Based on this determination, the terminal state obtainer 55 determines the operation state information to be transmitted to the terminal 10aa.

In one example, assuming that the specific operation state information "online, communicating, microphone trouble" is extracted for the terminal 10cb with the terminal ID "01cb" as illustrated in FIG. 18, the terminal state obtainer 55 searches the refrained state information management table of FIG. 24A using the refrained state "microphone trouble" to extract the operation state information "online, communicating, error" such that this extracted operation state information is transmitted to the request terminal 10aa. Assuming that the specific operation state information "online, communicating, microphone mute" is extracted for the terminal 10bb with the terminal ID "01bb" as illustrated in FIG. 18, the terminal state obtainer 55 searches the refrained state information management table of FIG. 24A using the refrained state "microphone, mute" to extract the operation state information "online, communicating, normal" such that this extracted operation state information is transmitted to the request terminal 10aa.

Alternatively, assuming that the specific operation state information "online, communicating, microphone trouble" is extracted for the terminal 10cb with the terminal ID "01cb" as illustrated in FIG. 18, the terminal state obtainer 55 searches the refrained state information management table of FIG. 24B using the refrained state "microphone trouble" to extract the operation state information "online, communicating, trouble" such that this extracted operation state information is transmitted to the request terminal 10aa. Assuming that the specific operation state information "online, communicating, microphone mute" is extracted for the terminal 10bb with the terminal ID "01bb" as illustrated in FIG. 18, the terminal state obtainer 55 searches the refrained state information management table of FIG. 24B using the refrained state "microphone, mute" to extract the operation state information "online, communicating, normal" such that this extracted operation state information is transmitted to the request terminal 10aa.

At S33, the memory control 19 of the request terminal 10aa stores the terminal state information that is received from the management system 50 in the volatile memory 1000b. As described above, with the terminal state information of each candidate terminal, the request terminal 10aa is able to know the current operation state of the candidate terminal 10 that is previously registered for the request terminal 10aa. Further, the terminal state obtainer 55 of the management system 50 receives the operation state of the request terminal 10aa at S31, and the data transmit/receive 51 of the management system 50 sends the terminal state information of the request terminal 10aa that includes the terminal ID "01aa" and the operation state of the request terminal 10aa to the request terminal 10aa at S32.

At S34, the candidate list generator 20 of the request terminal 10aa generates a candidate list that reflects the operation state of the candidate terminal 10, based on the candidate list information including the operation state of the candidate terminal 10 that is stored in the volatile memory 1000b. More specifically, the candidate list generator 20 of the request terminal 10aa extracts image data of the operation state icon that corresponds to the operation state of the candidate terminal 10, from the operation state icon management DB 1002 (FIG. 12A or 12B), and generates the candidate list that reflects the current operation state of the candidate terminal 10 using the extracted operation state icon image data. The display control 14b of the request terminal 10aa causes the display 120 to display a candidate list screen as illustrated in FIG. 27.

Referring back to FIG. 26B, at S35, the extractor 54 of the management system 50 searches the candidate list management DB 5004 (FIG. 19) using the terminal ID "01aa" of the request terminal 10aa that has sent the login request information to extract the terminal ID of one or more terminals 10 each of which registers the request terminal 10aa as one of its candidate terminals 10. The candidate list management table of FIG. 19 indicates that the terminal ID of the terminal 10 having the request terminal 10aa as a candidate terminal is "01ab", "01ba", and "01db".

At S36 of FIG. 21B, the terminal state manager 55 of the management system 50 searches the terminal management DB 5003 (FIG. 18) using the terminal ID "01aa" of the request terminal that has sent the login request information as a search key to obtain the specific operation state of the request terminal 10aa. In this example, the specific operation state "online, communication OK" is extracted for the request terminal 10aa.

At S37-1 and S37-2, the data transmit/receive 51 of the management system 50 sends the terminal ID "01aa" and the operation state of the request terminal 10aa, which are respectively obtained at S36, to the terminals 10ab, 10ba, and 10db each having the request terminal 10aa as a candidate terminal that is obtained at S35. In this example, the management system 50 sends the terminal state information of the request terminal 10aa to only the terminals 10ba and 10db each having the "online, communication OK" state as shown in FIG. 18. Further, since the specific operation state for the request terminal 10aa is "online, communication OK", the operation state information "online, communication OK" is transmitted.

More specifically, in this example, the data transmit/receive 51 refers to the terminal management table of FIG. 18 to obtain the IP address of each of the terminals 10ba and 10db. Using the obtained IP addresses, the management system 50 is able to send the terminal state information of the request terminal 10aa to the terminals 10ba and 10db each of which lists the request terminal 10aa as a candidate terminal.

At S38-1, the terminal 10ba displays the operation state of the candidate terminal including the operation state of the request terminal 10aa through the display 120ba. At S38-2, the terminal 10db displays the operation state of the candidate terminal including the operation state of the request terminal 10aa through the display 120db.

The above-described operation of S22 to S38 is performed by any desired terminal 10 as the power of the terminal 10 is turned on through the power switch 109 (FIG. 8).

Referring now to FIG. 28, operation of limiting a number of candidate relay terminals 30 is explained according to an example embodiment of the present invention. The operation of FIG. 28 is performed during a management data session sei (FIG. 2), which transmits or receives various management data in the transmission system 1. Further, in this example, the request terminal 10aa can start communication with at least one of the terminals 10ba, 10db, etc., based on the terminal state information received at S32 of FIG. 26B. For the descriptive purposes, it is assumed that the user at the request terminal 10aa starts communication with the counterpart terminal 10db.

At S41, the user at the request terminal 10aa operates the operation button 108 to select the terminal 10db as a counterpart terminal. Upon selection, the operation input 12 (FIG. 10) of the request terminal 10aa receives a user instruction for starting communication with the counterpart terminal 10db.

At S42, the data transmit/receive 11 of the request terminal 10aa sends the communication start request information that requests the management system 50 to start communication with the counterpart terminal 10db to the management system 50. The communication start request information at least includes identification information such as the terminal ID "01aa" of the request terminal 10aa and the terminal ID "01db" of the counterpart terminal 10db.

At S43, the state manager 53 looks for records in the terminal management DB 5003 (FIG. 18) based on the terminal ID "01aa" of the request terminal 10aa and the terminal ID "01db" of the counterpart terminal 10db, which are included in the communication start request information. The state manager 53 changes each of the operation states of the request terminal 10aa and the counterpart terminal 10db in the records, from the online, communication OK state to the online, communicating state.

At this time, the request terminal 10aa and the counterpart terminal 10db has not started communication, but the request terminal 10aa and the counterpart terminal 10db each have the communicating state. In case another terminal 10 tries to communicate with the request terminal 10aa or the counterpart terminal 10db, the management system 50 causes the another terminal 10 to output voice or display indicating that the request terminal 10aa or the counterpart terminal 10db is in the communicating state.

At S44, the management system 50 prepares for a session that is performed for selecting the relay terminal 30 for communication between the request terminal 10aa and the counterpart terminal 10db. More specifically, at S44, the session ID generator 56a (FIG. 14) of the management system 50 generates a session ID for a session that is to be performed for selection of the relay terminal 30.

At S45, the session manager 57 stores the session ID "se1" generated at S44, the terminal ID "01aa" of the request terminal 10aa, and the terminal ID "01db" of the counterpart terminal 10db, in the session management DB 5005 (FIG. 20) stored in the nonvolatile memory 5000.

At S46, the primary relay terminal selection unit 56 of the management system 50 limits a number of candidate relay terminals 30 from which one relay terminal 30 to be used for communication between the request terminal 10aa and the counterpart terminal 10db is selected, using the relay terminal management DB 5001, the terminal management DB 5003, and the priority management DB 5006.

Referring now to FIG. 10 and FIG. 29, operation performed at S46 of FIG. 28 is explained in detail. At S46-1 of FIG. 29, the terminal IP address extractor 56b of the management system 50 searches the terminal management DB 5003 (FIG. 18) using the terminal ID "01aa" of the request terminal 10aa and the terminal ID "01db" of the counterpart terminal 10db included in the communication start request information sent from the request terminal 10aa as a key to obtain the IP addresses of the terminals 10aa and 10db, i.e., the IP address "1.2.1.3" and the IP address "1.3.2.4".

At S46-2, the primary selector 56c refers to the relay terminal management DB 5001 (FIG. 16) to select one or more relay terminals 30 having the on-line operation state, and obtains the relay terminal ID of the selected relay terminal 30. More specifically, in this example, the primary selector 56c obtains the relay terminal IDs 111a, 111b, and 111d of the relay terminals 30a, 30b, and 30d.

At S46-3, the primary selector 56c searches the relay terminal management DB 5001 (FIG. 16) to obtain the IP address of each of the relay terminals 30a, 30b, and 30d, using the relay terminal IDs 111a, 111b, and 111d obtained at S46-2. Further, the primary selector 56c compares each one of the IP addresses "1.2.1.2", "1.2.2.2", and "1.3.2.2" of the relay terminals 30a, 30b, and 30d, with each one of the IP addresses "1.2.1.3" and "1.3.2.4" obtained at S46-1, dot address by dot address, to determine the degree of similarity between the relay terminal IP address and the terminal IP address.

At S46-4, the priority determiner 56d refers to the priority management DB 5006 (FIG. 21) to determine a value of address priority point for each one of the relay terminals 30a, 30b, and 30d. In this example, as illustrated in FIG. 30, for each one of the relay terminals 30a, 30b, and 30d, the priority determiner 56d obtains an address priority point with respect to the request terminal 10aa and an address priority point with respect to the counterpart terminal 10db. FIG. 30 illustrates a table storing a calculation result of a priority point, which is used for limiting a number of candidate relay terminals 30. The table of FIG. 30 stores an address priority point, a transmission speed priority point, and a total priority point, for each one of the relay terminals IDs of the relay terminals 30. The address priority point includes a first address priority point with respect to the request terminal 10aa, and a second address priority point with respect to the counterpart terminal 10db. The total priority point is obtained by adding the highest one of the first and second address priority points with the transmission speed priority point.

In this example, based on comparison between the IP address "1.2.1.2" of the relay terminal 30a and the IP address "1.2.1.3" of the request terminal 10aa, the degree of similarity is "S.S.S.D" such that the address priority point of 5 is obtained. Similarly, based on comparison between the IP address "1.2.1.2" of the relay terminal 30a and the IP address "1.3.2.4" of the counterpart terminal 10db, the degree of similarity is "S.D.D.D" such that the address priority point of 1 is obtained. Based on comparison between the IP address "1.2.2.2" of the relay terminal 30b and the IP address "1.2.1.3" of the request terminal 10aa, the degree of similarity is "S.S.D.D" such that the address priority point of 3 is obtained. Similarly, based on comparison between the IP address "1.2.2.2" of the relay terminal 30b and the IP address "1.3.2.4" of the counterpart terminal 10db, the degree of similarity is "S.D.S.D" such that the address priority point of 1 is obtained. Based on comparison between the IP address "1.3.2.2" of the relay terminal 30d and the IP address "1.2.1.3" of the request terminal 10aa, the degree of similarity is "S.D.D.D" such that the address priority point of 1 is obtained. Similarly, based on comparison between the IP address "1.3.2.2" of the relay terminal 30a and the IP address "1.3.2.4" of the counterpart terminal 10db, the degree of similarity is "S.S.S.D" such that the address priority point of 5 is obtained.

Referring back to FIG. 29, at S46-5, the priority determiner 56d searches the priority management DB 5006 (FIG. 22) using the maximum data transmission speed of the relay terminal 30 that is stored in the relay terminal management DB 5001 (FIG. 16) to determine a transmission priority point for each one of the relay terminals 30a, 30b, and 30d that are selected at S46-2.

In this example, referring to FIG. 16 and FIG. 22, the relay terminal 30a having the maximum data transmission speed of 100 Mbps is assigned with the transmission priority point of 3. Similarly, the relay terminal 30b having the maximum data transmission speed of 1000 Mbps is assigned with the transmission priority point of 5. Similarly, the relay terminal 30d having the maximum data transmission speed of 10 Mbps is assigned with the transmission priority point of 1. Accordingly, the priority determiner 56d stores the transmission priority point for each one of the relay terminals 30a, 30b, and 30d in the table of FIG. 30. Similarly, the relay terminal 30b having the maximum data transmission speed of 1000 Mbps is assigned with the transmission priority point of 5. Similarly, the relay terminal 30d having the maximum data transmission speed of 10 Mbps is assigned with the transmission priority point of 1. Accordingly, the priority determiner 506d stores the transmission priority point for each one of the relay terminals 30a, 30b, and 30d in the table of FIG. 30.

At S46-6, for each one of the relay terminals 30a, 30b, and 30d, the primary selector 56c adds the highest one of the first and second address priority points with the transmission speed priority point to obtain a total priority point. The primary selector 56c selects the total of two relay terminals 30 having the highest priority point. For example, the primary selector 56c selects the relay terminal 30 having the highest total priority point and the relay terminal 30 having the second highest total priority point as a candidate relay terminal 30 for further processing. In this example, referring to FIG. 30, the relay terminals 30a, 30b, and 30d having the relay terminal IDs 111a, 111b, and 111d respectively have the total priority points of 8, 8, and 6. Accordingly, the primary selector 56c selects the relay terminal 30a having the relay terminal ID 111a, and the relay terminal 30b having the relay terminal ID 111b. For example, the primary selector 56c selects the relay terminal 30 having the highest total priority point and the relay terminal 30 having the second highest total priority point as a candidate relay terminal 30 for further processing. In this example, referring to FIG. 30, the relay terminals 30a, 30b, and 30d having the relay terminal IDs 111a, 111b, and 111d respectively have the total priority points of 8, 8, and 6. Accordingly, the primary selector 56c selects the relay terminal 30a having the relay terminal ID 111a, and the relay terminal 30b having the relay terminal ID 111b.

After the operation of S46 illustrated in FIG. 29 completes, at S47 of FIG. 28, the data transmit/receive 51 (FIG. 10) of the management system 50 sends the relay terminal selection information to the counterpart terminal 10db through the communication network 2. The relay terminal selection information includes a number of candidate relay terminals 30, which is "2", the terminal ID "01aa" of the request terminal 10aa, and the session ID "se1" for relay terminal selection. With this relay terminal selection information, the counterpart terminal 10db is able to obtain information including the number of candidate relay terminals 30, the request terminal 10aa that requests for videoconference, and the session ID "se1" of the session for relay terminal selection. In addition, the counterpart terminal 10db obtains the IP address "1.1.1.2" of the management system 50 that has sent the relay terminal selection information.

At S48, the data transmit/receive 11 of the counterpart terminal 10db sends confirmation information indicating that the relay terminal selection information is received, to the management system 50 through the communication network 2, with the IP address of the counterpart terminal 10db. The confirmation information includes the session ID "se1". With this confirmation information, the management system 50 is able to know that the counterpart terminal 10db is notified with the number of candidate relay terminals 30 obtained during the session se1, and the IP address "1.3.2.4" of the counterpart terminal 10db.

Referring now to FIGS. 31A, 31B, and 32, operation of selecting the relay terminal 30, performed by the counterpart terminal 10db, is explained according to an example embodiment of the present invention. The operation of FIGS. 31A and 31B is performed during the management data session sei of FIG. 2, which transmits or receives various management data in the transmission system 1.

Before starting videoconference, at S61-1 and S61-2, the management system 50 sends preparatory relay request information, respectively, to the relay terminals 30a and 30b, which are selected by the management system 50 at S46 as candidate relay terminals. The preparatory relay request information requests the relay terminal 30 to perform relay processing before starting the videoconference. More specifically, the preparatory relay request information includes the session ID "se1", the IP address "1.2.1.3" of the request terminal 10aa, and the IP address "1.3.2.4" of the counterpart terminal 10db, and is transmitted with the IP address of the management system 50. With this preparatory relay request information, the relay terminals 30a and 30b are each able to obtain information including the session, the request terminal, the counterpart terminal, and the IP address "1.1.1.2" of the management system 50 that has sent the preparatory relay request information.

At S62-1 and S62-2, the relay terminals 30a and 30b each cause the data transmit/receive 31 to send preparatory transmit request information to the request terminal 10aa through the communication network 2. The preparatory transmit request information requests the request terminal 10aa to send preparatory transmit information including the Packet Internet Grouper (PING) to each one of the relay terminals 30a and 30b before starting the videoconference. More specifically, the preparatory transmit request information includes the session ID "se1", and is transmitted with the IP addresses of the relay terminals 30a and 30b. With this preparatory transmit request information, the request terminal 10aa is able to know that the preparatory transmit information is to be sent during the session with the session ID "se1", as well as the IP addresses "1.2.1.2" and "1.2.2.2" of the relay terminals 30a and 30b.

As described above, the management system 50 does not directly send the IP address of the counterpart terminal 10db to the request terminal 10aa. Instead, as described above referring to S61-1 and S61-2, the management system 50 sends the IP address of the counterpart terminal 10db respectively to the relay terminal 30a and the relay terminal 30b. As described above referring to S62-1, the relay terminal 30aa requests the request terminal 10aa to send the preparatory transmit information to the relay terminal 30aa. In this manner, the management system 50 prevents the terminal 10 from obtaining the IP address of another terminal 10, thus improving the security.

At S63-1 and S63-2, the request terminal 10aa causes the data transmit/receive 11 to send the preparatory transmit information, respectively, to the relay terminals 30a and 30b through the communication network 2. The preparatory transmit information is sent to the counterpart terminal 10db through each one of the relay terminals 30a and 30b before the contents data such as the image data and the voice data is transmitted. By sending the preparatory transmit information in replace of the contents data, the management system 50 is able to calculate a time period required for transmitting the contents data from the request terminal 10aa to the counterpart terminal 10db through each one of the relay terminals 30a and 30b. Further, the preparatory transmit information includes PING information used for checking whether the request terminal 10aa, the relay terminal 30a or 30b, and the counterpart terminal 10db are each connected to allow communication, the date and time of which the request terminal 10aa sends the preparatory transmit information, and the session ID "se1". With this preparatory transmit information, each of the relay terminals 30a and 30b knows that the preparatory transmit information is transmitted in the session with the session ID "se1", and the IP address "1.2.1.3" of the request terminal 10aa that has sent the preparatory transmit information.

At S64-1 and S64-2, the relay terminals 30a and 30b each transmit the preparatory transmit information to the counterpart terminal 10db having the IP address "1.3.2.4", which is obtained from the preparatory transmit information. With the preparatory transmit information, the counterpart terminal 10db is able to know that the preparatory transmit information is transmitted during the session with the session ID "se1", and the IP addresses "1.2.1.2" and "1.2.2.2" of the relay terminals 30a and 30b that respectively send the preparatory transmit information.

At S65, the secondary relay terminal selection unit 16 of the counterpart terminal 10db selects one of the relay terminals 30a and 30b to be used for videoconference, based on the preparatory transmit information.

Referring now to FIG. 10 and FIG. 32, operation of selecting the relay terminal 30 for videoconference, which is performed at S65 of FIG. 31B, is explained. At S65-1, the counter 16a of the secondary relay terminal selection unit 16 (FIG. 13) obtains the date and time at which the data transmit/receive 11 of the counterpart terminal 10db receives the preparatory transmit information for each one of the relay terminals 30a and 30b.

At S65-2, the calculator 16b calculates, for each one of the relay terminals 30a and 30b, a time period between the time when the preparatory transmit information is transmitted by the request terminal 10aa and the time when the preparatory transmit information is received by the counterpart terminal 10db. The date and time at which the preparatory information is transmitted by the request terminal 10aa is obtainable from the preparatory transmit information. The date and time of which the preparatory transmit information is received at the counterpart terminal 10db is obtained by the counter 16a.

At S65-3, the secondary selector 16c determines whether all items of preparatory transmit information is received for all of candidate relay terminals, during the session with the session ID "se1". In this example, the secondary selector 16c counts a total number of items of preparatory transmit information that have been received, and compares with the total number of candidate relay terminals 30 of "2".

When it is determined that the preparatory transmit information has not been received for at least one relay terminal 30 ("NO" at S65-3), the operation proceeds to S65-4. When it is determined that the preparatory transmit information has been received for all of the candidate relay terminals 30 ("YES" at S65-3), the operation proceeds to S65-5. When it is determined that the predetermined time period has not passed ("NO" at S65-4), the operation returns to S65-1. When it is determined that the predetermined time period has passed ("YES" at S65-4), the operation proceeds to S65-5.

At S65-4, the secondary selector 16c determines whether a predetermined time period passes after the preparatory transmit information is received at the counterpart terminal 10db. In this example, the predetermined time period is set to one minute. When it is determined that the predetermined time period has not passed ("NO" at S65-4), the operation returns to S65-1. When it is determined that the predetermined time period has passed ("YES" at S65-4), the operation proceeds to S65-5. At S65-5, the secondary selector 16c selects one of the relay terminals 30, which has the least value of the time period required for transmitting the preparatory transmit information based on the calculation of the calculator 16b.

In this example, it is assumed that the relay terminal 30a is selected as a time period for transmitting the preparatory transmit information that is relayed through the relay terminal 30a has a value less than the value of the time period for transmitting the preparatory transmit information that is relayed through the relay terminal 30b.

Referring back to FIG. 31B, at S66, the data transmit/receive 11 of the counterpart terminal 10db sends the relay terminal selection information to the management system 50 through the communication network 2. In this example, the relay terminal selection information indicates that the relay terminal 30a is selected. More specifically, the relay terminal selection information includes the session ID "se1", and the relay terminal ID "111a" of the selected relay terminal 30a, and is transmitted with the terminal IP address of the counterpart terminal 10db. With the relay terminal selection information, the management system 50 is able to know that the relay terminal 30a has been selected during the session with the session ID "se1", and the IP address "1.3.2.4" of the counterpart terminal 10db that has sent the relay terminal selection information.

At S67, the session manager 57 of the management system 50 stores, in the session management table of FIG. 20 stored in the session management DB 5005, the relay terminal ID "111a" of the relay terminal 30a, which is finally selected for communication, in the "relay terminal ID" field of a record provided for the session with the session ID "se1".

At S68, the data transmit/receive 51 of the management system 50 sends the relay start request information to the relay terminal 30a through the communication network 2. The relay start request information requests the relay terminal 30a to start relay operation. More specifically, the relay start request information includes the IP address "1.2.1.3" of the request terminal 10aa, and the IP address "1.3.2.4" of the counterpart terminal 10db.

At S69, the relay terminal 30a establishes four sessions between the request terminal 10aa and the counterpart terminal 10db including a session for transmission of low-level resolution image data, a session for transmission of medium-level resolution image data, a session for transmission of high-level resolution image data, and a session for transmission of voice data. Once these sessions are established, the request terminal 10aa is able to start videoconference with the counterpart terminal 10db.

In the above-described example, the management system 50 sends the relay terminal selection information to the counterpart terminal 10db at S47 (FIG. 28), and the counterpart terminal 10db performs operation of S48, S64-1 (FIG. 31A), S64-2 (FIG. 31B), and S65 (FIG. 31B) to select the relay terminal 30. In alternative to this example, the management system 50 may send the relay terminal selection information to the request terminal 10aa to cause the request terminal 10aa to perform selection of the relay terminal 30. In such case, the request terminal 10aa performs operation of S48, S64-1 (FIG. 31A), S64-2 (FIG. 31B), and S65 (FIG. 31B) in a substantially similar manner as described above. Further, at S66, the request terminal 10aa sends the relay terminal selection information to the management system 50.

Referring now to FIG. 10 and FIG. 33, operation of transmitting and receiving contents data such as image data and voice data between the request terminal and the counterpart terminal to carry out videoconference, performed by the transmission system 1, is explained according to an example embodiment of the present invention.

In this example, the contents data such as the image data and the voice data flows in a direction from the request terminal 10aa to the counterpart terminal 10db, or in another direction from the counterpart terminal 10db to the request terminal 10aa. Since operation such as transmission and reception of the contents data or detection of delay time is the same for both of the directions, the following example focuses on communication in which data flows from the request terminal 10aa to the counterpart terminal 10db.

Referring to FIG. 33, at S81, the data transmit/receive 11 of the request terminal 10aa sends the contents data to the relay terminal 30a through the communication network 2 in the contents data session "sed". The contents data includes image data such as image data of an object captured by the imaging unit 14a and voice data that is input through the sound input 15a. In this example, it is assumed that the high-quality image data based on the low-level resolution image data, the medium-level resolution image data, and the high-level resolution image data, and the voice data, are transmitted. Accordingly, the data transmit/receive 31 of the relay terminal 30a receives the image data of three different resolution levels, and the voice data.

At S82, the data quality checker 33 searches the data quality management DB 3001 (FIG. 15) using the IP address "1.3.2.4" of the counterpart terminal 10db as a key to obtain the quality of the image data to be transmitted to the relay terminal 30a.

In this example, the quality of image data to be transmitted to the relay terminal 30a is the high-quality image data. Since the image data that is received at the data transmit/receive 31 has the quality that is the same as the quality of the image data obtained from the data quality management DB 3001, at S83, the relay terminal 30a sends the high-quality image data and the voice data to the counterpart terminal 10db in the contents data session "sed", without applying further image processing.

The counterpart terminal 10db receives the high quality image data that is generated based on the low-level resolution image data, medium-level resolution image data, and high-level resolution image data, and the voice data, at the data transmit/receive 11. The display control 14b combines the image data of three different resolution levels into the high quality image data for display onto the display 120. Further, the sound output 15b outputs the voice sound based on the voice data.

At S84, the delay detector 17 of the counterpart terminal 10db periodically detects a delay time indicating the time at which the image data is received at the data transmit/receive 11, for example, every one second. In this example, it is assumed that the delay time of 200 ms is obtained.

At S85, the data transmit/receive 11 of the counterpart terminal 10db sends the delay time information indicating the delay time of 200 ms to the management system 50 through the communication network 2, during the management data session "sei". With the delay time information, the management system 50 is notified of the delay time, and the IP address "1.3.2.4" of the counterpart terminal 10db that has sent the delay time information.

At S86, the delay time manager 60 of the management system 50 searches the terminal management DB 5003 (FIG. 18) using the IP address "1.3.2.4" of the counterpart terminal 10db as a search key to extract the terminal ID "01db" of the counterpart terminal 10db. The delay time manager 60 stores the delay time of 200 ms obtained from the delay time information in a "delay time" field of the record of the terminal ID "01db" of the session management table stored in the session management DB 5005 (FIG. 20).

At S87, the quality determiner 58 searches the quality management DB 5007 (FIG. 23) using the delay time of 200 ms to extract the image data quality of "MEDIUM". Based on the extracted image data quality, the quality determiner 58 determines that the quality of image data suitable for the delay time of 200 ms is medium.

At S88, the data transmit/receive 51 searches the relay terminal management DB 5001 (FIG. 16) using the relay terminal ID "111a", which is stored in the session management DB (FIG. 20) in association with the counterpart terminal ID "01db", to extract the IP address "1.2.1.2" of the relay terminal 30a.

At S89, the data transmit/receive 51 sends the quality information indicating that the image data quality that has been determined at S87 is medium-level, to the relay terminal 30a through the communication network 2 during the management data session "sei". The image quality information is transmitted with the IP address "1.3.2.4" of the counterpart terminal 10db, which was used as a search key at S86.

At S90, the change quality manager 34 of the relay terminal 30a stores the IP address "1.3.2.4" of the counterpart terminal 10db in association with the "medium-level" quality image data to be relayed by the counterpart terminal 10db, in the data quality management DB 3001 (FIG. 15).

At S91, the request terminal 10aa transmits the high quality image data including the low-level resolution image data, the medium-level resolution image data, and the high-level resolution image data, and the voice data, to the relay terminal 30a during the contents data session "sed", in a substantially similar manner as described above referring to S81.

At S92, the data quality checker 33 of the relay terminal 30a searches the data quality management DB 3001 (FIG. 15) using the IP address "1.3.2.4" of the counterpart terminal 10db as a search key to extract the quality of the image data suitable for the counterpart terminal 10db, in a substantially similar manner as described above referring to S82.

At S93, since the image data quality that is stored for the counterpart terminal 10db is the medium-level, which is lower than the quality of the image data that is received at the data transmit/receive 31, the data quality changer 35 changes the quality of the image data from the high-level to the medium level. In this example, the quality of the voice data remains the same.

At S94, the data transmit/receive 31 of the relay terminal 30 sends the image data having the quality that is lowered to the medium-level, and the voice data, to the counterpart terminal 10db through the communication network 2, during the contents data session "sed". The data transmit/receive 11 of the counterpart terminal 10db receives the medium-quality image data that is generated based on the low-level resolution image data and the medium-level resolution image data, and the voice data. The display control 14b of the counterpart terminal 10db combines the image data of two different resolution levels to generate the medium-level image data for display on the display 120. Further, the voice output 15b outputs the voice sound generated based on the voice data.

As described above, when any delay in receiving the image data at the counterpart terminal 10db is observed, the relay terminal 30a changes the quality of image data by lowering the quality of image data. Accordingly, the users participating the videoconference are able to carry out communication more smoothly.

Figure 34:
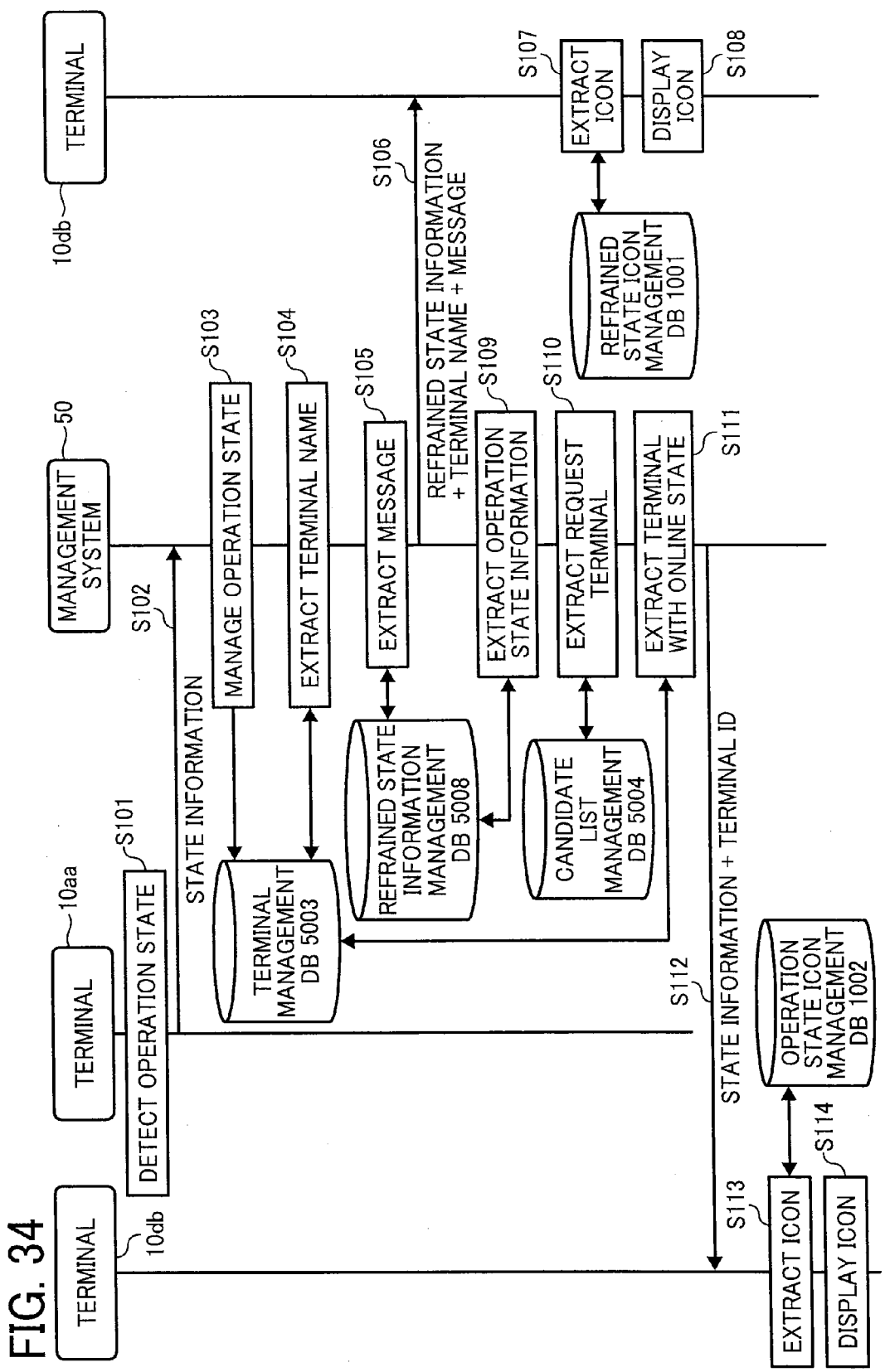
FIG. 34 is a data sequence diagram illustrating operation of transmitting information regarding the specific operation state of the transmission terminal when the change in specific operation state is detected, performed by the transmission system of FIG. 1, according to an example embodiment of the present invention.
Figure 35:
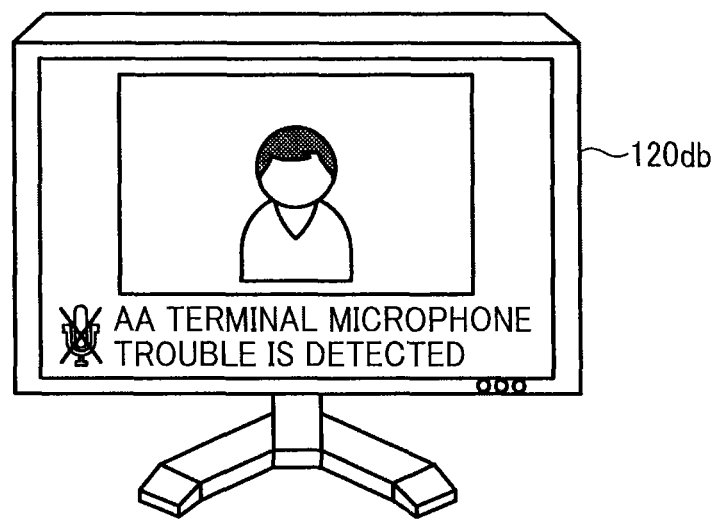
FIG. 35 is an illustration for explaining display of a refrained state icon and a message.
Figure 36:
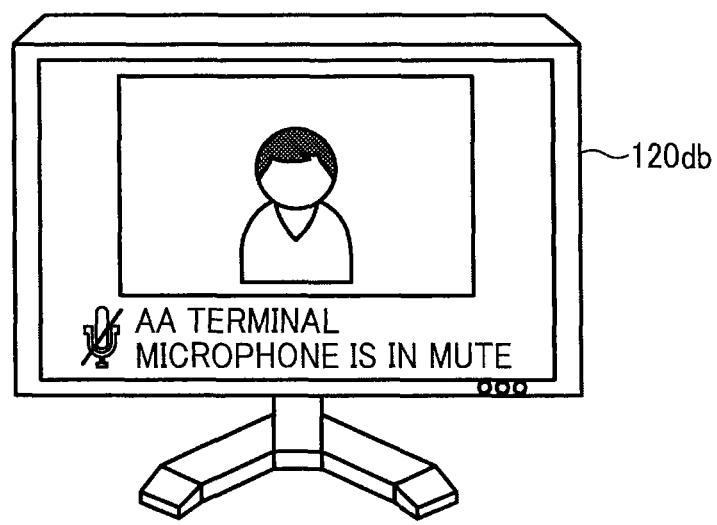
FIG. 36 is an illustration for explaining display of a refrained state icon and a message.

Referring now to FIGS. 34 to 36, example operation of transmitting the specific operation state information of the request terminal 10aa to the counterpart terminal 10db, performed by the transmission system 1 while the request terminal 10aa is communicating with the counterpart terminal 10db, is explained. FIG. 34 is a data sequence diagram illustrating operation of transmitting the specific operation state information of the request terminal 10aa to the counterpart terminal 10db, performed by the management system 50 when the change in specific operation state of the terminal 10aa is detected. FIG. 35 is an illustration for explaining a screen to be displayed onto the display 120db of the counterpart terminal 10db, when the microphone trouble is detected at the terminal 10aa. FIG. 36 is an illustration for explaining a screen to be displayed onto the display 120db of the counterpart terminal 10db, when the microphone mute function is activated at the terminal 10aa.

Referring now to FIGS. 34 and 35, example operation of transmitting the refrained state information of the request terminal 10aa to the counterpart terminal 10db when the microphone trouble is detected at the request terminal 10aa is explained. FIG. 34 additionally illustrates example operation of transmitting the operation state information of the request terminal 10aa to a candidate request terminal 10 that has registers the request terminal 10aa as a candidate counterpart terminal.

Referring to FIG. 34, at 5101, the state detector 18 of the terminal 10aa detects the change in specific operation state, specifically, the microphone trouble state.

At S102, the data transmit/receive 11 of the terminal 10aa sends the specific operation state information "online, communicating, microphone trouble" that includes the refrained state information "microphone trouble" to the management system 50 through the communication network 2, together with the terminal ID "01aa" of the request terminal 10aa. For example, the data transmit/receive 11 sends an XML-based message according to Extensible Messaging and Presence Protocol: Instant Messaging and Presence (XMPP IM) defined by RFC3921, for example, in a substantially similar manner as described in U.S. patent application Ser. No. 13/194,057. More specifically, in this example case of microphone trouble, the terminal 10aa enters the terminal ID "01aa" into the "from" attribute of the presence tag, the value of the state data "MIC_OFF" into the status tag, and "CHAT" into the "show" tag, etc.

The data transmit/receive 51 of the management system 50 receives the specific operation state information "online, communicating, microphone trouble" and the terminal ID "01aa".

At S103, the state manager 53 of the management system 50 searches the terminal management DB 5003 (FIG. 18) to extract a record for the terminal 10aa that corresponds to the terminal ID "01aa", and changes a value of the field "specific operation state" of such record from "online, communicating, normal" to "online, communicating, microphone trouble". The state manager 53 further changes a value of the field "date and time received" to reflect the current date and time at which the specific operation state information "online, communicating, microphone trouble" is received from the terminal 10aa.

At S104, the extractor 54 of the management system 50 searches the terminal management DB 5003 (FIG. 18) using the terminal ID "01aa" as a search key to extract the terminal name "JAPAN TOKYO OFFICE AA TERMINAL" of the terminal 10aa. At S105, the extractor 54 searches the refrained state information management DB 5008 (FIG. 24A or 24B) using the refrained state information "microphone trouble" to extract a message "microphone trouble is detected" that indicates the refrained state "microphone trouble".

At S106, the data transmit/receive 51 transmits the terminal name and the message that are respectively obtained at S105 to the counterpart terminal 10db, which is communicating with the request terminal 10aa, through the network 2, together with the refrained state information "microphone trouble" obtained from the specific operation state information of the terminal 10aa. The data transmit/receive 11 of the counterpart terminal 10db receives the refrained state information "microphone trouble", the terminal name, and the message.

At S107, the extractor 21 of the counterpart terminal 10db searches the refrained state icon management DB 1001 (FIG. 11) using the refrained state information "microphone trouble" to extract the image data of the refrained state icon indicating the microphone trouble state.

At S108, the display control 14b of the terminal 10db causes the display 120db to display the refrained state icon, and the message "AA terminal microphone trouble is detected", at a lower portion of the image of the user at the terminal 10aa, for example, as illustrated in FIG. 35.

At S109, the extractor 54 of the management system 50 searches the refrained state management DB 5008 (FIG. 24A or 24B) using the refrained state information "microphone trouble" that is received at S102, to extract the operation state information "online, communicating, error" (FIG. 24) that corresponds to the refrained state information "microphone trouble". For the descriptive purposes, in this example, it is assumed that the management system 50 stores the refrained state management table of FIG. 24A, and the operation state information "online, communicating, error" is extracted.

At S110, the extractor 54 searches the candidate list management DB 5004 (FIG. 19) using the terminal ID "01aa" of the request terminal 10aa to extract one or more request terminals 10 that have registered the request terminal 10aa as a candidate counterpart terminal. More specifically, in this example illustrated in FIG. 19, the terminal IDs "01ab", "01ba", and "01db" are extracted.

At S111, the terminal state obtainer 55 searches the terminal management DB 5001 (FIG. 18) using the terminal IDs "01ab", "01ba", and "01db", obtained at S110, as a search key to extract the specific operation state information of the terminals 10ab, 10ba, and 10db, respectively. Referring to FIG. 18, the specific operation state information indicate "offline", "online, communication OK", and "online, communication OK" for the terminal IDs "01ab", "01ba", and "01db".

At S111, the extractor 54 extracts the terminal ID of the terminal 10 having the online state, such as the terminals "01ba" and "01db".

At S112, the data transmit/receive 51 transmits the operation state information "online, communicating, error" of the terminal 10aa and the terminal ID "01aa" of the terminal 10aa, to the terminal 10ba, through the communication network 2. The data transmit/receive 11 of the terminal 10ba receives the operation state information "online, communicating, error" and the terminal ID "01aa" of the terminal 10aa from the management system 50. Similarly, the data transmit/receive 51 transmits the operation state information "online, communicating, error" of the terminal 10aa and the terminal ID "01aa" of the terminal 10aa, to the terminal 10db, through the communication network 2. The data transmit/receive 11 of the terminal 10db receives the operation state information "online, communicating, error" and the terminal ID "01aa" of the terminal 10aa from the management system 50.

At S113, the extractor 21 of each one of the terminals 10ba and 10db searches the operation state icon management DB 1002 (FIG. 12A, in this example) using the operation state information "online, communicating, error" to extract the image data of the operation state icon indicating the operation state "online, communicating, error".

At S114, the display control 14b of each one of the terminals 10ba and 10db causes corresponding one of the displays 120ba and 120db to display the candidate list that includes the operation state icon indicating the "online, communicating, error" state for the terminal 10aa. If the candidate list including the operation state icon indicating the "online, communicating, normal" state of the terminal 10aa has been displayed, the operation state icon "online, communicating, normal" is changed to the operation state icon "online, communicating, error".

The above-described operation of FIG. 34 may be performed in various other ways. For example, in addition to transmitting the specific operation state information to the management system 50 at S102, the request terminal 10aa may transmit the specific operation state information to the counterpart terminal 10db if the address of the couterpart terminal 10db is known. In such case, the display 120db at the counterpart terminal 10db displays the refrained state icon based on the refrained state information received from the request terminal 10aa.

The above-described operation of FIGS. 34 and 36 illustrates the case where the microphone trouble is detected at the request terminal 10aa. The transmission system 1 of FIG. 1 operates in a substantially similar manner as described above referring to FIG. 34, when the other type of refrained state is detected at the request terminal 10aa. For example, assuming that the microphone mute is detected at the request terminal 10aa, the terminal 10aa sends the operation state information including the refrained state information "microphone mute" to the management system 50. In such case, the management system 50 refers to the refrained state information management table of FIG. 24A to extract the message "microphone is in mute", and sends the extracted message to the counterpart terminal 10db together with the terminal ID and the terminal name of the request terminal 10aa. The counterpart terminal 10db extracts the image data of the refrained state icon that corresponds to the "microphone mute" state, and causes the display 120db to display the refrained state icon, and the message "AA terminal microphone is in mute", at a lower portion of the image of the user at the terminal 10*aa*, for example, as illustrated in FIG. 36.

Further, the management system 50 refers to the refrained state management table of FIG. 24A to extract the operation state information "online, communicating, normal" that corresponds to the refrained state information "microphone mute", and sends the operation state information "online, communicating, normal" to the candidate terminals 10*ba* and 10*db*. The candidate terminals 10*ba* and 10*db* each display the operation state icon that corresponds to the operation state information "online, communicating, normal".

Further, the above-described operation of FIG. 34 illustrates the case where the first state of the operation state having the refrained state is the error state, and the second state of the operation state having the refrained state is the normal state. Alternatively, the transmission system 1 of FIG. 1 operates in a substantially similar manner as described above referring to FIG. 34, when the first state of the operation state having the refrained state is the trouble state, and the second state of the operation state having the refrained state is the normal state.

More specifically, in such case, when the microphone trouble is detected at the request terminal 10*aa*, the management system 50 refers to the refrained state information management table of FIG. 24B to obtain the operation state information "online, communicating, trouble" that corresponds to the refrained state information "microphone trouble", and sends the operation state information "online, communicating, trouble" to the candidate terminals 10*ba* and 10*db*. The candidate terminals 10*ba* and 10*db* each refer to the operation state icon management table 12B to extract the image data of the operation state icon that corresponds to the operation state information "online, communicating, trouble" to cause the display 120 to display the extracted operation state icon.

The above-described operation of FIG. 34 may be performed in a substantially similar manner, when the network trouble is detected at the request terminal 10*aa*. More specifically, in this example, the request terminal 10*aa* sends the specific operation state information to the management system 50 through the management data session sei (FIG. 2), which is different from the contents data session being used for communication with the counterpart terminal 10*db*. Even when the contents data is not transmitted or received through the contents data session, the request terminal 10*aa* is able to send the specific operation state information to the management system 50 through the management data session. The management system 50 further transmits the specific operation state information to the counterpart terminal 10*db* through the management data session.

As described above, when the refrained state is detected at the request terminal 10A, the management system 50 transmits the refrained state information of the request terminal 10A to the counterpart terminal 10B that is communicating with the request terminal 10A, together with the message and the terminal name. The counterpart terminal 10B, which receives such information, is able to display, through the display 120, the message indicating that the terminal 10A is in the refrained state.

Further, the management system 50 determines whether the refrained state information of the request terminal 10A is defined to be the first state in which communication is not available or the second state in which communication is available. The management system 50 sends the operation state information indicating whether the request terminal 10A is in the first state or the second state to a candidate terminal 10 that lists the request terminal 10A as a candidate counterpart terminal. With this operation state information, the candidate terminal 10 is able to notify the user at the candidate terminal 10 of whether the request terminal 10A is available for communication. The user, who is notified, is refrained from initiating communication with the request terminal 10A that is not available for communication.

In one example, the first state may be an error state having the refrained state caused by a trouble in the function of the terminal 10A that is related to transmission or reception, or input or output, of voice data. The second state may be the normal state having the refrained state caused by a trouble in the function of the terminal 10A that is related to transmission or reception, or input or output, of image data, or the normal state having the refrained state caused by activation of the mute function of the terminal 10A.

For example, if the refrained state of the terminal 10A is caused due to the microphone trouble or the speaker trouble, communication, even teleconference, cannot be carried out with the terminal 10A. In such case, the candidate terminal 10 that may start communication with the terminal 10A in the refrained state is notified beforehand that the terminal 10A is not available for communication. In another example, if the refrained state of the terminal 10A is caused due to the camera trouble or the display trouble or activation of the mute function, communication such as teleconference can be carried out with the terminal 10A. In such case, the candidate terminal 10 that may start communication with the terminal 10A in the refrained state is notified beforehand that the terminal 10A is available for communication.

In another example, the first state may be a trouble state having the refrained state caused by a trouble in the function of the terminal 10A that is related to communication. The second state may be the normal state having the refrained state caused by activation of the mute function of the terminal 10A that is related to communication function.

For example, if the refrained state of the terminal 10A is caused due to the trouble in communication function of the terminal 10A such as the microphone trouble, the speaker trouble, the camera trouble, or the display trouble, communication such as videoconference cannot be carried out with the terminal 10A. In such case, the candidate terminal 10 that may start communication with the terminal 10A in the refrained state is notified beforehand that the terminal 10A is not available for communication such as videoconference. In another example, if the refrained state of the terminal 10A is caused due to activation of the mute function, communication such as videoconference can be carried out with the terminal 10A. In such case, the candidate terminal 10 that may start communication with the terminal 10A in the refrained state is notified beforehand that the terminal 10A is available for communication.

Further, as described above, the transmission system is provided with a function of selecting one of a plurality of relay terminals 30 that is suitable for communication between a request terminal and a counterpart terminal. While it may be difficult to obtain information regarding the entire network such as the Internet, the transmission system 1 is able to identify the relay terminal that is suitable for communication using information available from the communication network such as information regarding the LAN at which the relay terminal is located.

More specifically, the management system 50 selects a small number of relay terminals 30 out of a large number of relay terminals 30 for further processing. Preferably, the small number of relay terminals 30 is equal to or more than two. Before sending contents data from the request terminal 10 to the counterpart terminal 10, the management system 50 causes the request terminal 10 to send preparatory transmit information to the counterpart terminal 10 via each one of the selected relay terminals 30 to obtain information regarding a time required for transmitting the preparatory transmit information for each one of the selected relay terminals 30. Based on this obtained information, the relay terminal 30 that is most suitable for communication between the request terminal and the counterpart terminal is selected.

In one example, the management system 50 selects a small number of relay terminals 30 each having the IP address that is similar to at least one of the IP address of the request terminal and the IP address of the counterpart terminal. Additionally or alternatively, in order to select a small number of relay terminals 30, the maximum data transmission speed of the relay terminal 30 may be taken into account. Additionally or alternatively, in order to select a small number of relay terminals 30, whether the relay terminal 30 is in the on-line state or not may be taken into account. Since the relay terminal 30 is selected based on the current operation state of the relay terminal 30, the relay terminal 30 is selected with improved accuracy.

Referring to FIG. 27, the display of the terminal 10 may display the candidate list frame 11-1 with the candidate terminal name 11-2 and the icon 11-3 indicating the operation state of the candidate terminal, as the candidate list information. Alternatively, the candidate list information may be displayed in various other ways. For example, referring to FIG. 27, only the candidate terminal name 11-2 and the icon 11-3 may be displayed without the candidate list frame 11-1.

The relay terminal 30, the management system 50, the program providing system 90, and the maintenance system 100 may be each implemented by a single computer. Alternatively, any number of parts, functions, or modules of the relay terminal 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, and transmission management program, or a storage device such as the HDD 204 that stores any one of the terminal control program, relay control program, and transmission management program, or the program providing system 90 provided with the HD 204 storing any one of the terminal control program, relay control program, and transmission management program, may be distributed within the country or to another country as a computer program product.

In the above-described examples, the quality of image data to be processed by the relay terminal 30, which is determined based on information obtainable from any one of the data quality management table of FIG. 13 and the quality management table of FIG. 23 is analyzed in terms of image resolution. Alternatively, any other criteria may be used to analyze quality of image data including, for example, depth of image, sampling frequency in case of voice data, and bit length in case of voice data.

Further, the date and time information stored in the relay terminal management table of FIG. 16 or the terminal management table of FIG. 18, or the delay time information stored in the session management table of FIG. 20, is expressed in terms of date and time. Alternatively, the date and time information or the delay time information may be expressed only in terms of time such as the time at which information is received.

Further, in the above-described examples, the relay terminal IP address of the relay terminal 30 and the terminal IP address of the terminal 10 are respectively managed using the relay terminal management table of FIG. 16 and the terminal management table of FIG. 18. Alternatively, the relay terminal 30 and the terminal 10 may each be managed using any other identification information or using any other tables. For example, when the relay terminal 30 or the terminal 10 needs to be identified on the communication network 2, the relay terminal 30 or the terminal 10 may be managed using Fully Qualified Domain Name (FQDN). In such case, the transmission system 10 is provided with a domain name system (DNS) server that obtains the IP address that corresponds to the FQDN of the relay terminal 30 or the terminal 10. In view of this, identification information for identifying the relay terminal 30 on the communication network 2 may not only include the identification information that identifies the relay terminal 30 on the communication network 2, but also identification information that identifies a node on the communication network 2 to which the relay terminal 30 is connected, or identification information that identifies a node on the communication network 2 from which the relay terminal 30 is connected. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile.

In another example, the transmission system 1 of FIG. 1 may be implemented as a communication system having a portable phone. In such case, the terminal 10 is implemented as the portable phone. The terminal 10, or the portable phone 10, includes a body, a menu screen display button, a display section, a microphone provided at a lower portion of the body, and a speaker provided at an upper portion of the body. When selected, the menu screen display button causes the display section to display a menu screen in which various icons each indicating a specific application program are displayed. In this example, the display section displays a candidate terminal list that lists a plurality of terminal names together with a plurality of icons each reflecting the operation state of each candidate terminal. Since the terminal 10 in this example is implemented as a portable phone, the name of a user who owns the specific terminal, or a nickname of the user, is displayed as the terminal name. The display section is a touch panel screen, which allows the user to select one of the plurality of terminal names being displayed by the display section. When a specific terminal name, or a user name, is selected, the portable phone starts communication with the specific terminal that is selected in a substantially similar manner as described above.

In the above-described examples, the contents data is assumed to include image data and voice data. Alternatively, the contents data may include any other type of data that affects human senses of sight in alternative to image data, or any other type of data that affects human senses of hearing in alternative to voice data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as voice data, touch data, smell data, and taste data.

Further, in the above-described examples, the transmissions system 1 is implemented as a videoconference system for use at offices. Other examples of use of the transmission system 1 include, but not limited to, meetings, casual conversation among family members or friends, and distribution of information in one direction.

In the above-described examples, the counterpart terminal 10B reduces a number of candidate terminals 30. Alternatively, the request terminal 10A or the management system 50 may reduce a number of candidate terminals 30. In such case, the counterpart terminal 10B sends time information indicating a time period between the time when the preparatory transmit information is transmitted at the request terminal 10A and the time when the preparatory transmit information is received at the counterpart terminal 10B, to either one of the request terminal 10A or the management system 50.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a transmission management system that manages a transmission terminal that communicates with a counterpart terminal through transmitting contents data to the counterpart terminal through a communication network. The transmission management system includes: refrained state management means for managing refrained state information indicating a refrained state of the transmission terminal in association with operation state information of the transmission terminal, the operation state information indicating whether the operation state is in a first state in which the refrained state is caused by a trouble in function of the transmission terminal that is related to transmission or reception of voice data, or the operation state is in a second state in which the refrained state is caused by a trouble in function of the transmission terminal that is related to transmission or reception of image data or caused by activation of restriction processing that restricts a communication function of the transmission terminal; means for receiving refrained state information indicating a refrained state of a first transmission terminal from the first transmission terminal; means for extracting operation state information that corresponds to the refrained state of the first transmission terminal through searching the refrained state management means using the refrained state information of the first transmission terminal; and means for transmitting the extracted operation state information to a second transmission terminal that may start communication with the first transmission terminal.

In another example, the transmission management system further includes: candidate terminal management means for managing terminal identification information for identifying a candidate counterpart terminal, which is registered for a request transmission terminal, in association with terminal identification information for identifying the request transmission terminal. The means for receiving receives the terminal identification information for identifying the first transmission terminal, from the first transmission terminal, when the refrained state information is received. The means for extracting searches the candidate terminal management means using the terminal identification information of the first transmission terminal to extract terminal identification information of the second transmission terminal that is a request transmission terminal that has registered the first transmission terminal as a candidate counterpart transmission terminal. The means for transmitting transmits the operation state information of the first transmission terminal to the second transmission terminal assigned with the terminal identification information extracted by the means for extracting.

In another example, the transmission management system further includes means for managing operation state information indicating an operation state of the transmission terminal for each of the terminal identification information for identifying the transmission terminal to be managed by the transmission management system. The means for extracting extracts the terminal identification information of the transmission terminal having the operation state indicating that the terminal is online and available for communication, as the identification information for the second transmission terminal that may communicate with the first transmission terminal.

The refrained state that is caused by a trouble in function of the transmission terminal that is related to transmission or reception of voice data includes a state where a microphone trouble is detected or a speaker trouble is detected.

The refrained state that is caused by a trouble in function of the transmission terminal that is related to transmission or reception of image data includes a state where a camera trouble or a display trouble is detected. The refrained state that is caused by activation of restriction processing that restricts a communication function of the transmission terminal includes a microphone mute state in which input to a microphone is restricted, a camera off state in which capturing by the camera is restricted, a speaker mute state in which output from a speaker is restricted, and a display off state in which display through a display is restricted.

In another example, the present invention may reside in: a transmission management method for managing a transmission terminal that communicates with a counterpart terminal through a communication network. The transmission management system includes: refrained state management means for managing refrained state information indicating a refrained state of the transmission terminal in association with operation state information, the operation state information indicating whether the operation state is in a first state in which the refrained state is caused by a trouble in function of the transmission terminal that is related to transmission or reception of voice data, or the operation state is in a second state in which the refrained state is caused by a trouble in function of the transmission terminal that is related to transmission or reception of image data or caused by activation of restriction processing that restricts a communication function of the transmission terminal. The transmission management method includes the steps of: receiving refrained state information indicating a refrained state of a first transmission terminal from the first transmission terminal; extracting operation state information that corresponds to the refrained state of the first transmission terminal through searching the refrained state management means using the refrained state information of the first transmission terminal; and transmitting the extracted operation state information to a second transmission terminal that may start communication with the first transmission terminal.

In another example, the present invention may reside in a transmission management program that causes the transmission management system to perform the above-described functions.

In another example, the present invention may reside in a program providing system that provides the transmission management program to the transmission management system through a communication network.

In another example, the present invention may reside in a maintenance system that maintains the transmission management system.

In one example, the present invention may reside in a transmission management system that manages a transmission terminal that communicates with a counterpart terminal through transmitting contents data to the counterpart terminal through a communication network. The transmission management system includes: refrained state management means for managing refrained state information indicating a refrained state of the transmission terminal in association with operation state information, the operation state information indicating whether the operation state is in a normal state in which the refrained state is caused by activation of restriction processing that restricts a communication function of the transmission terminal, or the operation state is in a trouble state in which the refrained state is caused by a trouble in the communication function of the transmission terminal; means for receiving refrained state information indicating a refrained state of a first transmission terminal from the first transmission terminal; means for extracting operation state information that corresponds to the refrained state of the first transmission terminal through searching the refrained state management means using the refrained state information of the first transmission terminal; and means for transmitting the extracted operation state information to a second transmission terminal that may start communication with the first transmission terminal.

In another example, the transmission management system further includes: candidate terminal management means for managing terminal identification information for identifying a candidate counterpart terminal, which is registered for a request transmission terminal, in association with terminal identification information for identifying the request transmission terminal. The means for receiving receives the terminal identification information for identifying the first transmission terminal, from the first transmission terminal, when the refrained state information is received. The means for extracting searches the candidate terminal management means using the terminal identification information of the first transmission terminal to extract terminal identification information of the second transmission terminal that is a request transmission terminal that has registered the first transmission terminal as a candidate counterpart transmission terminal. The means for transmitting transmits the operation state information of the first transmission terminal to the second transmission terminal assigned with the terminal identification information extracted by the means for extracting.

In another example, the transmission management system further includes means for managing operation state information indicating an operation state of the transmission terminal for each of the terminal identification information for identifying the transmission terminal to be managed by the transmission management system. The means for extracting extracts the terminal identification information of the transmission terminal having the operation state indicating that the terminal is online and available for communication, as the identification information for the second transmission terminal that may communicate with the first transmission terminal.

The refrained state that is caused by activating restriction processing that restricts the communication function of the transmission terminal includes a microphone mute state in which input to a microphone is restricted, a camera off state in which capturing by the camera is restricted, a speaker mute state in which output from a speaker is restricted, and a display off state in which display through a display is restricted.

The refrained state that is caused by the trouble in the communication function of the transmission terminal includes a trouble in any one of the microphone, camera, speaker, and display.

In another example, the present invention may reside in a transmission management program that causes the transmission management system to perform any one of the above-described functions.

In another example, the present invention may reside in a program providing system that provides the transmission management program to the transmission management system through a communication network.

In another example, the present invention may reside in a maintenance system that maintains the transmission management system.

In one example, the present invention may reside in: a transmission management system including: a storage device to store refrained state information indicating a refrained state of a transmission terminal in association with operation state information indicating an operation state of the transmission terminal having the corresponding refrained state, the operation state being determined to be: (1) a first state when the transmission terminal has the refrained state that allows communication between or among the transmission terminals; and (2) a second state when the transmission terminal has the refrained state that prohibits communication between or among the transmission terminals; a network interface to receive refrained state information indicating a refrained state of a first transmission terminal from the first transmission terminal; and a processor to obtain operation state information that is stored in association with the refrained state information received from the first transmission terminal, as operation state information of the first transmission terminal; and cause the network interface to transmit the operation state information of the first transmission terminal to a second transmission terminal that may initiate communication with the first transmission terminal.

In one example, the first state is defined to be an error state when the transmission terminal has the refrained state that prohibits even teleconference to be carried out between or among the terminals. The second state is defined to be a normal state when the transmission has the refrained state that allows at least teleconference to be carried out between or among the terminals.

In one example, the first state is defined to be a trouble state when the transmission terminal has the refrained state that prohibits videoconference to be carried out between or among the terminals. The second state is defined to be a normal state when the transmission terminal has the refrained state that allows videoconference to be carried out between or among the terminals.

In one example, the present invention may reside in: a transmission management system including: a storage device to store refrained state information indicating a refrained state of a transmission terminal in association with operation state information indicating an operation state of the transmission terminal having the corresponding refrained state, the operation state being determined to be: (1) a trouble state when the transmission terminal has the refrained state that is caused by a trouble in communication function of the transmission terminal; and (2) a normal state when the transmission terminal has the refrained state that is caused by activation of restriction processing that restricts the communication function of the transmission terminal; a network interface to receive refrained state information indicating a refrained state of a first transmission terminal from the first transmission terminal; and a processor to obtain operation state information that is stored in association with the refrained state information received from the first transmission terminal, as operation state information of the first transmission terminal; and cause the network interface to transmit the operation state information of the first transmission terminal to a second transmission terminal that may initiate communication with the first transmission terminal.

The refrained state that is caused by a trouble in communication function of the transmission terminal includes: a refrained state caused by a trouble in a microphone of the transmission terminal, the microphone being incorporated in or connected to the transmission terminal; a refrained state caused by a trouble in a speaker of the transmission terminal, the speaker being incorporated in or connected to the transmission terminal; a refrained state caused by a trouble in a camera of the transmission terminal, the camera being incorporated in or connected to the transmission terminal; and a refrained state caused by a trouble in a display of the transmission terminal, the display being incorporated in or connected to the transmission terminal.

The refrained state that is caused by activation of restriction processing that restricts a communication function of the transmission terminal includes: a refrained state caused by activation of restriction processing that restricts inputting of sounds through the microphone; a refrained state caused by activation of restriction processing that restricts outputting of sounds through the speaker; a refrained state caused by activation of restriction processing that restricts capturing of images by the camera or transmitting the captured images; and a refrained state caused by activation of restriction processing that restricts displaying of images by the display.

In another example, the present invention may reside in: a transmission system including: a first transmission terminal that transmits or receives contents data to or from a counterpart transmission terminal through a communication network to carry out communication with the counterpart transmission terminal; a second transmission terminal communicable with the first transmission terminal; and a transmission management server to manage a plurality of transmission terminals. The transmission management server includes: a network interface to receive refrained state information indicating a refrained state of a first transmission terminal from the first transmission terminal; and a processor to: obtain operation state information of the first transmission terminal using the refrained state information received from the first transmission terminal, wherein the operation state is determined to be: (1) a trouble state when the first transmission terminal has the refrained state that is caused by a trouble in communication function of the first transmission terminal; and (2) a normal state when the first transmission terminal has the refrained state that is caused by activation of restriction processing that restricts a communication function of the first transmission terminal; and cause the network interface to transmit the obtained operation state information to the second transmission terminal that may initiate communication with the first transmission terminal.

In another example, the present invention may reside in: a method of managing a transmission terminal, including: storing in a memory, refrained state information indicating a refrained state of a transmission terminal in association with operation state information indicating an operation state of the transmission terminal having the corresponding refrained state, the operation state being determined to be: (1) a trouble state when the transmission terminal has the refrained state that is caused by a trouble in communication function of the transmission terminal; and (2) a normal state when the transmission terminal has the refrained state that is caused by activation of restriction processing that restricts a communication function of the transmission terminal; receiving refrained state information indicating a refrained state of a first transmission terminal from the first transmission terminal; obtaining operation state information that is stored in association with the refrained state information received from the first transmission terminal, as operation state information of the first transmission terminal; and transmitting the operation state information of the first transmission terminal to a second transmission terminal that may initiate communication with the first transmission terminal.

In another example, the present invention may reside in: a recording medium storing a plurality of instructions which cause a processor to perform the above-described method.

What is claimed is:

1. A transmission management system, comprising:
a storage device configured to store refrained state information indicating a refrained state of a transmission terminal in association with operation state information indicating an operation state of the transmission terminal having the corresponding refrained state, the operation state being determined to be a trouble state when the transmission terminal has the refrained state that is caused by a trouble in communication function of the transmission terminal;
a network interface configured to receive refrained state information indicating a refrained state of a first transmission terminal from the first transmission terminal; and
a processor configured to:
to obtain operation state information that is stored in association with the refrained state information received from the first transmission terminal, as operation state information of the first transmission terminal, and
cause the network interface to transmit the operation state information of the first transmission terminal to a second transmission terminal that may initiate communication with the first transmission terminal.

2. The transmission management system of claim 1, further comprising:
a storage device configured to store, for each one of a plurality of transmission terminals being managed by the transmission management system, identification information for identifying the transmission terminal in association with identification information for identifying a candidate counterpart transmission terminal with which the transmission terminal may start communication, wherein
the network interface further receives identification information for identifying the first transmission terminal from the first transmission terminal, and
the processor obtains identification information of the candidate counterpart transmission terminal that is stored in association with the identification information of the first transmission terminal, as the identification information of the second transmission terminal to which the operation state information of the first transmission terminal is to be transmitted.

3. The transmission management system of claim 2, further comprising:
a storage device configured to store, for each one of the plurality of transmission terminals being managed by the transmission management system, operation state information indicating a current operation state of the transmission terminal, wherein
the processor obtains the operation state information of the second transmission terminal to determine whether the current operation state of the second transmission terminal is online and available for communication, and causes the network interface to transmit the operation state information of the first transmission terminal to the second transmission terminal only when the current operation state of the second transmission terminal is online and available for communication.

4. The transmission management system of claim 3, wherein:
the storage device configured to store refrained state information further stores text data of a message indicating the refrained state of the transmission terminal, in association with the refrained state information,
the processor further obtains text data of a message indicating the refrained state of the first transmission terminal, using the refrained state information received from the first transmission terminal, and
the network interface further transmits the refrained state information of the first transmission terminal, the text data of the message, and the identification information of the first transmission terminal, to the second transmission terminal for display onto a display of the second transmission terminal.

5. The transmission management system of claim 1, wherein the refrained state that is caused by the trouble in the communication function of the transmission terminal includes a trouble in a microphone or sound-collecting device such that sound data including voice data is not transmitted, the microphone or sound-collecting device being incorporated in or connected to the transmission terminal.

6. The transmission management system of claim 1, wherein the operation state is determined to be a normal state when the transmission terminal has the refrained state that is caused by activation of restriction processing that restricts the communication function of the transmission terminal.

7. The transmission management system of claim 1, wherein the operation state is determined to be a normal state when the transmission terminal has the refrained state that is caused by activation of restriction processing that restricts the communication function of the transmission terminal.

8. A transmission system, comprising:
a first transmission terminal that transmits or receives contents data to or from a counterpart transmission terminal through a communication network to carry out communication with the counterpart transmission terminal;
a second transmission terminal communicable with the first transmission terminal; and
a transmission management server to manage a plurality of transmission terminals, wherein the transmission management server includes:
a network interface configured to receive refrained state information indicating a refrained state of the first transmission terminal from the first transmission terminal; and
a processor configured to:
obtain operation state information of the first transmission terminal using the refrained state information received from the first transmission terminal, wherein an operation state is determined to be: a trouble state when the first transmission terminal has the refrained state that is caused by a trouble in communication function of the first transmission terminal, and
cause the network interface to transmit the operation state information of the first transmission terminal to the second transmission terminal that may initiate communication with the first transmission terminal.

9. The transmission system of claim 8, wherein
the network interface of the transmission management server further receives identification information for identifying the first transmission terminal from the first transmission terminal, and
the processor of the transmission management server obtains identification information of a candidate counterpart transmission terminal that is previously registered as a terminal with which the first transmission terminal may start communication, as the identification information of the second transmission terminal to which the operation state information of the first transmission terminal is to be transmitted.

10. The transmission system of claim 9, wherein
the processor of the transmission management server obtains operation state information of the second transmission terminal to determine whether a current operation state of the second transmission terminal is online and available for communication, and the network interface transmits the operation state information of the first transmission terminal to the second transmission terminal only when the current operation state of the second transmission terminal is online and available for communication.

11. The transmission system of claim 10, wherein the second transmission terminal includes:
a network interface configured to receive the operation state information of the first transmission terminal from the transmission management server; and
a processor configured to obtain image data of an operation state icon that corresponds to the received operation state information of the first transmission terminal for display onto a display of the second transmission terminal.

12. The transmission system of claim 11, wherein
the processor of the transmission management server further obtains text data of a message indicating the refrained state specified by the refrained state information received from the first transmission terminal, using the refrained state information received from the first transmission terminal,
the network interface of the transmission management server transmits the refrained state information of the first terminal, the text data of the message, and the identification information of the first transmission terminal, to the counterpart transmission terminal for display onto a display of the counterpart transmission terminal.

13. The transmission system of claim 8, wherein the refrained state that is caused by the trouble in the communication function of the first transmission terminal includes a trouble in a microphone or sound-collecting device such that sound data including voice data is not transmitted, the microphone or sound-collecting device being incorporated in or connected to the first transmission terminal.

14. A method of managing a transmission terminal, the method comprising:
storing in a memory, refrained state information indicating a refrained state of a transmission terminal in association with operation state information indicating an operation state of the transmission terminal having the corresponding refrained state, the operation state being determined to be a trouble state when the transmission terminal has the refrained state that is caused by a trouble in communication function of the transmission terminal;
receiving refrained state information indicating a refrained state of a first transmission terminal from the first transmission terminal;
obtaining operation state information that is stored in association with the refrained state information received from the first transmission terminal, as operation state information of the first transmission terminal; and
transmitting the operation state information of the first transmission terminal to a second transmission terminal that may initiate communication with the first transmission terminal.

15. The method of claim 14, further comprising:
storing in a memory, for each one of a plurality of transmission terminals being managed by the transmission management system, identification information for identifying the transmission terminal in association with identification information for identifying a candidate counterpart transmission terminal with which the transmission terminal may start communication;
receiving identification information for identifying the first transmission terminal from the first transmission terminal; and
obtaining identification information of the candidate counterpart transmission terminal that is stored in association with the identification information of the first transmission terminal, as the identification information of the second transmission terminal to which the operation state information of the first transmission terminal is to be transmitted.

16. The method of claim 15, further comprising:
storing in a memory, for each one of the plurality of transmission terminals being managed by the transmission management system, operation state information indicating a current operation state of the transmission terminal; and
obtaining the operation state information of the second transmission terminal to determine whether the current operation state of the second transmission terminal is online and available for communication, wherein the transmitting transmits the operation state information of the first transmission terminal to the second transmission terminal only when the current operation state is online and available for communication.

17. The method of claim 16, wherein:
the memory that stores refrained state information further stores text data of a message indicating the refrained state of the transmission terminal, in association with the refrained state information, and the method includes:
obtaining text data of a message indicating the refrained state of the first transmission terminal, using the refrained state information received from the first transmission terminal, and
transmitting the refrained state information of the first transmission terminal, the text data of the message, and the identification information of the first transmission terminal, to the second transmission terminal for display onto a display of the second transmission terminal.

18. The method of claim 14, wherein the refrained state that is caused by the trouble in the communication function of the transmission terminal includes a trouble in a microphone or sound-collecting device such that sound data including voice data is not transmitted, the microphone or sound-collecting device being incorporated in or connected to the transmission terminal.

19. The method of claim 14, wherein the operation state is determined to be a normal state when the transmission terminal has the refrained state that is caused by activation of restriction processing that restricts the communication function of the transmission terminal.

* * * * *